(12) United States Patent
Guo et al.

(10) Patent No.: US 10,965,994 B2
(45) Date of Patent: Mar. 30, 2021

(54) VIDEO RECOMMENDATION DETERMINATION, INFORMATION DISPLAY, DATA PROCESSING METHOD BASED ON FRAME SYNCHRONIZATION

(71) Applicant: Tencent Technology (Shenzhen) Company Limited, Shenzhen (CN)

(72) Inventors: Xing Guo, Shenzhen (CN); Ruchun Wu, Shenzhen (CN); Jun Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/351,282

(22) Filed: Mar. 12, 2019

(65) Prior Publication Data
US 2019/0208284 A1 Jul. 4, 2019

Related U.S. Application Data

(63) Continuation of application No. PCT/CN2017/112608, filed on Nov. 23, 2017.

(30) Foreign Application Priority Data

Nov. 24, 2016 (CN) .......................... 201611044186.6
Nov. 24, 2016 (CN) .......................... 201611044191.7
Nov. 24, 2016 (CN) .......................... 201611050866.9

(51) Int. Cl.
*A63F 13/833* (2014.01)
*A63F 13/52* (2014.01)
(Continued)

(52) U.S. Cl.
CPC ......... *H04N 21/4826* (2013.01); *A63F 13/35* (2014.09); *A63F 13/52* (2014.09);
(Continued)

(58) Field of Classification Search
CPC ............... H04N 21/4826; H04N 21/44; H04N 21/8173; A63F 2300/577; A63F 2300/65;
(Continued)

(56) References Cited

U.S. PATENT DOCUMENTS

| 5,850,352 A | * | 12/1998 | Moezzi | ................. H04N 13/139 345/419 |
| 7,084,876 B1 | * | 8/2006 | Fogel | ....................... A63F 13/10 345/473 |

(Continued)

FOREIGN PATENT DOCUMENTS

| CN | 102455856 A | 5/2012 |
| CN | 102611942 A | 7/2012 |

(Continued)

OTHER PUBLICATIONS

Vanacken et. al., Exploring the Effects of Environment Density and Target Visibility on Object Selection in 3D Virtual Environments, Mar. 2007, IEEE Symposium on 3D interfaces Mar. 10-11 (Year: 2007).*

(Continued)

*Primary Examiner* — Nathan J Flynn
*Assistant Examiner* — Caroline Somera
(74) *Attorney, Agent, or Firm* — Morgan, Lewis & Bockius LLP

(57) ABSTRACT

The present disclosure provides a method for determining a recommended video, a data processing computer server and a system. The computer server determines candidate virtual scenes, users currently participating in the candidate virtual scenes, and a user corresponding to a virtual role in the candidate virtual scenes. After selecting a target virtual scene from the candidate virtual scenes, the computer server determines representation data of virtual roles of the target virtual scene, selects a target virtual role from the virtual (Continued)

roles of the target virtual scene according to the representation data of the virtual roles of the target virtual scene, and generates a recommended video at a viewing angle of the target virtual role in the target virtual scene.

18 Claims, 23 Drawing Sheets

(51) Int. Cl.
    *A63F 13/35*     (2014.01)
    *A63F 13/86*     (2014.01)
    *A63F 13/58*     (2014.01)
    *H04N 21/44*     (2011.01)
    *A63F 13/533*     (2014.01)
    *H04N 21/482*     (2011.01)
    *H04N 21/81*     (2011.01)

(52) U.S. Cl.
    CPC ............ *A63F 13/58* (2014.09); *A63F 13/833* (2014.09); *A63F 13/86* (2014.09); *H04N 21/44* (2013.01); *H04N 21/8173* (2013.01); *A63F 13/533* (2014.09); *A63F 2300/577* (2013.01); *A63F 2300/65* (2013.01); *A63F 2300/8029* (2013.01)

(58) Field of Classification Search
    CPC .. A63F 2300/8029; A63F 13/35; A63F 13/52; A63F 13/58; A63F 13/833; A63F 13/86; A63F 13/533
    USPC .......................................................... 725/16
    See application file for complete search history.

(56) References Cited

U.S. PATENT DOCUMENTS

| | | | | |
|---|---|---|---|---|
| 7,742,047 | B2* | 6/2010 | Nakamura | A63F 13/10 345/426 |
| 8,366,554 | B1* | 2/2013 | Yuan | G10L 13/08 463/42 |
| 2004/0176164 | A1* | 9/2004 | Kobayashi | A63F 13/10 463/30 |
| 2004/0193441 | A1* | 9/2004 | Altieri | G06Q 30/02 709/203 |
| 2007/0032282 | A1* | 2/2007 | Hamamoto | A63F 13/10 463/9 |
| 2007/0060346 | A1* | 3/2007 | Edwards | A63F 13/10 463/31 |
| 2007/0270215 | A1* | 11/2007 | Miyamoto | A63F 13/10 463/32 |
| 2008/0143727 | A1* | 6/2008 | Oh | G06T 15/205 345/474 |
| 2010/0122309 | A1* | 5/2010 | Kawakami | H04N 7/17318 725/116 |
| 2010/0229190 | A1 | 9/2010 | Koo et al. | |
| 2011/0230258 | A1* | 9/2011 | Van Luchene | A63F 13/35 463/29 |
| 2011/0230267 | A1* | 9/2011 | Van Luchene | A63F 13/77 463/42 |
| 2012/0142429 | A1* | 6/2012 | Muller | A63F 13/45 463/42 |
| 2012/0223940 | A1* | 9/2012 | Dunstan | A63F 13/355 345/419 |
| 2012/0309543 | A1* | 12/2012 | Shimada | H04N 5/76 463/42 |
| 2013/0045800 | A1* | 2/2013 | Yang | A63F 13/35 463/31 |
| 2013/0296045 | A1* | 11/2013 | Dun | A63F 13/12 463/31 |
| 2013/0335407 | A1* | 12/2013 | Reitan | G06F 3/011 345/419 |
| 2015/0258438 | A1* | 9/2015 | Tait | A63F 13/355 463/31 |
| 2016/0300387 | A1* | 10/2016 | Ziman | G06T 19/003 |
| 2016/0317933 | A1* | 11/2016 | Shoshan | A63F 13/79 |
| 2018/0028918 | A1* | 2/2018 | Tang | G06F 3/0484 |

FOREIGN PATENT DOCUMENTS

| | | |
|---|---|---|
| CN | 104998412 A | 10/2015 |
| CN | 105657517 A | 6/2016 |
| CN | 106034129 A | 10/2016 |
| CN | 106534970 A | 3/2017 |
| CN | 106559426 A | 4/2017 |
| CN | 106730839 A | 5/2017 |

OTHER PUBLICATIONS

Tencent Technology, ISRWO, PCT/CN2017/112608, Feb. 28, 2018, 11 pgs.
Tencent Technology, IPRP, PCT/CN2017/112608, May 28, 2019, 7 pgs.

\* cited by examiner

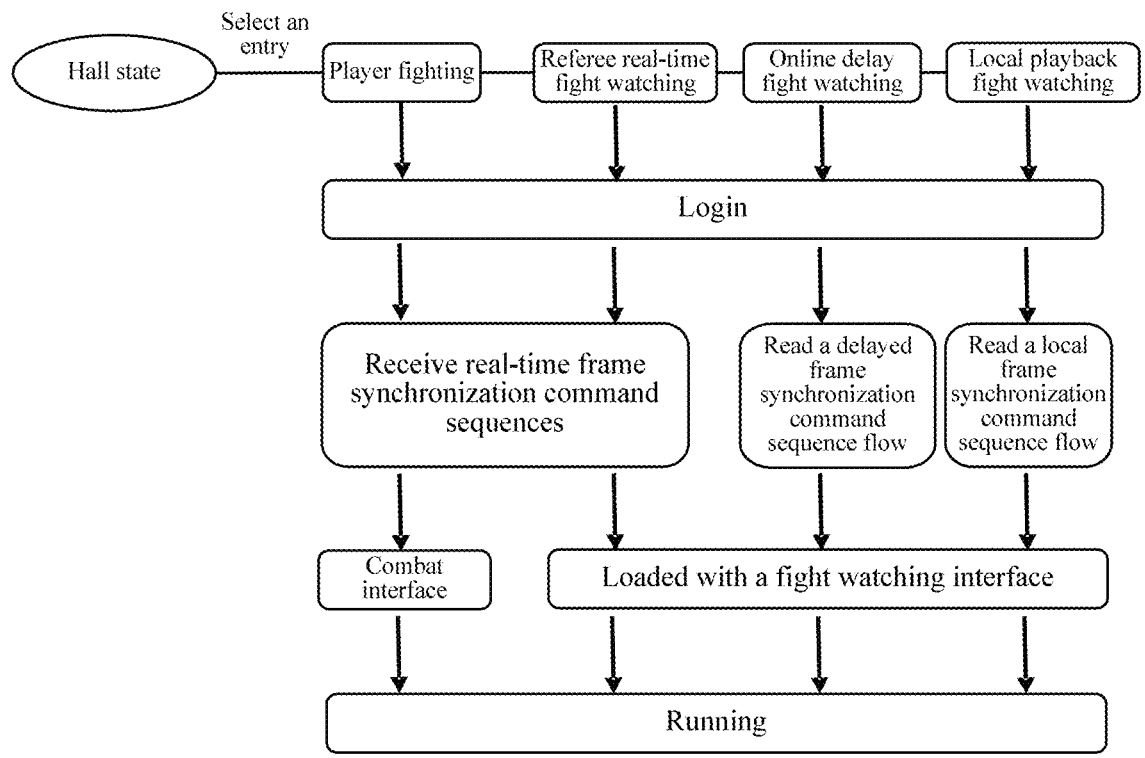
FIG. 36
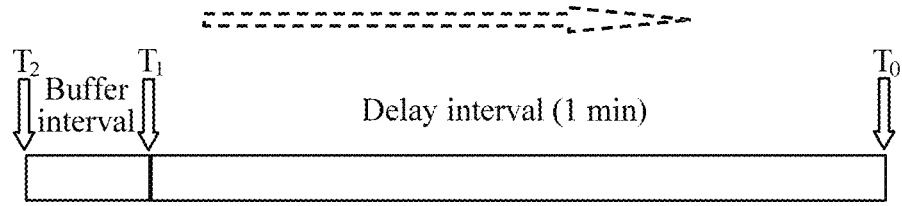
FIG. 37
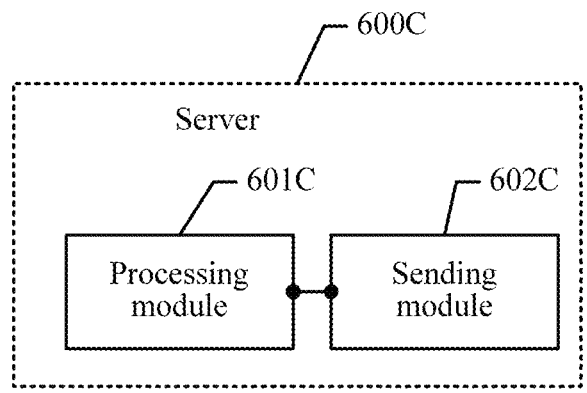
FIG. 38-a

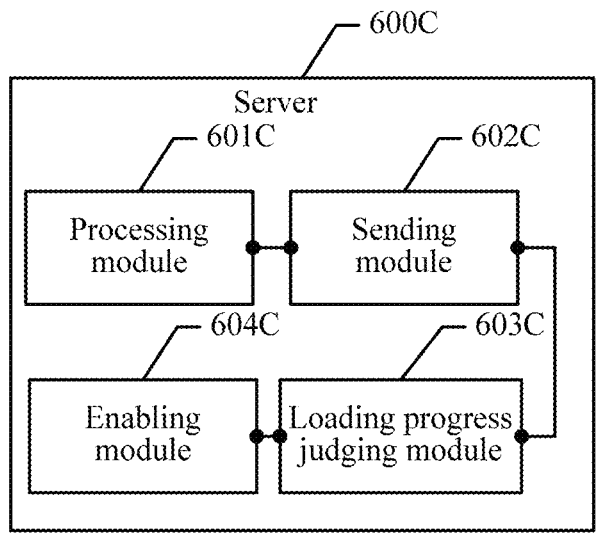
FIG. 38-b
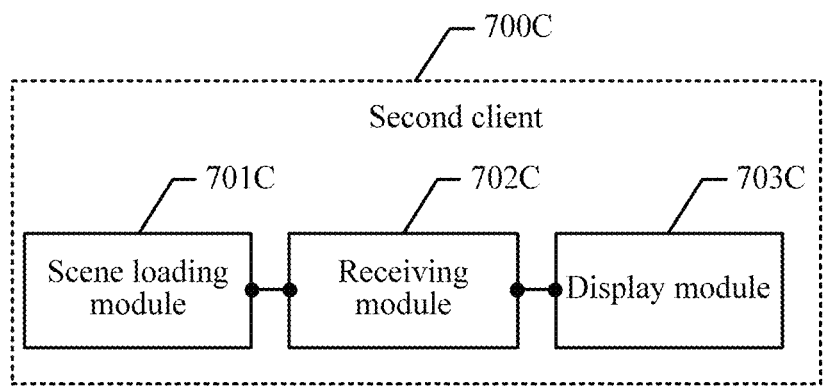
FIG. 39-a
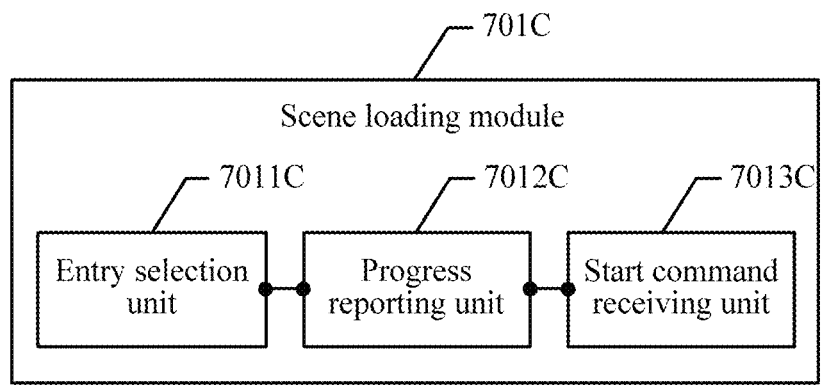
FIG. 39-b

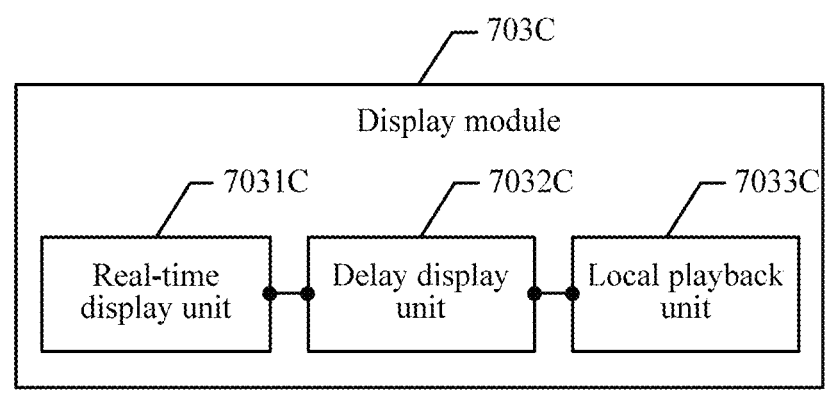
FIG. 39-c
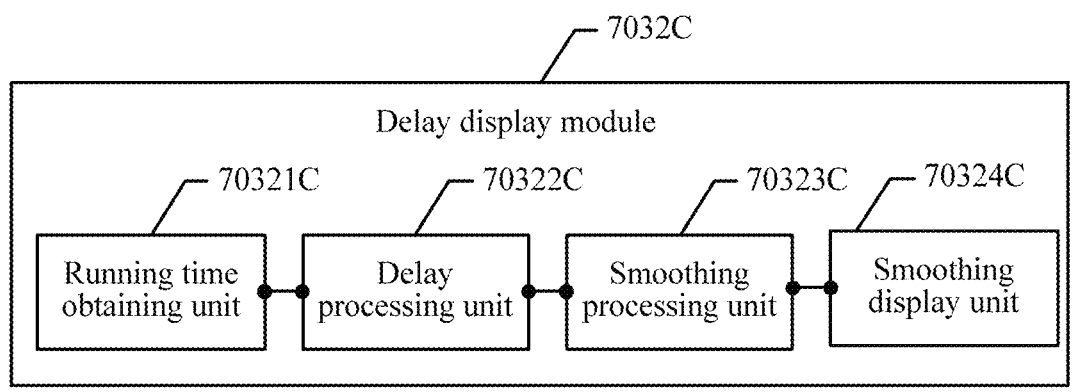
FIG. 39-d

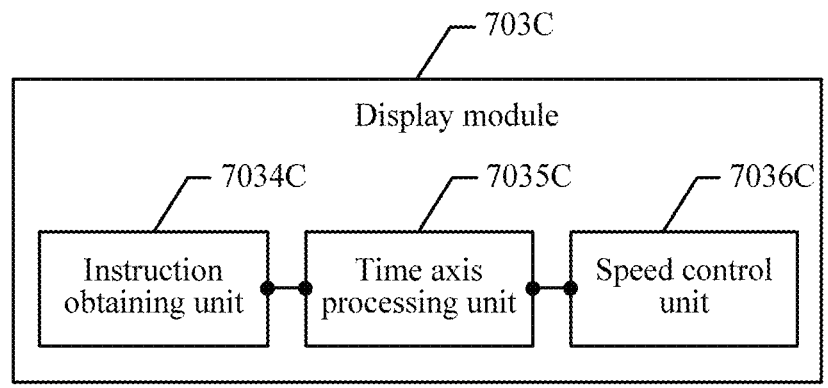
FIG. 39-e
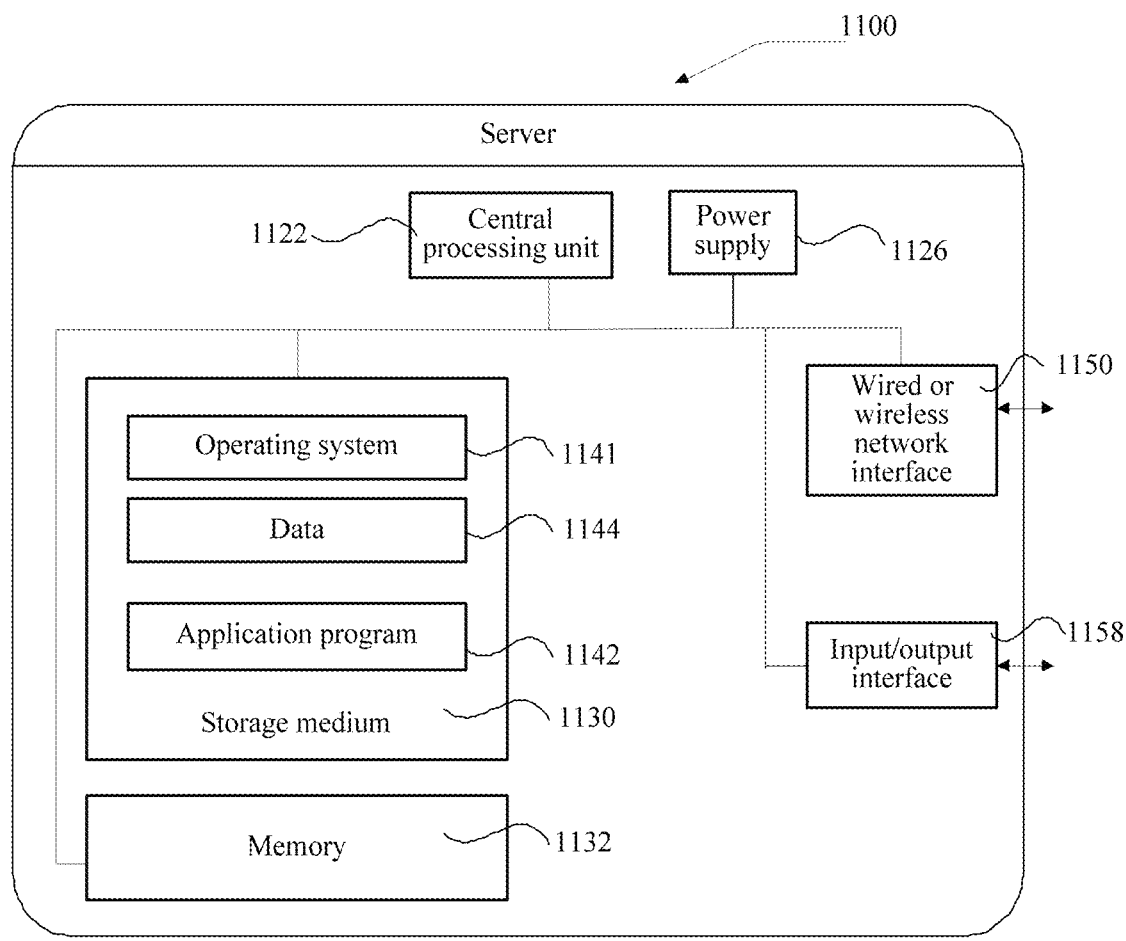
FIG. 40

VIDEO RECOMMENDATION DETERMINATION, INFORMATION DISPLAY, DATA PROCESSING METHOD BASED ON FRAME SYNCHRONIZATION

CROSS-REFERENCE TO RELATED APPLICATIONS

This application is a continuation application of PCT/CN2017/112608, entitled "FRAME-SYNCHRONIZATION-BASED DATA PROCESSING METHOD FOR VIDEO RECOMMENDATION DETERMINATION AND INFORMATION DISPLAY" filed on Nov. 23, 2017, which claims priority to (i) Chinese Patent Application No. 201611050866.9, entitled "METHOD FOR DETERMINING RECOMMENDED VIDEO, DATA PROCESSING SERVER AND SYSTEM" filed on Nov. 24, 2016, (ii) Chinese Patent Application No. 201611044186.6, entitled "INFORMATION DISPLAY METHOD AND TERMINAL" filed on Nov. 24, 2016, and (iii) Chinese Patent Application No. 201611044191.7, entitled "DATA PROCESSING METHOD BASED ON FRAME SYNCHRONIZATION, SERVER AND CLIENT" filed on Nov. 24, 2016, all of which are incorporated by reference in their entireties.

FIELD OF THE TECHNOLOGY

The present disclosure relates to the field of data processing technologies, and specifically to a method for determining a recommended video, a data processing server, a system, an information display method, a terminal, a data processing method based on frame synchronization, a server and a client.

BACKGROUND OF THE DISCLOSURE

With rise of network applications of types such as a game and simulation, a user may obtain, by using a created virtual role, a plurality of experiences in a virtual scene provided by a network application. A virtual scene provided by some network applications (for example, an arena game of an MOBA type) may support participation of a plurality of users, and virtual roles of the plurality of users may enter the virtual scene in a manner such as matching or team forming, and carry out an activity in the virtual scene, for example, experience an arena.

Currently, by using a video technology in a virtual scene, a video for recording an activity of a virtual role in the virtual scene (which is briefly referred to as a virtual scene video, where the virtual scene video is, for example, in a form of an arena battle video of a game) may be formed. For purpose of being skilled in a use manner of a network application objective, a user usually has a requirement for watching a current virtual scene video of another user. However, currently, the user may participate in a plurality of virtual scenes (for example, currently a plurality of game arena battles may exist simultaneously), and therefore how to determine a virtual scene video recommended to a user becomes a problem that needs to be considered.

SUMMARY

In view of this, embodiments of the present disclosure provide a method for determining a recommended video, a data processing server and a system, so as to determine a virtual scene video recommended to a user.

In order to achieve the foregoing objective, embodiments of the present disclosure provide the following technical solution:

According to a first aspect, an embodiment of the present disclosure provides a method for determining a recommended video performed at a computer server having one or more processors and memory storing programs to be executed by the one or more processors, the method comprising:

determining candidate virtual scenes, virtual roles existing in the candidate virtual scenes, and the virtual roles being manipulated by participating users;

selecting a target virtual scene from the candidate virtual scenes;

determining representation data of virtual roles of the target virtual scene;

selecting a target virtual role from the virtual roles of the target virtual scene according to the representation data of the virtual roles of the target virtual scene; and generating a recommended video at a viewing angle of the target virtual role in the target virtual scene.

By using the foregoing process, a target virtual scene in which a recommended video is located may be determined from virtual scenes in which users currently participate, and a recommended video is generated at a viewing angle of a target virtual role determined in the target virtual scene, to determine a virtual scene video recommended to a user, so that the recommended video has relatively high watching quality.

According to a second aspect, an embodiment of the present disclosure further provides a data processing computer server having one or more processors, memory coupled to the one or more processors, and a plurality of programs that, when executed by the one or more processors, cause the computer server to perform the aforementioned method for determining a recommended video.

For a beneficial effect of an implementation of the second aspect, refer to a beneficial effect of the method corresponding to the first aspect.

According to a third aspect, an embodiment of the present disclosure further provides a non-transitory computer readable storage medium storing a plurality of instructions in connection with a computer server having one or more processors. The plurality of instructions, when executed by the one or more processors, cause the computer server to perform the aforementioned method for determining a recommended video.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other drawings from the provided accompanying drawings without creative efforts.

FIG. 36 is a schematic diagram of a process of entering a frame synchronization game scene according to an embodiment of the present disclosure;

FIG. 37 is a schematic diagram of a smoothing processing process according to an embodiment of the present disclosure;

FIG. 38-*a* is a schematic structural diagram of composition of a server according to an embodiment of the present disclosure;

FIG. 38-*b* is a schematic structural diagram of composition of an obtaining module according to an embodiment of the present disclosure;

FIG. 39-*a* is a schematic structural diagram of composition of a second client according to an embodiment of the present disclosure;

FIG. 39-*b* is a schematic structural diagram of composition of a scene loading module according to an embodiment of the present disclosure;

FIG. 39-*c* is a schematic structural diagram of composition of a display module according to an embodiment of the present disclosure;

FIG. 39-*d* is a schematic structural diagram of composition of a delay display module according to an embodiment of the present disclosure;

FIG. 39-*e* is a schematic structural diagram of composition of another display module according to an embodiment of the present disclosure;

FIG. 40 is a schematic structural diagram of composition of a terminal to which a data processing method based on frame synchronization is applied according to an embodiment of the present disclosure.

DESCRIPTION OF EMBODIMENTS

The following clearly and completely describes the technical solutions in the embodiments of the present disclosure with reference to the accompanying drawings in the embodiments of the present disclosure. Obviously, the described embodiments are only some embodiments instead of all embodiments of the present disclosure. All other embodiments obtained by a person of ordinary skill in the art based on the embodiments in the present disclosure without creative effects shall fall within the protection scope of the present disclosure.

Figure 1:
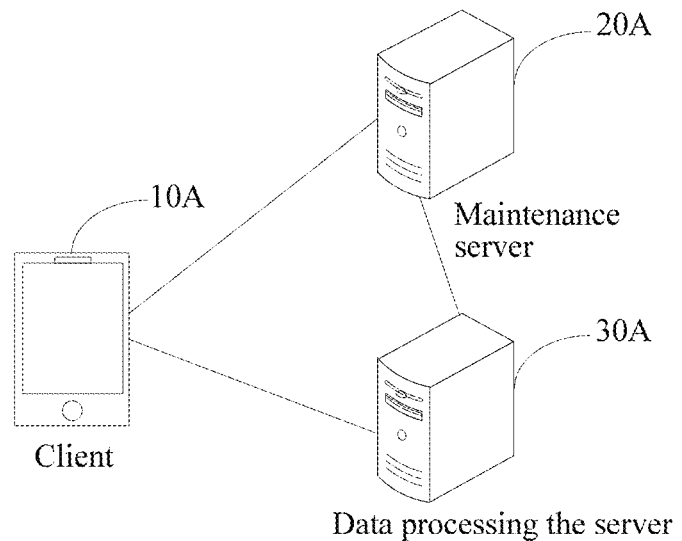
FIG. 1 is an architectural diagram of a system for implementing a method for determining a recommended video according to an embodiment of the present disclosure.

FIG. 1 shows an architecture of a system for implementing a method for determining a recommended video according to an embodiment of the present disclosure. Referring to FIG. 1, the system may include: a client 10A, a maintenance server 20A and a data processing server 30A.

The client 10A may be installed onto user equipment such as a smartphone, a tablet computer, or a notebook computer, and provide a local service to a network application; and the client 10A may enable, when a user requests to enter a virtual scene, a virtual role of the user to enter the virtual scene by loading the virtual scene.

The maintenance server 20A is a service device in a server cluster to which the network application belongs, and is set up on a network side; and the maintenance server 20A may maintain, when a plurality of users respectively requests to enter virtual scenes by using respective clients 10A, activities of virtual roles of the plurality of users (a user usually controls a virtual role) in the virtual scenes, and record representation of the virtual roles in the virtual scenes; and representation of a virtual role is usually determined by an operation of a user, and a more proficient operation of the user usually indicates better representation of the virtual role of the user in a virtual scene.

In a possible implementation, the maintenance server may maintain a plurality of virtual scenes, these virtual scenes may be virtual scenes of a same scene content, but provided that participating users are different, these virtual scenes may be considered as different virtual scenes.

The data processing server 30A is a service device in the server cluster to which the network application belongs, is set up on the network side, and may be used to perform data processing. The data processing server 30A may determine, in a data processing manner, a virtual scene corresponding to a recommended video from virtual scenes in which users currently participate, and generate the recommended video at a viewing angle of a virtual role in the virtual scene, to perform video recommendation.

Figure 2:
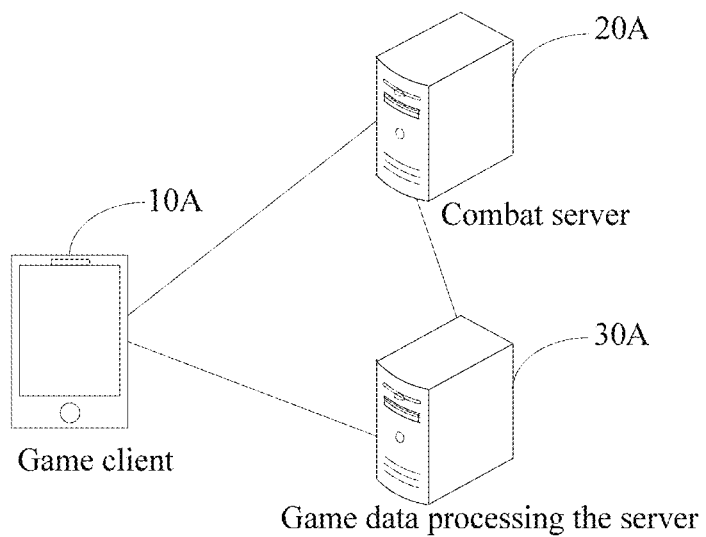
FIG. 2 is a diagram of a system architecture under a game background according to an embodiment of the present disclosure.

This embodiment of the present disclosure may be applied to a game of an MOBA (Multiplayer Online Battle Arena) type, to recommend an arena battle video to a user when a plurality of arena battles currently exists. Correspondingly, a form of the system shown in FIG. 1 under a game background may be shown in FIG. 2. The client 10A may be a game client, the maintenance server 20A may be a combat server, and the data processing server 30A may be a game data processing server; and correspondingly, a virtual scene may be a game arena scene of a game.

After a user requests a game arena and finds an arena opponent of the user through matching, the game client may be loaded with a game arena scene; correspondingly, a game role manipulated by the user is to enter the game arena scene, and participates in an arena battle; and an arena battle usually corresponds to a game arena scene.

The combat server may maintain a plurality of arena battles, and an arena battle may be maintained by maintaining game roles of a plurality of users to perform a combat in a game arena scene; and moreover, the combat server may further record representation of a user in each arena battle, that is, record game data of a game role manipulated by a user in the game arena scene.

The game data processing server may be used to perform game data processing, determine an arena battle of a recommended video from the plurality of current arena battles, and generate the recommended video at a viewing angle of a game role in the game arena scene in the arena battle, to perform video recommendation.

Figure 3:
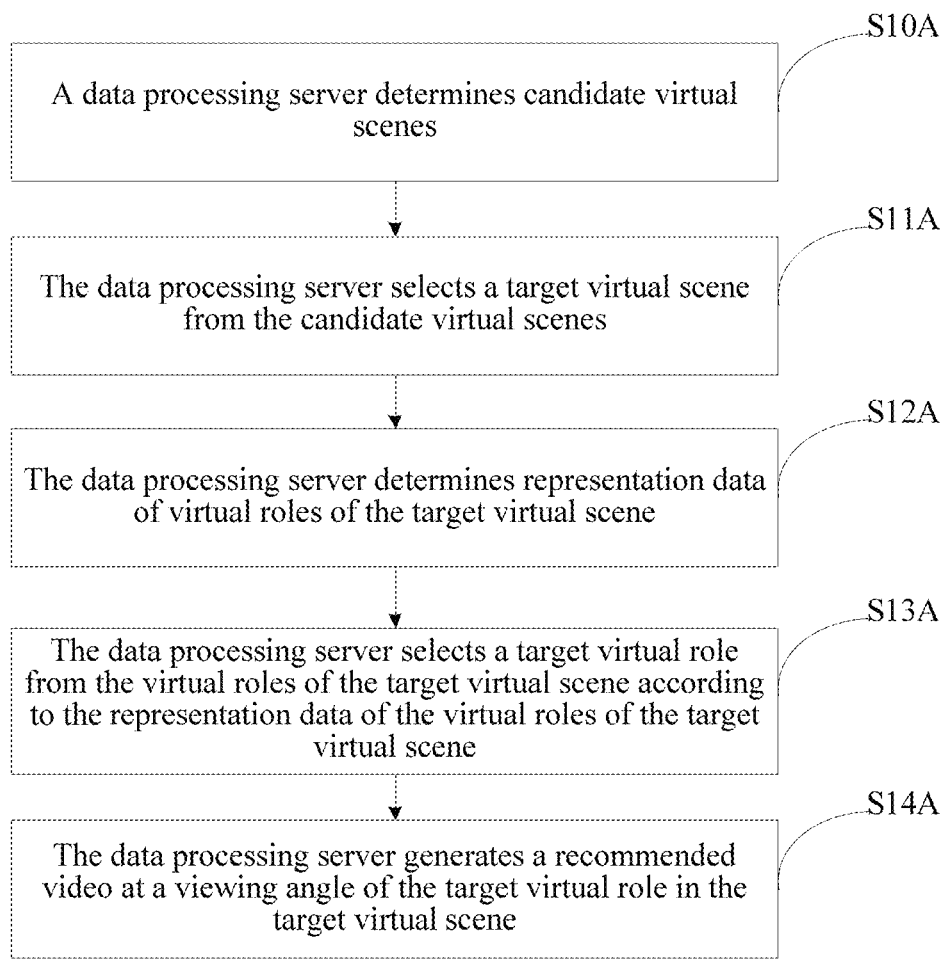
FIG. 3 is a flowchart of a method for determining a recommended video according to an embodiment of the present disclosure.

In this embodiment of the present disclosure, a recommended video may be determined by the data processing server shown in FIG. 1. From the perspective of the data processing server, FIG. 3 is a flowchart of a method for determining a recommended video according to an embodiment of the present disclosure. The method may be applied to a data processing server, and referring to FIG. 3, the method may include the following steps:

Step S10A. The data processing server determines candidate virtual scenes.

In a possible implementation, the candidate virtual scenes may be virtual scenes in which users currently participate.

The data processing server may determine virtual scenes in which users participate and that are currently maintained by the maintenance server, and determine the virtual scenes in which the users currently participate as the candidate virtual scenes. In some application scenarios, a user may control an activity of a virtual role in a virtual scene, that is, a user may correspond to a virtual role in a candidate virtual scene; and in some other application scenarios, a user may simultaneously control activities of a plurality of virtual roles in a virtual scene, that is, a user may correspond to a plurality of virtual roles in a candidate virtual scene.

In a possible implementation, in this embodiment of the present disclosure, a specified type of virtual scenes in which users currently participate may be determined as candidate virtual scenes; for example, using a game arena background as an example, in this embodiment of the present disclosure, an arena battle that is currently being performed may be determined from arena battles whose arena levels reach a specified level, thereby using a game arena scene of the determined arena battle as a candidate virtual scene.

In a possible implementation, the maintenance server may add identifiers to virtual scenes in which users currently participate, and virtual scenes that are of a same type but in which participating users are different are considered as different virtual scenes, so that the maintenance server may send the identifiers of the virtual scenes in which the users currently participate to the data processing server; and correspondingly, a data server may determine, based on the identifiers of the virtual scenes, candidate virtual scenes in which the users currently participate.

Moreover, in addition to the foregoing manner in which the maintenance server actively sends the identifiers of the virtual scenes in which the users currently participate to the data processing server, the data processing server may request, from the maintenance server, the identifiers of the virtual scenes in which the users currently participate.

Step S11A. The data processing server selects a target virtual scene from the candidate virtual scenes.

The target virtual scene is a virtual scene corresponding to a recommended video.

It may be understood that, in this embodiment of the present disclosure, a screening condition of the target virtual scene may be defined, thereby screening out the target virtual scene satisfying the screening condition from the candidate virtual scenes.

In an exemplary implementation, the screening condition of the target virtual scene may be that, user characteristics of participating users in the virtual scene all conform to a specified user characteristic. Correspondingly, in this embodiment, the target virtual scene in which user characteristics of participating users all conform to the specified user characteristic may be selected from the candidate virtual scenes.

In an example, user characteristics of participating users in a virtual scene may be recorded in a user database, and after determining identifiers of the candidate virtual scenes, the data processing server may determine user identifiers of the participating users corresponding to the identifiers, thereby retrieving corresponding user characteristics from the user database based on the user identifiers; and the user identifiers of the participating users corresponding to the identifiers of the candidate virtual scenes indicate identifiers of users participating in the candidate virtual scenes, and may be recorded by the maintenance server and then sent to the data processing server.

In a possible implementation, to recommend a high-quality virtual scene video to a user, in this embodiment, a user level may be set to an optional representation form of a user characteristic, and a virtual scene in which levels of participating users all reach a specified level is determined as the target virtual scene. Usually, a user whose level is higher has better representation in a virtual scene. Therefore, in this embodiment of the present disclosure, a virtual scene in which the levels of the participating users all reach a specified level may be set to the target virtual scene, virtual scenes in which levels of not all participating users reach the specified level are excluded from the candidate virtual scenes, thereby achieving an objective of recommending a high-quality video to a user.

Additionally, a geographic location of a user may also be an optional representation form of a user characteristic. A user may pay more attention to a virtual scene video in which a nearby user participates. In this embodiment, a virtual scene in which geographic locations of participating users all fall within a specified geographic location range of users requesting to watch a video may be determined as the target virtual scene, thereby excluding, from the candidate virtual scenes, virtual scenes in which geographic locations of participating users do not fall within the specified geographic location range of users requesting to watch a video, to achieve an objective of recommending the virtual scene video in which the nearby user participates to the user.

In another exemplary implementation, the screening condition of the target virtual scene may also be that, a running state of a virtual scene conforms to a specified running state. Correspondingly, in this embodiment, running states of the candidate virtual scenes may be recorded by the maintenance server and then sent to the data processing server, and the data processing server may select, from the candidate virtual scenes, the target virtual scene whose running state conforms to the specified running state.

In actual application, only after time for which a user participates in a virtual scene reaches a particular time, a virtual scene video formed based on an activity of the user in the virtual scene has a watching meaning. Therefore, in this embodiment of the present disclosure, a virtual scene video whose running time reaches a specified running time may be recommended to the user. In this embodiment, a user participation time corresponding to a virtual scene (for example, a running time of an arena battle) may be set to a representation form of a running state of the virtual scene, so that the data processing server may determine a virtual scene whose user participation time reaches a specified time as the target virtual scene, and exclude, from the candidate virtual scenes, a virtual scene whose user participation time does not reach the specified time.

The foregoing form of the screening condition of the target virtual scene is only exemplary, and a specific screening condition may be adjusted according to an actual video recommendation requirement. In a possible implementation, the screening condition of the target virtual scene may be specified by operational personnel, or may be sent by a user requesting to watch a video to the data processing server by using a client.

Step S12A. The data processing server determines representation data of virtual roles of the target virtual scene.

After determining the target virtual scene, the data processing server may obtain representation data of virtual roles in the target virtual scene from the maintenance server, and a virtual role is usually controlled by a user participating in the virtual scene, that is, a virtual role corresponds to a user.

Step S13A. The data processing server selects a target virtual role from the virtual roles of the target virtual scene according to the representation data of the virtual roles of the target virtual scene.

In a possible implementation, the target virtual role may be a virtual role whose representation in the target virtual scene satisfies a specified recommendation condition, for example, a virtual role whose representation data in the target virtual scene is optimal, or a virtual role whose representation data in a specified representation dimension is optimal.

A representation dimension is a factor for measuring representation of a virtual role in a virtual scene. For example, using a game arena as an example, a representation dimension may be a slaying quantity, an assist quantity and the like of a game role in an arena battle.

Step S14A. The data processing server generates a recommended video at a viewing angle of the target virtual role in the target virtual scene.

A virtual scene may have a plurality of virtual roles, viewing angles of the virtual roles in the virtual scene are different, and reflected video contents are also different. After the target virtual role in the target virtual scene is determined, because an activity of the target virtual role in the target virtual scene has a watching value, in this embodiment of the present disclosure, a recommended video may be generated at the viewing angle of the target virtual role in the target virtual scene, to determine the recommended video.

In a possible implementation, not only the activity of the target virtual role in the target virtual scene has a watching value, but also a manipulation process of a user for the target virtual role also has a watching value. Therefore, the data processing server may further determine, according to the target virtual role, a participating user manipulating the target virtual role, and generate a recommended video at a viewing angle of the participating user, to determine the recommended video.

Based on the method for determining a recommended video provided in this embodiment, the candidate virtual scenes in which users currently participate may be determined, the target virtual scene is screened out from the candidate virtual scenes, and the target virtual role for generating a recommended video is determined by using representation data of virtual roles in the target virtual scene, thereby generating the recommended video at the viewing angle of the target virtual role in the target virtual scene, to determine the recommended video. Based on the method for determining a recommended video provided in this embodiment of the present disclosure, a target virtual scene in which a recommended video is located may be determined from virtual scenes in which users currently participate, and a recommended video is generated at a viewing angle of a target virtual role determined in the target virtual scene, to determine a virtual scene video recommended to a user, so that the recommended video has relatively high watching quality.

Figure 4:
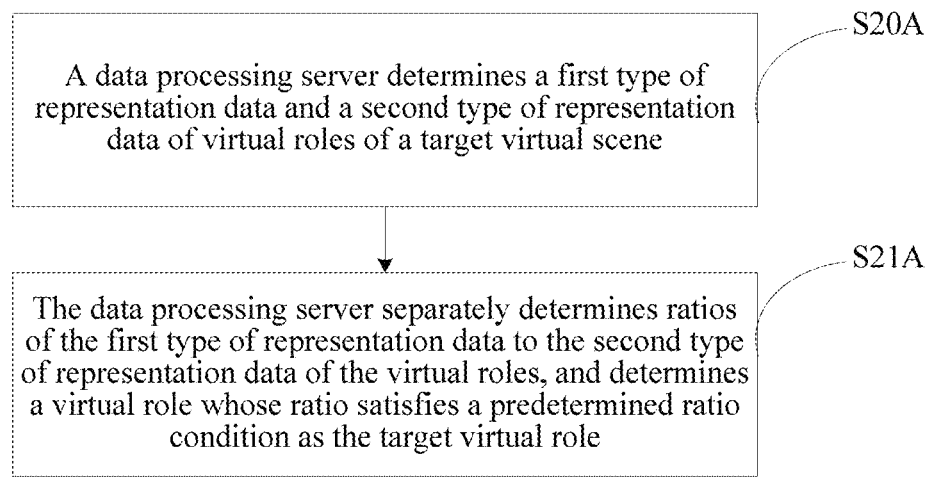
FIG. 4 is a flowchart of a method for determining a target virtual role according to an embodiment of the present disclosure.

In an example, after determining representation data of virtual roles in the target virtual scene, the data processing server may determine, by analyzing positive representation data and negative representation data of the virtual roles of the target virtual scene, the target virtual role whose representation is optimal. FIG. 4 is a flowchart of an optional method for determining a target virtual role. Referring to FIG. 4, the method may include the following steps:

Step S20A. A data processing server determines a first type of representation data and a second type of representation data of virtual roles of a target virtual scene.

In a possible implementation, a data type of the first type of representation data may be opposite to that of the second type of representation data, for example, representation of a virtual role in a virtual scene indicated by the first type of representation data is opposite to that indicated by the second type of representation data. The first type of representation data may be data corresponding to positive representation of a virtual role in a virtual scene (that is, positive representation data); and using an arena game as an example, the first type of representation data may be a quantity of times of slaying opponents by a game role in an arena battle (that is, slaying quantity), a quantity of times of assisting a teammate in slaying opponents (that is, an assist quantity) and the like. The second type of representation data may be data corresponding to negative representation of a virtual role in a virtual scene (that is, negative representation data); and using an arena game as an example, the second type of representation data may be a quantity of death times of a game role in an arena battle and the like.

Step S21A. The data processing server separately determines ratios of the first type of representation data to the second type of representation data of the virtual roles, and determines a virtual role whose ratio satisfies a predetermined ratio condition as the target virtual role.

For the virtual roles of the target virtual scene, a ratio of the first type of representation data to the second type of representation quantity of a virtual role indicates a ratio of positive representation to negative representation of the virtual role, and a higher ratio indicates better representation of the virtual role in the virtual scene. Therefore, in this embodiment, the representation of the virtual role in the virtual scene may be indicated by using the ratio, a predetermined ratio condition (for example, the ratio is highest) is set, and a virtual role whose ratio satisfies the predetermined ratio condition is determined as the target virtual role.

In a possible implementation, a quantity of target virtual roles determined in a target virtual scene may be at least one. For example, using an arena game as an example, in this embodiment, a slaying quantity, an assist quantity and a death quantity of each game role in the target virtual scene may be determined; and for each game role, a sum of a slaying quantity and an assist quantity of the game role is used as the first type of representation data, a death quantity of the game role is used as the second type of representation data, the first type of representation data is divided by the second type of representation data, to obtain a ratio reflecting representation of the game role in the target virtual scene, and if the ratio is higher, it indicates that the representation of game role in the target virtual scene is better.

Based on the method shown in FIG. 4, in this embodiment, the target virtual role whose representation conforms to the specified recommendation condition in the target virtual scene may be determined based on representation data of virtual roles in the target virtual scene, to provide a basis for determining a recommended video.

Obviously, the method shown in FIG. 4 is only an optional manner of analyzing representation of virtual roles in the target virtual scene, and is not unique. In this embodiment, virtual article obtaining quantities of the virtual roles of the target virtual scene (for example, gold coin obtaining quantities of game roles in the game arena scene) may also be analyzed, to determine the target virtual role whose virtual article obtaining quantity reaches a threshold (for example, an average value of the virtual article obtaining quantities corresponding to all the virtual roles in the target virtual scene) and whose ratio shown in FIG. 4 conforms to the predetermined ratio condition.

In a possible implementation, after the recommended video is generated at the viewing angle of the target virtual role in the target virtual scene, in this embodiment, the role identifier of the target virtual role (for example, the role name of the game role) and the user identifier of a user corresponding to the target virtual role (for example, the user name corresponding to the game role) may be determined. Moreover, the recommended video is recommended to the video recommendation interface, and the role identifier of the target virtual role and the user identifiers of the user corresponding to the target virtual role are presented in the video recommendation interface. An implementation of recommending the recommended video to the video recommendation interface may be recommending a video address of the recommended video to the video recommendation interface. Therefore, the data processing server may broadcast the video recommendation interface to the user requesting to watch the video, so that after the user requesting to watch the video clicks a recommended video, the data processing server may push the corresponding recommended video to the client of the user according to the video address of the recommended video. Correspondingly, the user may watch the recommended video on the client.

Figure 5:
FIG. 5 is a schematic diagram of a video recommendation interface under a game background according to an embodiment of the present disclosure.

In a possible implementation, a plurality of recommended videos may be presented in the video recommendation interface. In this embodiment, a recommendation area may be set for each recommended video in the video recommendation interface, and information such as the role identifier of the target virtual role corresponding to the recommended video (for example, the role name) or the user identifiers of a user corresponding to the target virtual role (for example, the user name) is presented in the recommendation area. Referring to FIG. 5, FIG. 5 is a schematic diagram of a video recommendation interface under a game background.

Additionally, the quantity of videos recommended in the video recommendation interface may have a video recommendation limit number, and the video recommendation limit number corresponds to a quantity of recommendation areas of the video recommendation interface. If the quantity of currently recommended videos in the video recommendation interface reaches the video recommendation limit number, the recommended video newly determined by the data processing server cannot be temporarily added to the video recommendation interface. Only when the quantity of currently recommended videos in the video recommendation interface is less than the video recommendation limit number (that is, the video recommendation interface has an idle recommendation area), the newly determined recommended video may be added to the video recommendation interface.

In an example, in this embodiment, a video recommendation pool in which the quantity of recommendation locations corresponds to the quantity of recommendation areas in the video recommendation interface may be set, and the currently recommended video in the video recommendation interface corresponds to the recommended video added to the video recommendation pool. For example, the recommended video presented in the video recommendation interface may be implemented by retrieving the recommended video from the video recommendation pool. In an implementation, after determining the new recommended video, the data processing server may judge whether the video recommendation pool has an idle recommendation location. If no, it indicates that the quantity of currently recommended video in the video recommendation interface reaches the video recommendation limit number, and before the video recommendation pool has an idle recommendation location, the data processing server needs to wait to add the recommended video to the video recommendation pool, so as to perform recommendation in the video recommendation interface. If yes, the data processing server may add the recommended video to the video recommendation pool without waiting, so as to recommend the recommended video in the video recommendation interface.

Figure 6:
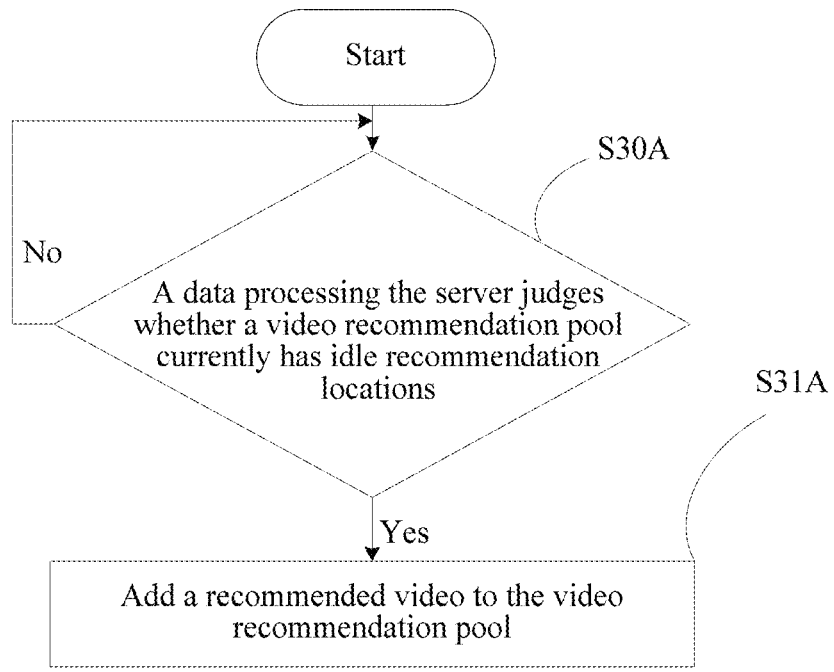
FIG. 6 is a flowchart of a method for adding a recommended video to a video recommendation interface according to an embodiment of the present disclosure.

FIG. 6 shows a process of a method for adding a recommended video to a video recommendation interface. The method may be applied to a data processing server, and referring to FIG. 6, the method may include the following steps:

Step S30A. The data processing server judges whether a video recommendation pool currently has an idle recommendation location; and if no, return to step S30A, or if yes, perform step S31A.

It should be noted that, the video recommendation pool maintains recommendation locations corresponding to a video recommendation limit number of the video recommendation interface, and a quantity of the current idle recommendation locations of the video recommendation pool corresponds to a recommendation quantity of current idle videos of the video recommendation interface.

It may be understood that, the video recommendation pool has an idle recommendation location because the video recommended in the video recommendation interface ends, or the target virtual role corresponding to the video recommended in the video recommendation interface exits the target virtual scene.

Step S31A. Add a recommended video to the video recommendation pool.

In an example, adding the recommended video to the video recommendation pool may be adding the video address of the recommended video to the video recommendation pool. It may be understood that, if the video recommendation interface presents the role identifier of the target virtual role and the user identifiers of the user corresponding to the target virtual role, the role identifier of the target virtual role and the user identifiers of the user corresponding to the target virtual role further need to be added to the video recommendation pool when the recommended video is added to the video recommendation pool.

In a possible implementation, when a user requesting to watch a video requests a video recommended in the video recommendation interface, the data processing server may add a watching user quantity of the video by 1, and when a user exits watching, the data processing server may subtract the watching user quantity of the video by 1, so that the data processing server may collect statistics on a quantity of currently watching users of videos recommended in the video recommendation interface, and present the quantity of currently watching users of the videos in a corresponding recommendation area in the video recommendation interface.

Figure 7:
FIG. 7 is another schematic diagram of a video recommendation interface under a game background according to an embodiment of the present disclosure.

Additionally, the data processing server may further periodically update the quantity of currently watching users of the videos recommended in the video recommendation interface. Referring to FIG. 7 for understanding, FIG. 7 is another schematic diagram of a video recommendation interface under a game background.

It may be understood that, a video with a larger quantity of currently watching users indicates that the video is more popular. Therefore, the videos recommended in the video recommendation interface may be ranked according to quantities of currently watching users, and a video with a larger quantity of currently watching users is arranged close to the top, that is, if a recommended video has a larger quantity of currently watching users, the recommended video is ranked closer to the top.

Additionally, the videos recommended in the video recommendation interface may also be ranked according to time lengths for which the videos join the video recommendation interface, that is, if a time length is longer, a video is ranked closer to the top, or if a time length is shorter, a video is ranked farther away from the top.

Moreover, the video recommended in the video recommendation interface may also be determined according to a requirement of a user requesting to watch a video. For example, a video preferred by users may be ranked close to the top according to video preferences of users requesting to watch a video; and for another example, intimacy between users of target virtual roles corresponding to the videos and users requesting to watch a video may be analyzed, and the videos are ranked in the video recommendation interface according to the intimacy.

After the data processing server adds the recommended video to the video recommendation interface to perform recommendation, to enable participating users in the target virtual scene to learn that a recommended user exists in the target virtual scene, so that the participating users in the target virtual scene can more actively control virtual roles to perform, the data server may send, to the participating users in the target virtual scene, notification information indicating that the user corresponding to the target virtual role is recommended to the video recommendation interface.

Figure 8:
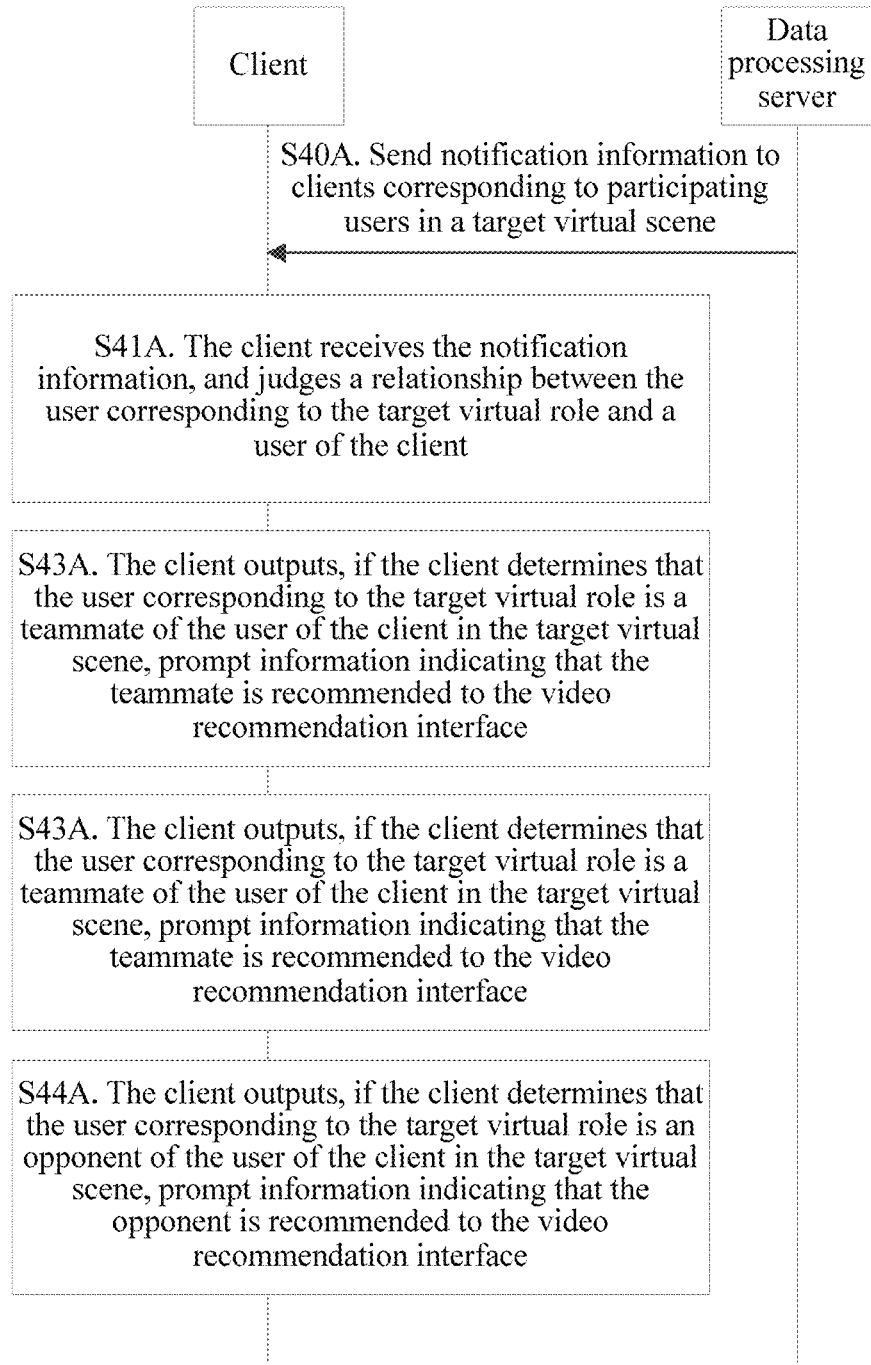
FIG. 8 is a diagram of a signaling process of sending notification information according to an embodiment of the present disclosure.

Referring to FIG. 8, FIG. 8 shows a diagram of a signaling process of sending notification information to a client by a data processing server. The process may include the following steps:

Step S40A. The data processing server sends notification information to clients corresponding to participating users in a target virtual scene, the notification information being used to indicate that a user corresponding to a target virtual role is recommended.

The notification information may be used to specifically indicate that the user corresponding to the target virtual role is recommended to the video recommendation interface.

Step S41A. The client receives the notification information, and then judges a relationship between the user corresponding to the target virtual role and a user of the client.

It may be understood that, the relationship between the user corresponding to the target virtual role and the user of the client may be: a same user, a teammate relationship in the target virtual scene, an opponent relationship in the target virtual scene and the like.

In an example, the notification information may carry the identifier of the user corresponding to the target virtual role; and after the user of the client participates in the target virtual scene, the client may obtain an identifier of a user in the teammate relationship with the user of the client and an identifier of a user in the opponent relationship with the user of the client in the target virtual scene, thereby performing matching between the identifier of the user corresponding to the target virtual role and each of the identifier of the user of the client, an identifier of a user in the teammate relationship with the user of the client and an identifier of a user in the opponent relationship with the user of the client.

If matching between the identifier of the user corresponding to the target virtual role and the identifier of the user of the client is successful, the user corresponding to the target virtual role may be determined as the user of the client; If matching between the identifier of the user corresponding to the target virtual role and an identifier of a user in the teammate relationship with the user of the client is successful, the user corresponding to the target virtual role may be determined as a teammate of the user of the client; and If matching between the identifier of the user corresponding to the target virtual role and an identifier of a user in the opponent relationship with the user of the client is successful, the user corresponding to the target virtual role may be determined as an opponent of the user of the client.

Step S42A. The client outputs, if the client determines that the user corresponding to the target virtual role is the user of the client, prompt information indicating that a local user is recommended to a video recommendation interface.

Figure 9:
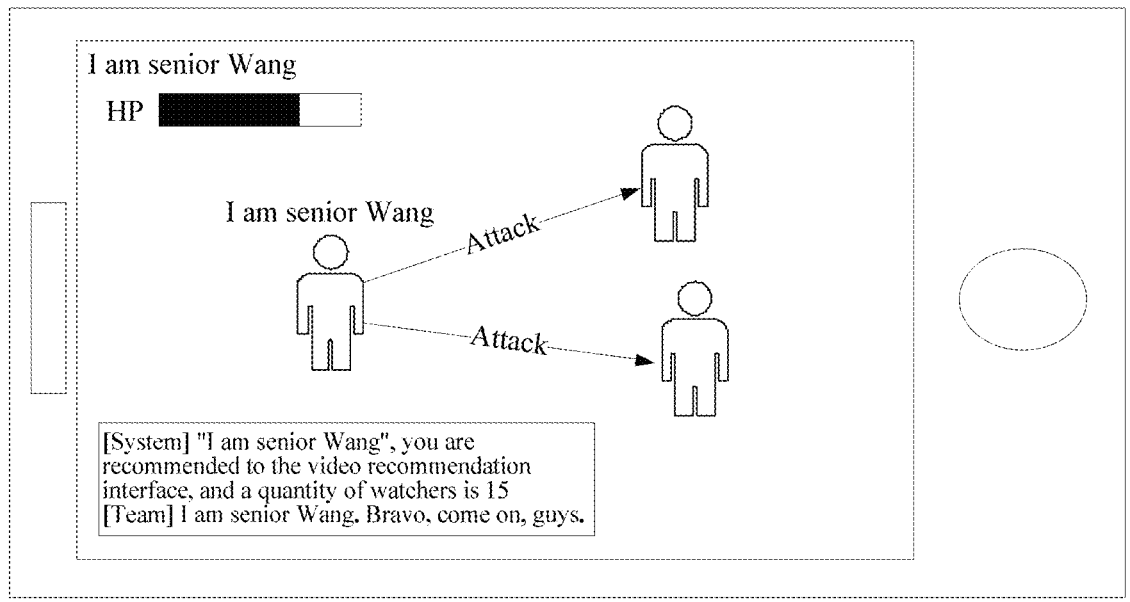
FIG. 9 is a schematic diagram of outputting prompt information by a client according to an embodiment of the present disclosure.

Using a game background as an example, FIG. 9 shows a schematic diagram of outputting, by a client, prompt information indicating that a local user is recommended to a video recommendation interface. When confirming that a local user is recommended, the client may output, in a game interface, the corresponding prompt information to the user for viewing.

Step S43A. The client outputs, if the client determines that the user corresponding to the target virtual role is a teammate of the user of the client in the target virtual scene, prompt information indicating that the teammate is recommended to the video recommendation interface.

Figure 10:
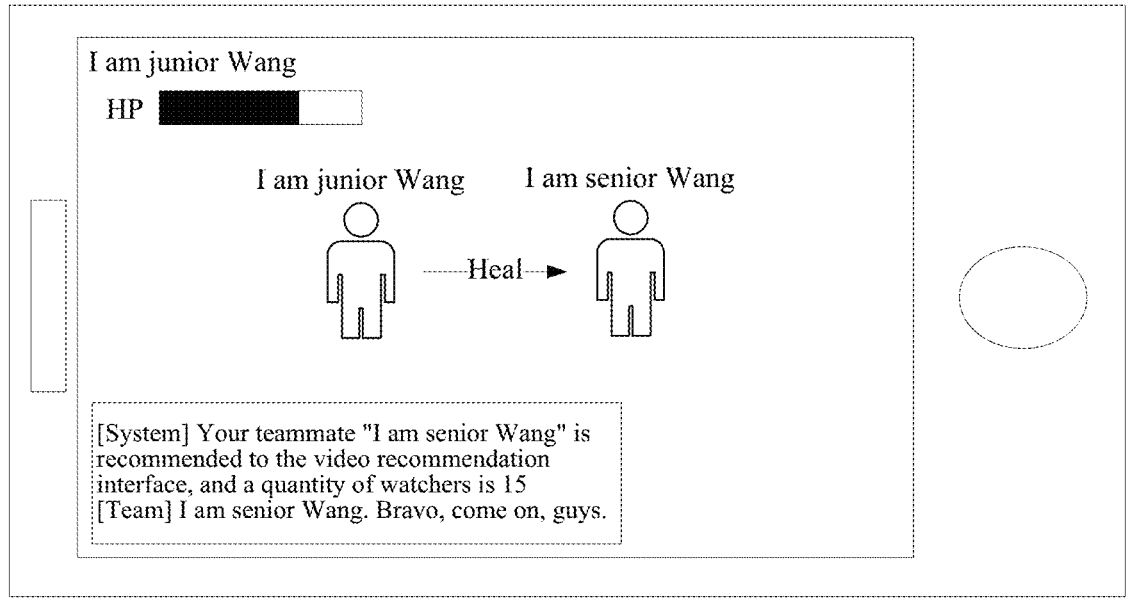
FIG. 10 is another schematic diagram of outputting prompt information by a client according to an embodiment of the present disclosure.

Likewise, using a game background as an example, FIG. 10 shows a schematic diagram of outputting, by a client, prompt information indicating that a teammate is recommended to a video recommendation interface. When confirming that a teammate of a local user is recommended, the client may output, in a game interface, the corresponding prompt information to the user for viewing.

Step S44A. The client outputs, if the client determines that the user corresponding to the target virtual role is an opponent of the user of the client in the target virtual scene, prompt information indicating that the opponent is recommended to the video recommendation interface.

Figure 11:
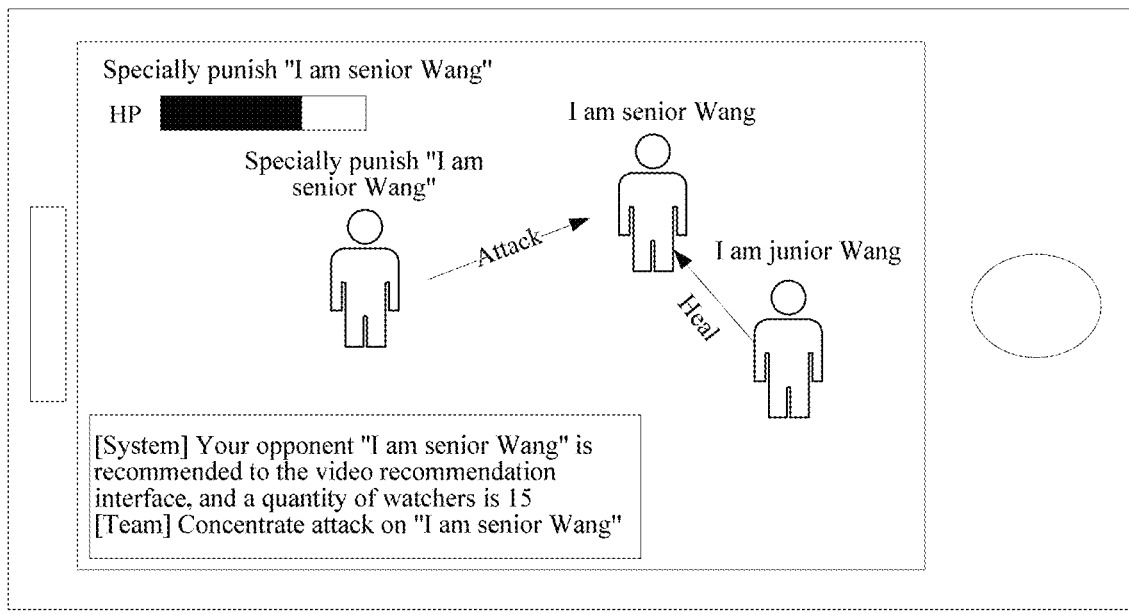
FIG. 11 is still another schematic diagram of outputting prompt information by a client according to an embodiment of the present disclosure.

Still using a game background as an example, FIG. 11 shows a schematic diagram of outputting, by a client, prompt information indicating that an opponent is recommended to a video recommendation interface. When confirming that an opponent of a local user is recommended, the client may output, in a game interface, the corresponding prompt information to the user for viewing.

It should be noted that, step S42A, step S43A and step S44A are different processing indications corresponding to different relationships between the user corresponding to the target virtual role and the user of the client. Step S42A, step S43A and step S44A may be in parallel, and are not performed in a time order.

Additionally, as shown in FIG. 9, FIG. 10 and FIG. 11, the data processing server may further send the quantity of currently watching users of the recommended video to clients corresponding to the participating users of the target virtual scene, so that when outputting the prompt information, the clients corresponding to the participating users of the target virtual scene may carry information about the quantity of currently watching users of the recommended video.

In an example, the data server may periodically send the quantity of currently watching users of the recommended video to the client of the participating users corresponding to the target virtual scene, so that the clients refresh the quantity of currently watching users of the recommended video at a frequency, and prompt the refreshed quantity to the users of the client.

In another example, the data processing server may periodically update the quantity of currently watching users of the recommended video, and send the updated quantity of currently watching users to the clients of the participating users of the target virtual scene, so that the clients of the participating users of the target virtual scene periodically refresh the quantity of currently watching users of the recommended video, and present the refreshed quantity to the users of the clients.

By using the method shown in FIG. 8, the participating users of the target virtual scene are enabled to learn that a recommended video exists in the target virtual scene, so that the participating users in the target virtual scene can more actively control virtual roles to perform, to improve watching quality of the recommended video, and then achieve an objective of recommending a high-quality video to a user requesting to watch a video.

An arena game of an MOBA type is used as an example below. By using the method for determining a recommended video provided in the embodiments of the present disclosure, when an activity such as an online arena game or match is held, a high-quality arena game video may be recommended to a user in the video recommendation interface of the game.

Figure 12:
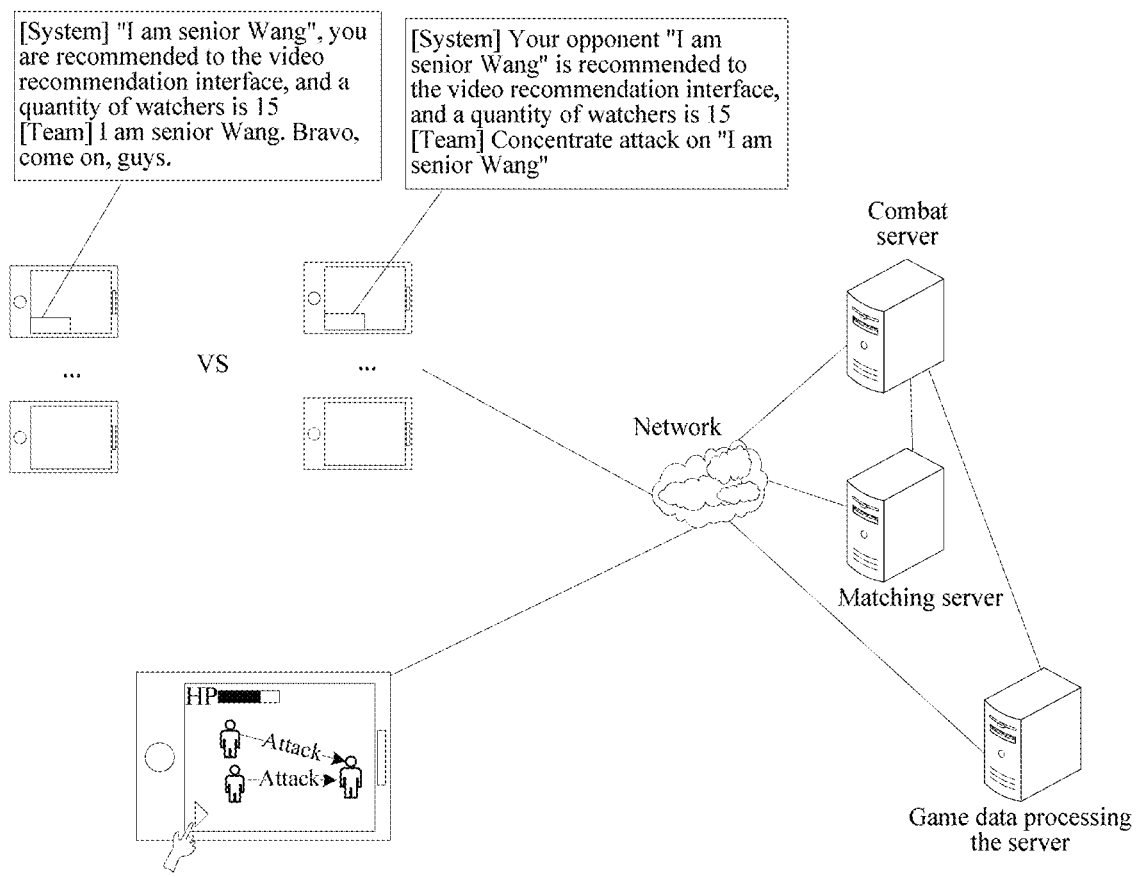
FIG. 12 is a schematic diagram of an application in a game arena scene according to an embodiment of the present disclosure.

As shown in FIG. 12, FIG. 12 is a schematic diagram of an application in a game arena scene according to an embodiment of the present disclosure. When matching is performed on an arena battle, arena matching may be performed between game clients. After matching is successful, game clients of camps may be loaded with the game arena scene, and game roles of the game clients of the camps correspondingly enter the game arena scene to perform an arena game.

A combat server may maintain arena battles, and record representation data of the game roles in the game arena scene in the arena battles.

The game data processing server may determine, according to a particular type of arena battle maintained by the combat server current (for example, an arena battle of a match type, an arena battle of a user ranking type and the like), a particular type of arena battle that is currently being performed, thereby determining candidate arena battles (an arena battle corresponds to a game arena scene).

The game data processing server determines, according to user levels of participating users of the candidate arena battles, a target arena battle in which the levels of the participating users all reach a specified level (the target arena battle corresponds to a target game arena scene).

The game data processing server may retrieve, from representation data of each game role of the target arena battle, a slaying quantity, an assist quantity, and a death quantity of each game role of the target arena battle; and divide a sum of the slaying quantity and the assist quantity of each game role by the death quantity, to determine a ratio indicating representation of a game role in the target arena battle.

The game data processing server determines, as a target game role, a game role whose gold coin obtaining quantity reaches an average value of gold coin obtaining quantities of the target arena battle and whose ratio is largest, so as to generate a recommended video at a viewing angle of the target game role in the target game arena scene.

After generating the recommended video, the game data processing server may judge whether the video recommendation pool has idle recommendation locations. If yes, the game data processing server may add the recommended video, the role name of the target game role, and the user name corresponding to the target game role to the video recommendation pool, thereby recommending the recommended video in the video recommendation interface.

After a user requests to watch the recommended video recommended in the video recommendation interface, the game data processing server may add the quantity of currently watching users of the recommended video by 1, and if a user exits watching, the quantity of currently watching users of the recommended video is subtracted by 1. A game data server may periodically update the quantity of currently watching users of the recommended video.

Moreover, the game data server may further notify a message indicating that the user of the target game role is recommended to the video recommendation interface, and the quantity of currently watching users of the recommended video periodically updated by the game data server to users of the target arena battle.

After the user of the target arena battle receives, by using the game client, the notification information sent by the game data server, if it is judged that the user of the target game role is a local user, the prompt information indicating that the local user is recommended and the quantity of currently watching users of the recommended video is output in the game interface. In an implementation, the prompt information may be output on a system chat channel of the game.

If the game client judges that the user of the target game role is a teammate of the local user, prompt information indicating that the teammate is recommended and the quantity of currently watching users of the recommended video is output in the game interface.

If the game client judges that the user of the target game role is an opponent of the local user, prompt information indicating that the opponent is recommended and the quantity of currently watching users of the recommended video is output in the game interface.

In an implementation, interaction between the combat server, the game data processing server and the game client may be forwarded by using an access server in the server cluster.

In this embodiment, a high-quality arena battle video that is currently being performed may be determined and recommended. The recommended user, and a teammate and an opponent of the recommended user can all perceive, by using prompts of respective clients, that the recommended user exists in the current arena battle, thereby increasing competition and confrontation of an arena battle, further improving quality of the recommended video, and also improving a probability of clicking the recommended video.

A data processing server provided in an embodiment of the present disclosure is described below, and cross reference may be performed between the data processing server described below and the content of the method described above. The content of the data processing server described below may be considered as a functional module architecture of the data processing server that needs to be set to implement the video recommendation method provided in the embodiments of the present disclosure.

Figure 13:
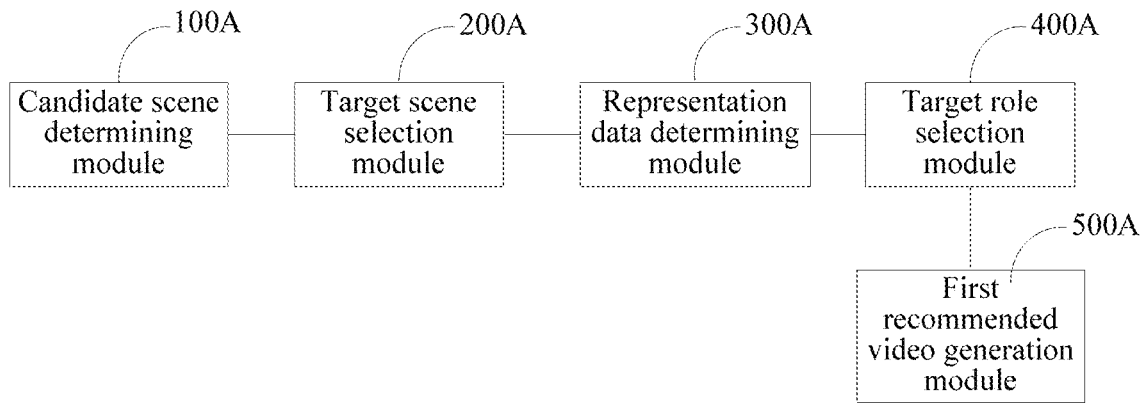
FIG. 13 is a structural block diagram of a data processing server according to an embodiment of the present disclosure.

FIG. 13 is a structural block diagram of a data processing server according to an embodiment of the present disclosure. Referring to FIG. 13, the data processing server may include:

a candidate scene determining module 100A, configured to determine candidate virtual scenes, virtual roles existing in the candidate virtual scenes, and the virtual roles being manipulated by participating users;

a target scene selection module 200A, configured to select a target virtual scene from the candidate virtual scenes;

a representation data determining module 300A, configured to determine representation data of virtual roles of the target virtual scene;

a target role selection module 400A, configured to select a target virtual role from the virtual roles of the target virtual scene according to the representation data of the virtual roles of the target virtual scene; and a first recommended video generation module 500A, configured to generate a recommended video at a viewing angle of the target virtual role in the target virtual scene.

In a possible implementation, the target role selection module 400A, configured to select a target virtual role from the virtual roles of the target virtual scene according to the representation data of the virtual roles of the target virtual scene, specifically includes:

a first determining unit, configured to determine a first type of representation data and a second type of representation data of the virtual roles of the target virtual scene, where a data type of the first type of representation data is opposite to that of the second type of representation data; and a second determining unit, configured to separately determine ratios of the first type of representation data to the second type of representation data of the virtual roles, and determine a virtual role whose ratio satisfies a predetermined ratio condition as the target virtual role.

In a possible implementation, the selecting, by a target scene selection module 200A, a target virtual scene from the candidate virtual scenes specifically includes:

selecting the target virtual scene in which user characteristics of participating users all conform to the specified user characteristic from the candidate virtual scenes; or selecting, from the candidate virtual scenes, the target virtual scene whose running state conforms to a specified running state.

Figure 14:
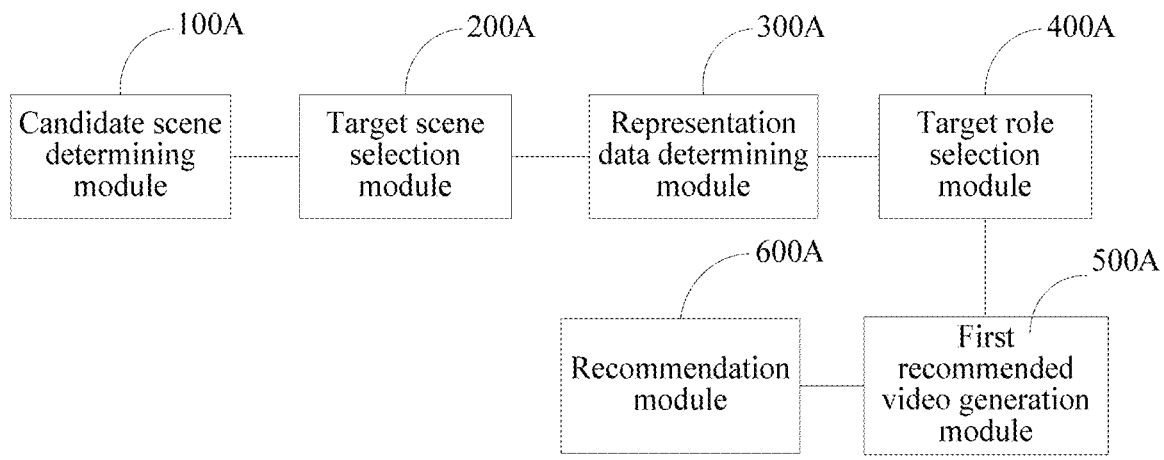
FIG. 14 is another structural block diagram of a data processing server according to an embodiment of the present disclosure.

Additionally, FIG. 14 shows another structure of a data processing server according to an embodiment of the present disclosure. Referring to FIG. 13 and FIG. 14, the data processing server may further include:

a recommendation module 600A, configured to recommend the recommended video to a video recommendation interface.

In a possible implementation, the recommendation module 600A, configured to recommend the recommended video to a video recommendation interface, specifically includes:

a judging unit, configured to judge whether a video recommendation pool currently has idle recommendation locations, where the video recommendation pool maintains recommendation locations corresponding to a video recommendation limit number of the video recommendation interface, and a quantity of the current idle recommendation locations of the video recommendation pool corresponds to a recommendation quantity of current idle videos of the video recommendation interface; and a recommended video addition unit, configured to add, if the video recommendation pool currently has idle recommendation locations, the recommended video to the video recommendation pool, to recommend the recommended video to the video recommendation interface.

In a possible implementation, the recommendation module 600A may be further configured to add a role identifier and a user identifier to the video recommendation pool when the recommended video is added to the video recommendation pool; and correspondingly, the video recommendation interface may present the role identifier and the user identifier.

Figure 15:
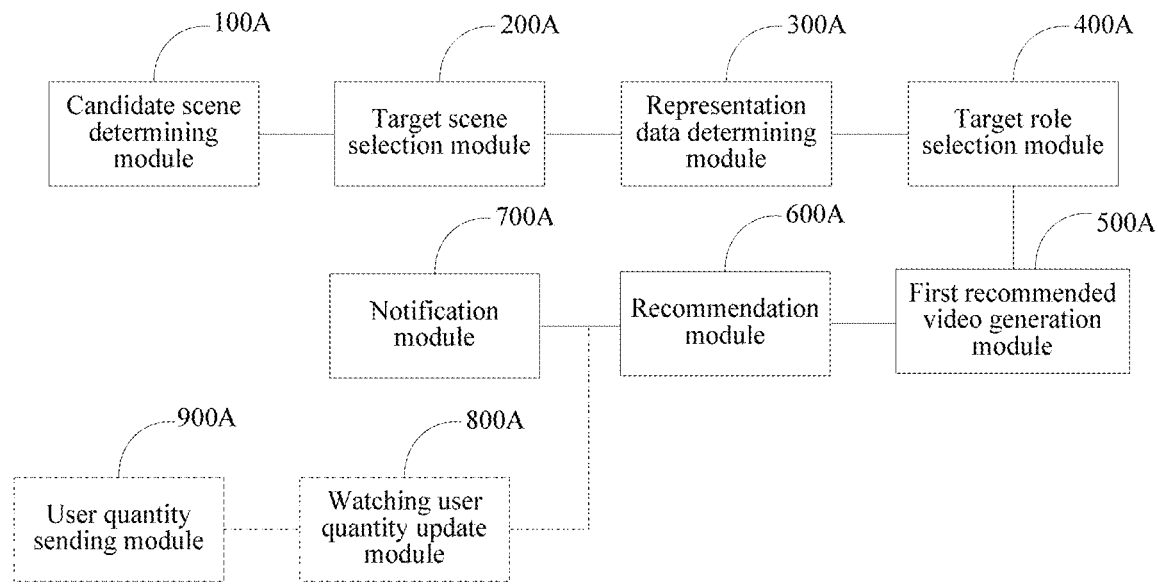
FIG. 15 is still another structural block diagram of a data processing server according to an embodiment of the present disclosure.

Additionally, FIG. 15 shows still another structure of a data processing server according to an embodiment of the present disclosure. Referring to FIG. 13 and FIG. 15, the data processing server may further include:

a notification module 700A, configured to send notification information to clients corresponding to the participating users in the target virtual scene, where the notification information is used to indicate that a user corresponding to the target virtual role is recommended.

In a possible implementation, referring to FIG. 15, the data processing server may further include:

a watching user quantity update module 800A, configured to periodically update the quantity of currently watching users of the recommended video; and a user quantity sending module 900A, configured to send the updated quantity of currently watching users to the clients corresponding to the participating users in the target virtual scene.

In a possible implementation, the user quantity sending module 900A and the notification module 700A may be integrated, that is, when the notification information is sent to the clients corresponding to the participating users in the target virtual scene, the notification information carries the updated quantity of currently watching users.

In an example, under a game arena background, the determining, by the candidate scene determining module 100A, candidate virtual scenes may specifically include:

determining, by the candidate scene determining module 100A, candidate arena battles of a particular type that are currently being performed, and determining game arena scenes corresponding to the determined candidate arena battles as the candidate virtual scenes. Virtual roles exist in the candidate virtual scenes, and the virtual roles are manipulated by participating users.

Correspondingly, the selecting, by a target scene selection module 200A, a target virtual scene from the candidate virtual scenes may specifically include:

determining, by the target scene selection module 200A according to user levels of participating users of the candidate arena battles, a target arena battle in which the levels of the participating users all reach a specified level, where the target arena battle corresponds to a target game arena scene.

Correspondingly, the determining, by a representation data determining module 300A, representation data of virtual roles of the target virtual scene may specifically include:

determining, by the representation data determining module 300A, representation data of each game role of the target arena battle.

Correspondingly, the selecting, by the target role selection module 400A, a target virtual role from the virtual roles of the target virtual scene according to the representation data of the virtual roles of the target virtual scene may specifically include:

retrieving, by the target role selection module 400A from representation data of each game role of the target arena battle, a slaying quantity, an assist quantity, and a death quantity of each game role of the target arena battle;

dividing, by the target role selection module 400A, a sum of the slaying quantity and the assist quantity of each game role by the death quantity, to determine a ratio corresponding to each game role; and determining, by the target role selection module 400A, a game role whose ratio is largest as the target game role.

Correspondingly, the generating, by a recommended video generation module 500A, a recommended video at a viewing angle of the target virtual role in the target virtual scene may specifically include:

generating, by the recommended video generation module 500A, a recommended video at a viewing angle of the target game role in the target game arena scene.

Figure 16:
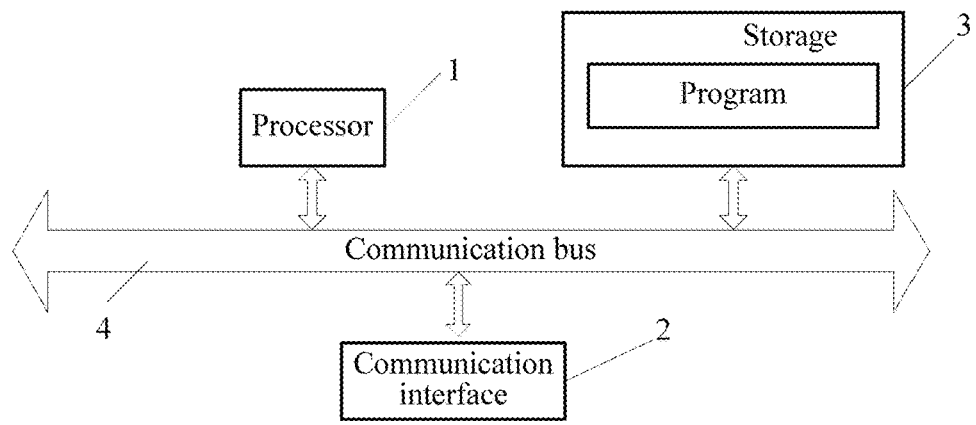
FIG. 16 is a structural block diagram of hardware of a data processing server according to an embodiment of the present disclosure.

A hardware structure of a data processing server provided in an embodiment of the present disclosure may be shown in FIG. 16, including: a processor 1, a communication interface 2, a memory 3 and a communication bus 4.

Communication among the processor 1, the communication interface 2, and the memory 3 is implemented through the communication bus 4.

In a possible implementation, the communication interface 2 may be an interface of a communication module, for example, an interface of a GSM module.

The processor 1 may be a Central Processing Unit (CPU) or an Application Specific Integrated Circuit (ASIC) or may be configured as one or more integrated circuits for implementing the embodiments of the present disclosure.

The memory 3 may include a high-speed RAM memory, may also include a non-volatile memory, for example, at least one magnetic disk memory.

The processor 1 may be specifically configured to:

determine candidate virtual scenes, virtual roles existing in the candidate virtual scenes, and the virtual roles being manipulated by participating users;

select a target virtual scene from the candidate virtual scenes;

determine representation data of virtual roles of the target virtual scene;

select a target virtual role from the virtual roles of the target virtual scene according to the representation data of the virtual roles of the target virtual scene; and generate a recommended video at a viewing angle of the target virtual role in the target virtual scene.

With continuous development of Internet technologies, experience of a multiplayer online battle arena (MOBA) game also gradually becomes an entertainment item on which people are keen.

Currently, an MOBA game not only may be presented on a personal computer (PC), but also may be presented on a small-sized terminal, for example, a mobile phone or a portable multifunctional digital multimedia player, or a mini tablet computer, so as to enable a player to better experience the MOBA game. Moreover, to satisfy fight watching requirements of some users, a fight watching function of the MOBA game may be further set on a PC, to enable a user to perform fight watching by using the PC.

The fight watching function, as a relatively important function in the MOBA game, needs to present a large quantity of fighting information to the user, and further needs to enable the user to conveniently watch details in a combat. However, if a player intends to perform fight watching on a small-sized terminal, there is a difficulty because the screen of the small-sized terminal is usually relatively small and has a high resolution. If a fight watching interface on a PC is indiscriminately imitated to the small-sized terminal, much interface information is huddled together, it is difficult to recognize the information, an operation area on the interface also becomes quite small, and it is quite difficult to operate the operation area.

An embodiment of the present disclosure further provides a system for determining a recommended video, and a structure of the system for determining a recommended video may be the same as that shown in FIG. 1. For specific content, refer to the foregoing corresponding part.

The system for determining a recommended video provided in this embodiment of the present disclosure may include: a data processing server. The data processing server is configured to determine candidate virtual scenes, virtual roles existing in the candidate virtual scenes, and the virtual roles being manipulated by participating users; select a target virtual scene from the candidate virtual scenes; determine representation data of virtual roles of the target virtual scene; select a target virtual role from the virtual roles of the target virtual scene according to the representation data of the virtual roles of the target virtual scene; and generate a recommended video at a viewing angle of the target virtual role in the target virtual scene.

In a possible implementation, the data processing server may be further configured to send notification information to clients corresponding to participating users in a target virtual scene, the notification information being used to indicate that a user corresponding to a target virtual role is recommended.

Correspondingly, the system for determining a recommended video provided in this embodiment of the present disclosure may further include: a client. The client may be configured to receive the notification information, and judge a relationship between the user corresponding to the target virtual role and a user of the client; output, if the client determines that the user corresponding to the target virtual role is the user of the client, prompt information indicating that a local user is recommended to a video recommendation interface; output, if the client determines that the user corresponding to the target virtual role is a teammate of the user of the client in the target virtual scene, prompt information indicating that the teammate is recommended to the video recommendation interface; and output, if the client determines that the user corresponding to the target virtual role is an opponent of the user of the client in the target virtual scene, prompt information indicating that the opponent is recommended to the video recommendation interface.

In a possible implementation, the notification information carries the identifier of the user corresponding to the target virtual role; and the judging, by the terminal, a relationship between the user corresponding to the target virtual role and a user of the client may specifically include:

obtaining, by the terminal, an identifier of a user in the teammate relationship with the user of the client and an identifier of a user in the opponent relationship with the user of the client in the target virtual scene;

performing, by the terminal, matching between the identifier of the user corresponding to the target virtual role and each of the identifier of the user of the client, an identifier of a user in the teammate relationship with the user of the client and an identifier of a user in the opponent relationship with the user of the client; and if matching between the identifier of the user corresponding to the target virtual role and the identifier of the user of the client is successful, determining, by the terminal, the user corresponding to the target virtual role as the user of the client; if matching between the identifier of the user corresponding to the target virtual role and an identifier of a user in the teammate relationship with the user of the client is successful, determining, by the terminal, the user corresponding to the target virtual role as a teammate of the user of the client; and if matching between the identifier of the user corresponding to the target virtual role and an identifier of a user in the opponent relationship with the user of the client is successful, determining, by the terminal, the user corresponding to the target virtual role as an opponent of the user of the client.

In a possible implementation, the data processing server may be further configured to periodically update the quantity of currently watching users of the recommended video; and send the updated quantity of currently watching users to the clients corresponding to the participating users in the target virtual scene.

In a possible implementation, the client may be further configured to add, when the prompt information is output, the received quantity of currently watching users of the recommended video to the prompt information.

In this embodiment of the present disclosure, a high-quality virtual scene video that is currently being performed may be recommended, to improve a probability of clicking the recommended video.

An embodiment of the present disclosure further provides an information display method and a terminal. Only more important preset primary information during fighting may be presented on a display interface of a terminal, and unimportant preset secondary information is hidden, to ensure that a user has a sufficiently large fight watching area, so that various details in a combat can be seen, so as to improve operability of the solution.

Figure 17:
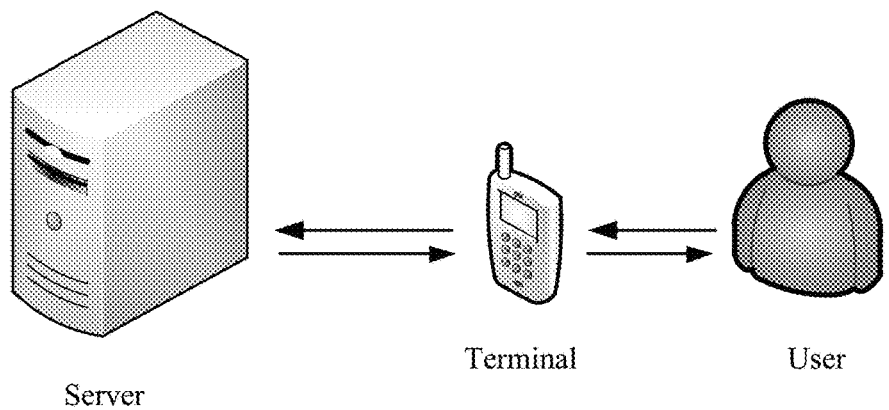
FIG. 17 is an architectural diagram of an information display system according to an embodiment of the present disclosure.

It should be understood that, the present disclosure is applied to an information display system. Referring to FIG. 17, FIG. 17 is an architectural diagram of an information display system according to an embodiment of the present disclosure. As shown in FIG. 17, for an MOBA game, in addition to becoming a player in the game, a user may further watch, at a viewing angle of an "outsider", another player performing the game. For example, a player not in the game may watch, by using a current popular live platform, another player performing the game, so as to obtain experience and pleasure. However, in this solution, direct fight watching may be further performed in the MOBA game, that is, a user triggers the fight watching function on the terminal, so that the terminal requests, from the server, operation information of a plurality of fighting objects in a current fight watching round.

The terminal collects, according to the operation information of the fighting objects delivered by the server, statistics on operation statistics results on the background, and then divides these operation statistics results into preset primary information and preset secondary information by using a preset rule, where an importance level of the preset primary information is usually higher than that of the preset secondary information. To ensure that a fight watching area of a user is sufficiently large, the terminal needs to only display the preset primary information that is relatively basic and important on the display interface, and if the user intends to watch the preset secondary information, the preset secondary information may also be called out by using a corresponding operation. When a fight watching mode of the MOBA game is enabled, only the preset primary information, or only the preset secondary information, or both the preset primary information and the preset secondary information, or neither the preset primary information nor the preset secondary information may be displayed in the default fight watching interface, and this is not limited in this solution.

It should be noted that, the terminal in this solution may be specifically a small-sized terminal, for example a mobile phone, a mini tablet computer or a portable multifunctional digital multimedia player. Because this type of terminal has a relatively small display screen, it is relatively difficult to display fighting details of the MOBA game on the relatively small display screen. Therefore, the present disclosure is dedicated to resolving a problem of displaying fight watching details in a small interface.

Figure 18:
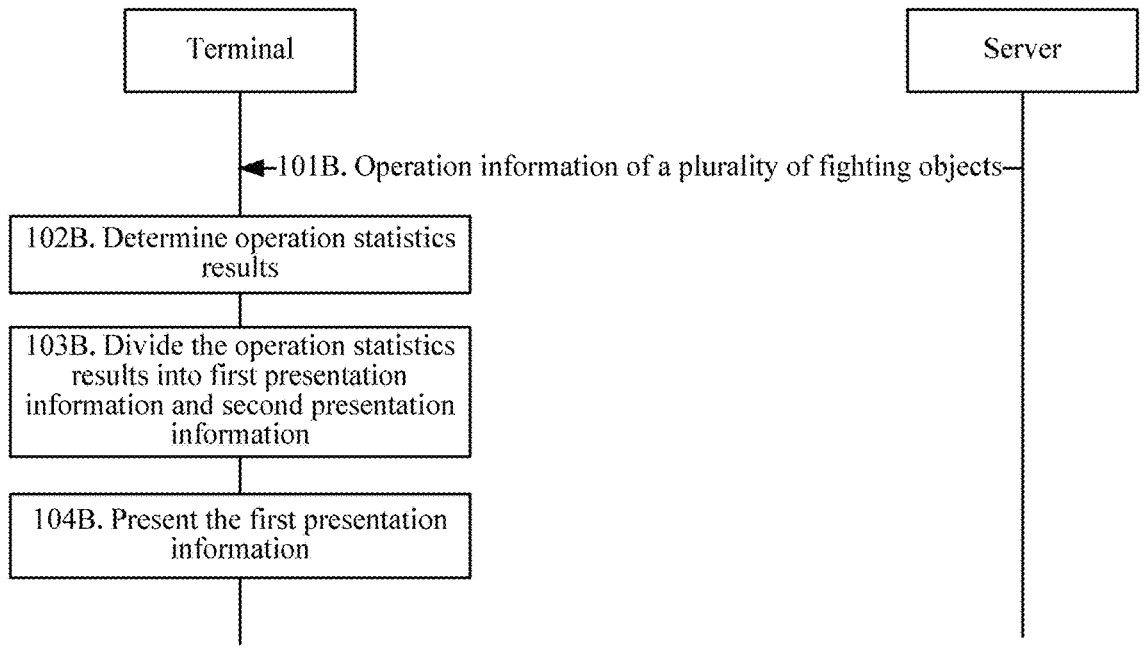
FIG. 18 is a schematic diagram of an interaction embodiment of an information display method according to an embodiment of the present disclosure.

For convenience of understanding, referring to FIG. 18, FIG. 18 is a schematic diagram of an interaction embodiment of an information display method according to an embodiment of the present disclosure. As shown in the figure, in step 101B: after a terminal requests operation information of a plurality of fighting objects in a fighting round, a server delivers the operation information. In step 102B: the terminal calculates operation statistics results on the background by using the operation information of the plurality of fighting objects. Usually, the operation statistics results include detailed fighting data of the plurality of fighting objects, but some fighting data is relatively basic, and some fighting data may be considered as advanced data, that is, a fight watching experience is not deteriorated without the advanced data. In step 103B: the terminal distinguishes the operation statistics results according to a preset rule, and obtains first presentation information of a basic type and second presentation information of an advanced type. In step 104B: display the first presentation information, and not limit whether the second presentation information needs to be presented.

Figure 19:
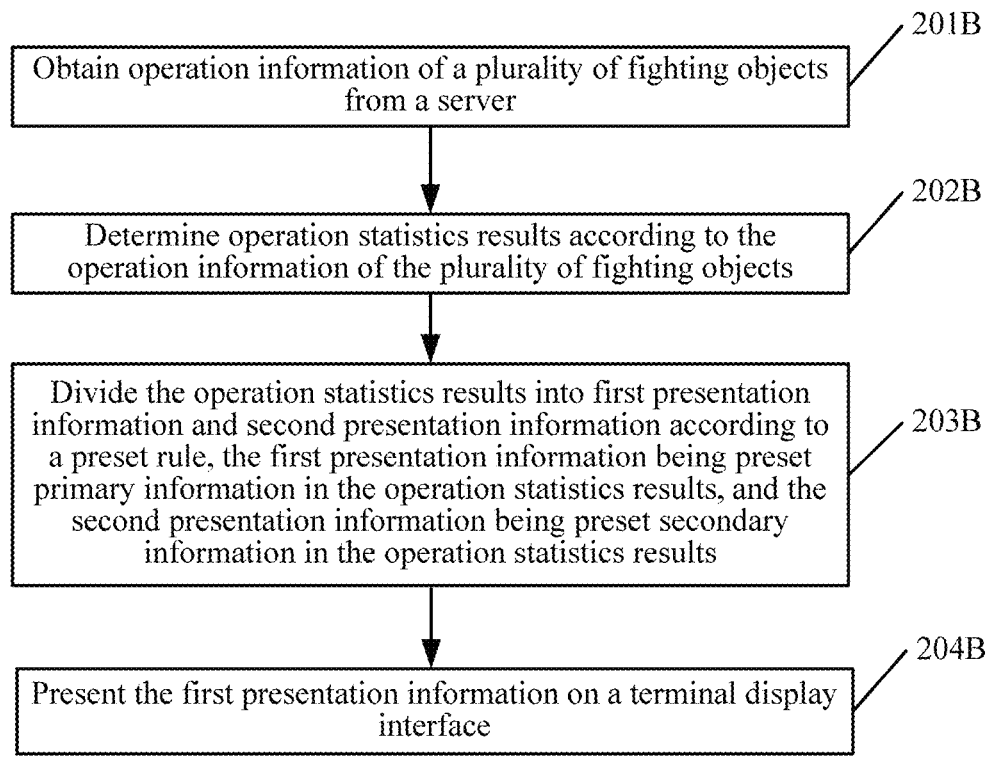
FIG. 19 is a schematic diagram of an embodiment of an information display method according to an embodiment of the present disclosure.

An information display method in the present disclosure is described below from the perspective of a terminal. Referring to FIG. 19, an embodiment of an information display method in an embodiment of the present disclosure includes the following steps:

201B. Obtain operation information of a plurality of fighting objects from a server.

In this embodiment, when a user triggers a fight watching request for an MOBA game, the terminal obtains, from the server, operation information of a plurality of fighting objects in a fighting round in the MOBA game requested by the user. If two teams are performing fighting in a fighting round, and each team has 5 members, the terminal may obtain operation information of 10 fighting objects of two teams in total.

The operation information of the fighting objects may include object movement information, object attack information, object under attack information, object skill launching information and the like.

202B. Determine operation statistics results according to the operation information of the plurality of fighting objects.

In this embodiment, the terminal may collect statistics on the operation statistics results according to the received operation information of the fighting objects. For example, the terminal may collect statistics on a quantity of times of slaying enemies by a fighting object within a period of time in a fighting round, and may further collect statistics on a quantity of times of assisting a teammate in slaying enemies by the fighting object within the period of time in the fighting round. In actual application, the operation statistics results may further include more fighting information that is not listed one by one herein.

203B. Divide the operation statistics results into first presentation information and second presentation information according to a preset rule, the first presentation information being preset primary information in the operation statistics results, and the second presentation information being preset secondary information in the operation statistics results.

In this embodiment, the terminal divides the obtained operation statistics results into different types of information according to a preset rule, and the operation statistics results are usually distinguished according to different importance levels of information or different viewing angles. The terminal divides the operation statistics results to obtain the first presentation information and the second presentation information, where a division rule for the first presentation information and the second presentation information may be preset by a user, relatively basic fighting information in the MOBA game is used as the preset primary information, that is, the first presentation information, and advanced fighting information is used as the preset secondary information, that is, the second presentation information.

It should be noted that, the terminal may further divide the operation statistics results into more than two types of information, and a division manner for a same type of information is preset by the user. In this solution, the preset primary information and the preset secondary information are used as an example to perform description. However, this does not constitute any limitation on this solution.

204B. Present the first presentation information on a terminal display interface.

In this embodiment, the terminal displays the first presentation information on the display interface by default, that is, displays fighting information that is more basic. The second presentation information may be hidden in the terminal display interface, or may be presented in the display interface as the first presentation information is done. However, to leave more visual space on the relatively small terminal display interface for the user to watch details in a combat, the second presentation information is usually hidden.

In this embodiment, an information display method is provided. The terminal obtains operation information of each game object from the server, then determines the operation statistics results according to the operation information, uses, according to a preset rule, an important part of the operation statistics results as the first presentation information, and an unimportant part of the operation statistics results as the second presentation information, and finally presents the first presentation information on the terminal display interface. By using the foregoing manner, only more important preset primary information during fighting may be presented on a display interface of a terminal, and unimportant preset secondary information is hidden, to ensure that a user has a sufficiently large fight watching area, so that various details in a combat can be seen, so as to improve operability of the solution.

In a possible implementation, based on the foregoing embodiment corresponding to FIG. 19, in a first embodiment of the information display method according to this embodiment of the present disclosure, the dividing the operation statistics results into first presentation information and second presentation information according to a preset rule may include:

detecting personal operation information of a primary fighting object and basic operation information of a plurality of fighting players that are included in the operation statistics results, where the primary fighting object is one of the plurality of fighting objects, and the plurality of fighting players is other objects of the plurality of fighting objects than the primary fighting object;

determining the personal operation information of the primary fighting object as the second presentation information; and determining the basic operation information of the plurality of fighting players as the first presentation information.

In this embodiment, the operation statistics results obtained by the terminal may be further classified according to a preset rule, where a frequently used preset rule is dividing operation statistics information according to a fight watching viewing angle, information seen at the God View during fight watching is used as basic operation information, and information seen at a viewing angle of a player during fight watching is used as personal operation information.

In an example, a game named "King of Glory" may be used as an example to perform description. In the game, a fight watching user may see basic operation information of both players, and the basic operation information is the first presentation information, for example, a role icon of each fighting object in the game, a quantity of times of slaying enemies, a quantity of death times, a quantity of times of assisting a teammate, a total quantity of obtained virtual coins, a life value, a skill value and a revival time. A fighting object corresponds to a game player.

Moreover, a fight watching user in the game may further watch detailed information of a player at a primary viewing angle, the player at the primary viewing angle is the primary fighting object, the primary fighting object is one of a plurality of current fighting objects, and the primary fighting object is also self-defined and selected by the user. The detailed information of the primary fighting object includes the personal operation information of the primary fighting object, that is, the second presentation information, for example, a skill type used by a role, a specific combat power index and equipment information.

It should be noted that, the first presentation information may be presented on two sides of the terminal display interface, and the second presentation information may be presented below the terminal display interface. In actual application, the first presentation information may be presented on a side of the terminal display interface, and the second presentation information is presented above the terminal display interface. A specific presentation location may be specified according to a user requirement and therefore is not limited herein.

Secondly, in this embodiment of the present disclosure, the rule through which the terminal distinguishes the first presentation information and the second presentation information is described, where a manner is: basic operation information of a plurality of fighting players is used as the first presentation information, and personal operation information of the primary fighting object is used as the second presentation information. By using the foregoing manner, the operation statistics results of the fighting objects are distinguished according to importance levels, and the importance levels may be judged according to a difference between viewing angles, so that different presentation information may be switched according to a user requirement in a fight watching process, thereby improving flexibility and practicability of the s solution.

In a possible implementation, based on FIG. 19 and the foregoing first embodiment corresponding to FIG. 19, in a second optional embodiment of the information display method according to this embodiment of the present disclosure, after the dividing the operation statistics results into first presentation information and second presentation information according to a preset rule, the method may further include:

receiving a first information display instruction; and presenting the second presentation information on the terminal display interface according to the first information display instruction.

In this embodiment, after distinguishing the first presentation information and the second presentation information according to a preset rule, the terminal may further receive the first information display instruction triggered by the user, and then call out the second presentation information on the terminal display interface according to the first information display instruction.

Figure 20:
FIG. 20 is a schematic diagram of an interface of an interactive application according to an embodiment of the present disclosure.

For convenience of understanding, a game named "King of Glory" is used as an example to perform description below. Referring to FIG. 20, FIG. 20 is a schematic diagram of an interface of an interactive application according to an embodiment of the present disclosure. As shown in the figure, the second presentation information may be further presented below the display interface, and such interface design may present a middle display area of the interface to the user for watching, so as to see more details. An operation of turning on the second presentation information may be specifically clicking an arrow button right above an information bar, and the information bar is used to present the second presentation information.

Thirdly, in this embodiment of the present disclosure, if a user needs to view some unimportant information in a massive multiplayer online game, the first information display instruction may be triggered, so that the terminal presents the second presentation information on the display interface according to the instruction triggered by the user. By using the foregoing manner, operation information of one or more fighting objects in the massive multiplayer online game can be more comprehensively reflected, and moreover, the terminal can further present the second presentation information according to a user requirement, thereby improving operability and flexibility of the solution.

In a possible implementation, based on the foregoing second embodiment corresponding to FIG. 19, in a third optional embodiment of the information display method according to this embodiment of the present disclosure, after the presenting the second presentation information on the terminal display interface according to the first information display instruction, the method may further include:

receiving a first information hiding instruction; and hiding the second presentation information on the terminal display interface according to the first information hiding instruction.

In this embodiment, if the current terminal display interface already displays the second presentation information, the user may further determine, according to a need, whether to continue to watch the second presentation information. When the user does not intend to continue to watch the second presentation information, the user triggers the first information hiding instruction, and the terminal hides, according to the first information hiding instruction triggered by the user, the second presentation information displayed on the terminal display interface.

Figure 21:
FIG. 21 is a schematic diagram of another interface of an interactive application according to an embodiment of the present disclosure.

For convenience of understanding, a game named "King of Glory" is used as an example to perform description below. Referring to FIG. 21, FIG. 21 is a schematic diagram of another interface of an interactive application according to an embodiment of the present disclosure. As shown in the figure, an information bar used to present the second presentation information may be hidden on the terminal display interface, there is an arrow button right above the information bar, and the first information hiding instruction is triggered by clicking the arrow button. In this case, the terminal interface hides the second presentation information, and if the arrow button is again clicked, it is considered that the first information display instruction is triggered. Therefore, the second presentation information is again displayed. It can be known with reference to FIG. 20 and FIG. 21 that, the information bar used to display the second presentation information can be flexibly pulled.

Moreover, in this embodiment of the present disclosure, after the second presentation information is presented on the terminal display interface, if the user does not intend to continue to view the information, the user may further trigger the first information hiding instruction, so that the terminal again hides the second presentation information according to the first information hiding instruction. By using the foregoing manner, on one hand, the information presented on the terminal display interface may be adjusted in real time according to a user requirement, to improve flexibility of the solution; and on the other hand, when the second presentation information is hidden, the terminal display interface makes more space for presenting combat situations in the massive multiplayer online game, so as to present a better vision experience effect to the user.

In a possible implementation, based on the foregoing second embodiment corresponding to FIG. 19, in a fourth optional embodiment of the information display method according to this embodiment of the present disclosure, the presenting the first presentation information on a terminal display interface may include:

presenting the first presentation information at a first interface display layer of the terminal display interface; and the presenting the second presentation information on a terminal display interface may include:

presenting the second presentation information at a second interface display layer of the terminal display interface, where the first presentation information displayed at the first interface display layer does not overlap with the second presentation information displayed at the second interface display layer.

In this embodiment, a method for presenting information by using different interface display layers is provided, that is, the terminal display interface is divided into a first interface display layer and a second interface display layer, the first presentation information is displayed on the first interface display layer, and the second presentation information is displayed on the second interface display layer.

Figure 22:
FIG. 22 is a schematic diagram of another interface of an interactive application according to an embodiment of the present disclosure.

For convenience of understanding, a game named "King of Glory" is used as an example to perform description below. Referring to FIG. 22, FIG. 22 is a schematic diagram of another interface of an interactive application according to an embodiment of the present disclosure. As shown in the figure, the first interface display layer is presented on the display interface, and the first interface display layer further has detailed game data of each game player. In this case, the second interface display layer is not called out. If the second interface display layer is called out, as shown in FIG. 20, two interface display layers exist simultaneously, and the first presentation information and the second presentation information are displayed simultaneously. To enable the user to clearly see information content, the first presentation information and the second presentation information do not overlap.

Both the first interface display layer and the second interface display layer are interface icon layers, that is, a corresponding icon should be presented on each layer of interface, so as to satisfy a need for information presentation.

Moreover, in this embodiment of the present disclosure, the terminal display interface may be further divided into a primary interface and a secondary interface, that is, the first interface display layer and the second interface display layer. The first presentation information that is more basic and important is displayed in the first interface display layer, and the more detailed second presentation information is displayed in the second interface display layer. By using the foregoing manner, the terminal display interface may be layered to present presentation information of a corresponding layer, so that an entire layer may be directly superposed or replaced, and it is not required to superpose or replace some presentation information at a same layer, thereby reducing modularization processing, so as to improve application efficiency of the solution.

In a possible implementation, based on the foregoing embodiment corresponding to FIG. 19, in a fifth optional embodiment of the information display method according to this embodiment of the present disclosure, after the dividing the operation statistics results into first presentation information and second presentation information according to a preset rule, the method may further include:

sending a second information display instruction to the server, where the second information display instruction is used to instruct the server to determine interaction statistics information according to the operation information of the plurality of fighting objects;

receiving the interaction statistics information sent by the server; and presenting the interaction statistics information on the terminal display interface.

In this embodiment, at many moments, in addition to intending to see operation details of fighting of both parties in a fight watching process, the user further intends to be capable of seeing information such as more fighting data and evaluation on a combat. Therefore, the user needs to send the second information display instruction to the server by using the terminal, and the server collects statistics on interaction statistics information of a plurality of fighting objects according to the second information display instruction, and then delivers the interaction statistics information to the terminal, so that the terminal may display the interaction statistics information on the display interface.

Figure 23:
FIG. 23 is a schematic diagram of another interface of an interactive application according to an embodiment of the present disclosure.

For convenience of understanding, a game named "King of Glory" is used as an example to perform description below. Referring to FIG. 23, FIG. 23 is a schematic diagram of another interface of an interactive application according to an embodiment of the present disclosure. As shown in the figure, when a user clicks an information panel button right above a game interface, a combat detailed information interface pops up, that is, the server collects statistics on interaction statistics information at a background. On this interface aggregation, combat information of all fighting players, role attribute information, experience trend diagrams of both players, an economics trend diagram and the like may be watched.

It should be noted that, the presentation manner of the interaction statistics information in FIG. 23 is only an example, and should not be understood as a limitation on this solution.

In this embodiment of the present disclosure, when the user intends to understand specific representation of each fighting object in a massive multiplayer online game in a period of time, the user may further trigger the second information display instruction to the server by using the terminal, so that the server generates interaction statistics information of each fighting object according to the instruction, and the terminal receives the interaction statistics information delivered by the server and presents the interaction statistics information to the user. By using the foregoing manner, the user may see more detailed fighting situations on the terminal display interface, to satisfy a requirement of the user for obtaining each piece of information in the massive multiplayer online game, thereby improving practicability and flexibility of the solution.

In a possible implementation, based on the foregoing embodiment corresponding to FIG. 19, in a sixth optional embodiment of the information display method according to this embodiment of the present disclosure, after the dividing the operation statistics results into first presentation information and second presentation information according to a preset rule, the method may further include:

receiving a second information hiding instruction; and hiding the first presentation information and the second presentation information on the terminal display interface according to the second information hiding instruction.

In this embodiment, if the current user intends to only watch combat details between players on the terminal display interface, and does not need to watch specific fighting data, the user may trigger the second information hiding instruction, and the terminal hides the first presentation information and the second presentation information on the display interface according to the second information hiding instruction, so that the user may watch the combat details of the players in full screen mode.

Figure 24:
FIG. 24 is a schematic diagram of another interface of an interactive application according to an embodiment of the present disclosure.

For convenience of understanding, a game named "King of Glory" is used as an example to perform description below. Referring to FIG. 24, FIG. 24 is a schematic diagram of another interface of an interactive application according to an embodiment of the present disclosure. As shown in the figure, when a user clicks an all-interface hiding button right above an interface, the first presentation information located at two sides and the second presentation information located right below are both hidden. Meanwhile, a fight watching lens may be further elevated, and a viewing angle is adjusted in a manner of increasing a depression angle, so that the user may see more combat areas.

An interface of the interactive application hiding the first presentation information and the second presentation information is basically consistent with an interface seed by a player that is currently performing an operation, and only a difference exists between a fight watching angle and a game angle, thereby enabling the user to better enter a game state.

Secondly, in this embodiment of the present disclosure, when the user intends to see more combat areas in the massive multiplayer online game in the fight watching process, the user may further trigger the second information hiding instruction, so that the terminal hides both the first presentation information and the second presentation information on the terminal display interface according to the second information hiding instruction. By using the foregoing manner, watching experience of the massive multiplayer online game may be improved, and moreover requirements of the users for different watching habits can be further satisfied, thereby improving flexibility and diversity of the solution.

Figure 25:
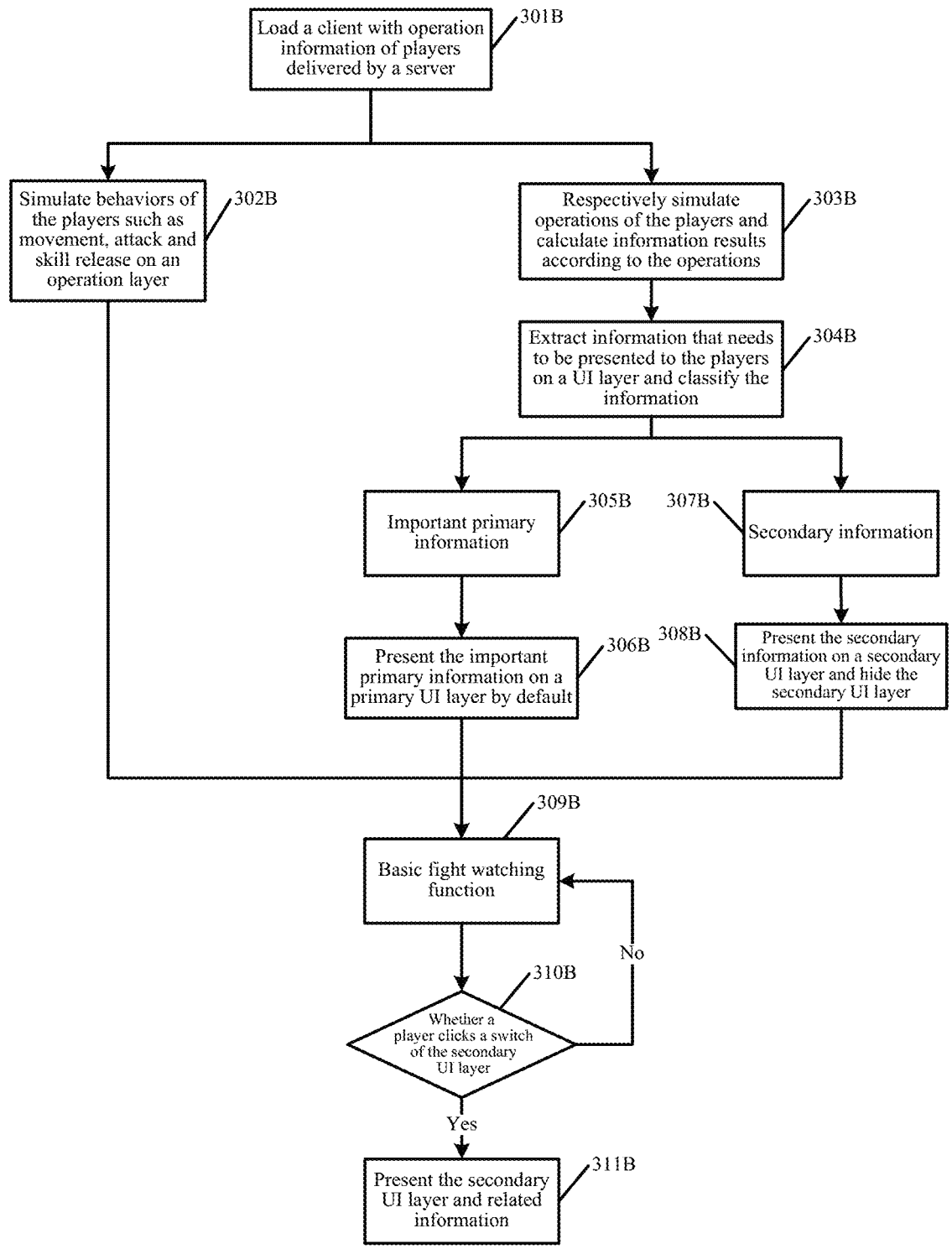
FIG. 25 is a schematic diagram of an information display process in an application scenario.

For convenience of understanding, an information display method in the present disclosure may be described in detail by using a specific application scenario below. Referring to FIG. 25, FIG. 25 is a schematic diagram of an information display process in an application scenario. The process is specifically:

Step 301B. Load a game client installed in a terminal with operation information of players delivered by a server, where the players are specifically game players that are currently in a fighting round.

Step 302B. Simulate, according to the operation information of the players delivered by the server, operations of the players, for example, behaviors such as movement, attack and skill release of roles on an operation layer of the game client.

Step 303B. Respectively simulate the operations of the players according to the operation information of the players delivered by the server, and calculate results of various types of information, that is, operation statistics results according to the simulated operations.

Step 304B. The terminal extracts operation statistics results that need to be presented to users on a user interface (UI) layer, and classifies the operation statistics results, where a classification manner is shown in step 305B and step 307B.

Step 305B. The terminal directly identifies important primary information in the operation statistics results by using a classification rule, where the operation statistics results include different types of player information, and the classification rule for the information is already preset in the terminal.

Step 306B. The terminal presents the important primary information in the operation statistics results on a primary UI layer by default.

Step 307B. Similar to step 305B, the terminal identifies secondary information in the operation statistics results still by using the classification rule, where an importance level of the secondary information is considered lower than that of the primary information.

Step 308B. The terminal presents the secondary information on a secondary UI layer, and moreover may further hide the secondary UI layer according to a user requirement, that is, only display the primary UI layer on the terminal display interface.

Step 309B. Combine the operation layer and the primary UI layer into a basic function of fight watching.

Step 310B. Judge, in a user fight watching process in real time, whether a user clicks a switch of the secondary UI layer, and if yes, enter step 311B; otherwise jump to step 309B, and continue to perform basic fight watching.

Step 311B. If it is detected in step 310B that the user clicks the switch of the secondary UI layer in the fight watching process, display content of the secondary UI layer on the terminal display interface.

Figure 26:
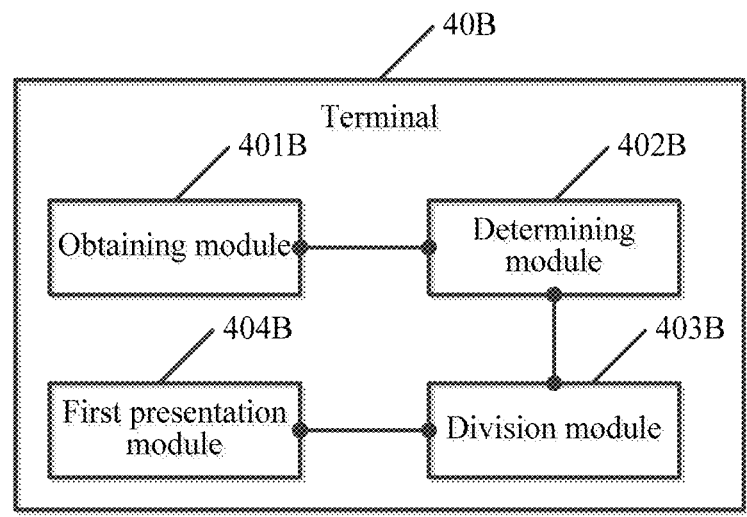
FIG. 26 is a schematic diagram of an embodiment of a terminal according to an embodiment of the present disclosure.

A terminal in the present disclosure is described in detail below. Referring to FIG. 26, a terminal 40 in an embodiment of the present disclosure includes:

an obtaining module 401B, configured to obtain operation information of a plurality of fighting objects from a server;

a determining module 402B, configured to determine operation statistics results according to the operation information of the plurality of fighting objects obtained by the obtaining module 401B;

a division module 403B, configured to divide the operation statistics results determined by the determining module 402B into first presentation information and second presentation information according to a preset rule, the first presentation information being preset primary information in the operation statistics results, and the second presentation information being preset secondary information in the operation statistics results; and a first presentation module 404B, configured to present, on a terminal display interface, the first presentation information obtained through division performed by the division module 403B.

In this embodiment, the obtaining module 401B obtains operation information of a plurality of fighting objects from a server; the determining module 402B determines operation statistics results according to the operation information of the plurality of fighting objects obtained by the obtaining module 401B; the division module 403B divides the operation statistics results determined by the determining module 402B into first presentation information and second presentation information according to a preset rule, the first presentation information being preset primary information in the operation statistics results, and the second presentation information being preset secondary information in the operation statistics results; and the first presentation module 404B presents, on a terminal display interface, the first presentation information obtained through division performed by the division module 403B.

In this embodiment of the present disclosure, an information display terminal is provided. The terminal obtains operation information of each game object from the server, then determines the operation statistics results according to the operation information, uses, according to a preset rule, an important part of the operation statistics results as the first presentation information, and an unimportant part of the operation statistics results as the second presentation information, and finally presents the first presentation information on the terminal display interface. By using the foregoing manner, only more important preset primary information during fighting may be presented on a display interface of a terminal, and unimportant preset secondary information is hidden, to ensure that a user has a sufficiently large fight watching area, so that various details in a combat can be seen, so as to improve operability of the solution.

Figure 27:
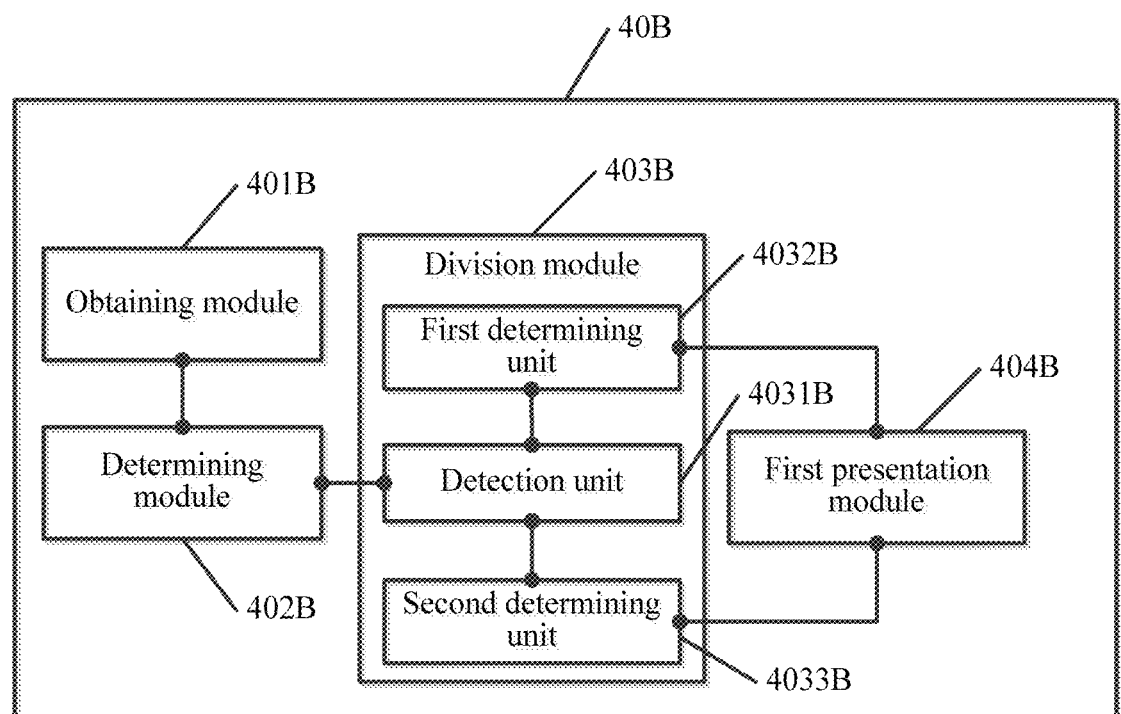
FIG. 27 is a schematic diagram of another embodiment of a terminal according to an embodiment of the present disclosure.

In a possible implementation, based on the foregoing embodiment corresponding to FIG. 26, referring to FIG. 27, in another embodiment of the terminal 40B according to this embodiment of the present disclosure, the division module 403B includes:

a detection unit 4031B, configured to detect personal operation information of a primary fighting object and basic operation information of a plurality of fighting players that are included in the operation statistics results, where the primary fighting object is one of the plurality of fighting objects;

a first determining unit 4032B, configured to determine the personal operation information of the primary fighting object detected by the detection unit 4031B as the second presentation information; and a second determining unit 4033B, configured to determine the basic operation information of the plurality of fighting players detected by the detection unit 4031B as the first presentation information.

Secondly, in this embodiment of the present disclosure, the rule through which the terminal distinguishes the first presentation information and the second presentation information is described, where a manner is: basic operation information of a plurality of fighting players is used as the first presentation information, and personal operation information of the primary fighting object is used as the second presentation information. By using the foregoing manner, the operation statistics results of the fighting objects are distinguished according to importance levels, and the importance levels may be judged according to a difference between viewing angles, so that different presentation information may be switched according to a user requirement in a fight watching process, thereby improving flexibility and practicability of the s solution.

Figure 28:
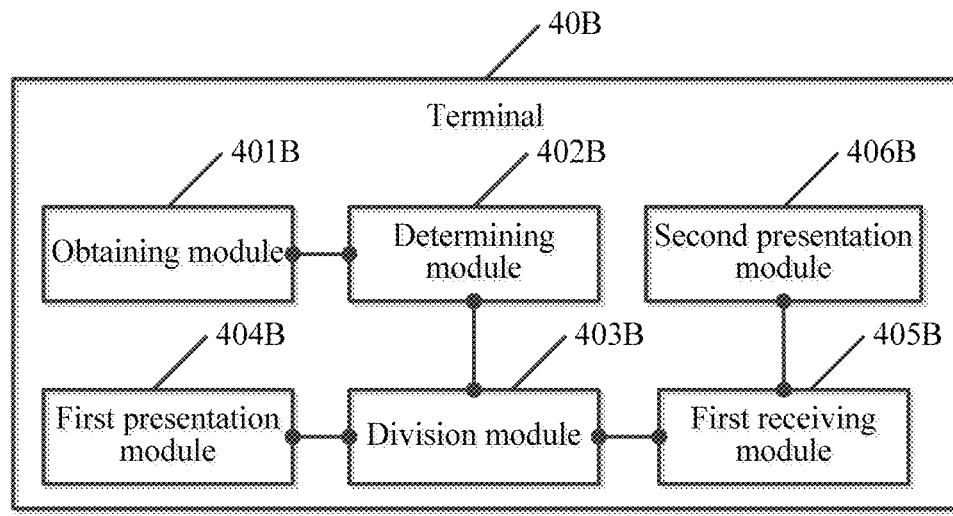
FIG. 28 is a schematic diagram of another embodiment of a terminal according to an embodiment of the present disclosure.

In a possible implementation, based on the foregoing embodiment corresponding to FIG. 26 or FIG. 27, referring to FIG. 28, in another embodiment of the terminal 40B according to this embodiment of the present disclosure, the terminal 40B further includes:

a first receiving module 405B, configured to receive the first information display instruction after the division module 403B divides the operation statistics results into the first presentation information and the second presentation information according to the preset rule; and a second presentation module 406B, configured to present the second presentation information on the terminal display interface according to the first information display instruction received by the first receiving module 405B.

Thirdly, in this embodiment of the present disclosure, if a user needs to view some unimportant information in a massive multiplayer online game, the first information display instruction may be triggered, so that the terminal presents the second presentation information on the display interface according to the instruction triggered by the user. By using the foregoing manner, operation information of one or more fighting objects in the massive multiplayer online game can be more comprehensively reflected, and moreover, the terminal can further present the second presentation information according to a user requirement, thereby improving operability and flexibility of the solution.

Figure 29:
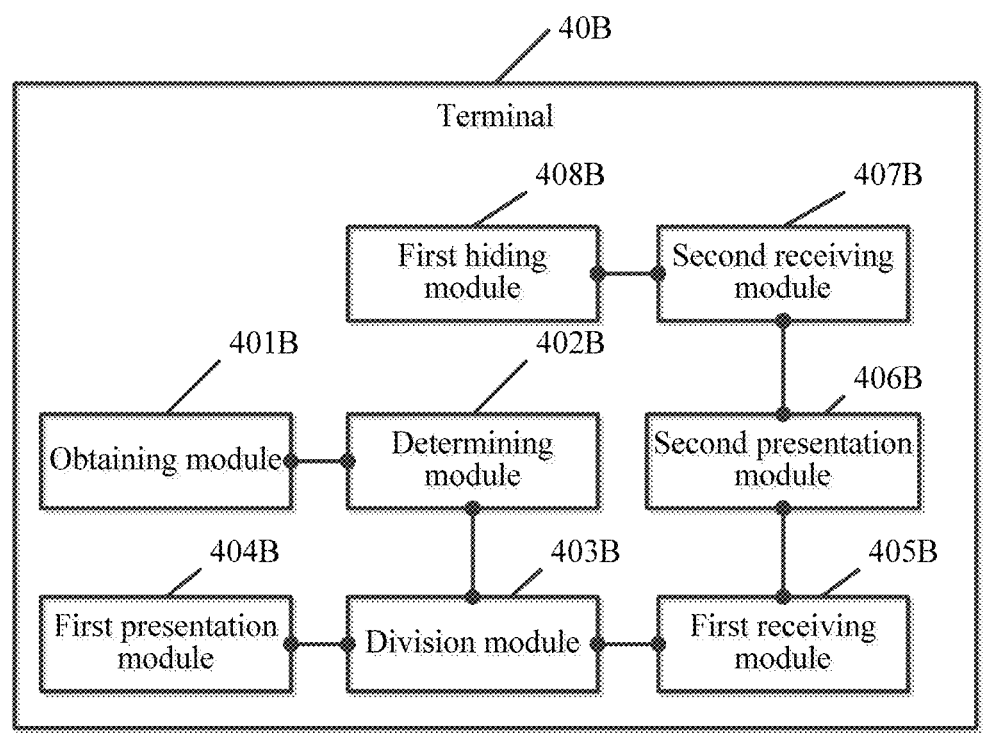
FIG. 29 is a schematic diagram of another embodiment of a terminal according to an embodiment of the present disclosure.

In a possible implementation, based on the foregoing embodiment corresponding to FIG. 28, referring to FIG. 29, in another embodiment of the terminal 40B according to this embodiment of the present disclosure, the terminal 40B further includes:

a second receiving module 407B, configured to receive the first information hiding instruction after the second presentation module 406B presents the second presentation information on the terminal display interface according to the first information display instruction; and a first hiding module 408B, configured to hide the second presentation information on the terminal display interface according to the first information hiding instruction received by the second receiving module 407B.

Further, in this embodiment of the present disclosure, after the second presentation information is presented on the terminal display interface, if the user does not intend to continue to view the information, the user may further trigger the first information hiding instruction, so that the terminal again hides the second presentation information according to the first information hiding instruction. By using the foregoing manner, on one hand, the information presented on the terminal display interface may be adjusted in real time according to a user requirement, to improve flexibility of the solution; and on the other hand, when the second presentation information is hidden, the terminal display interface makes more space for presenting combat situations in the massive multiplayer online game, so as to present a better vision experience effect to the user.

Figure 30:
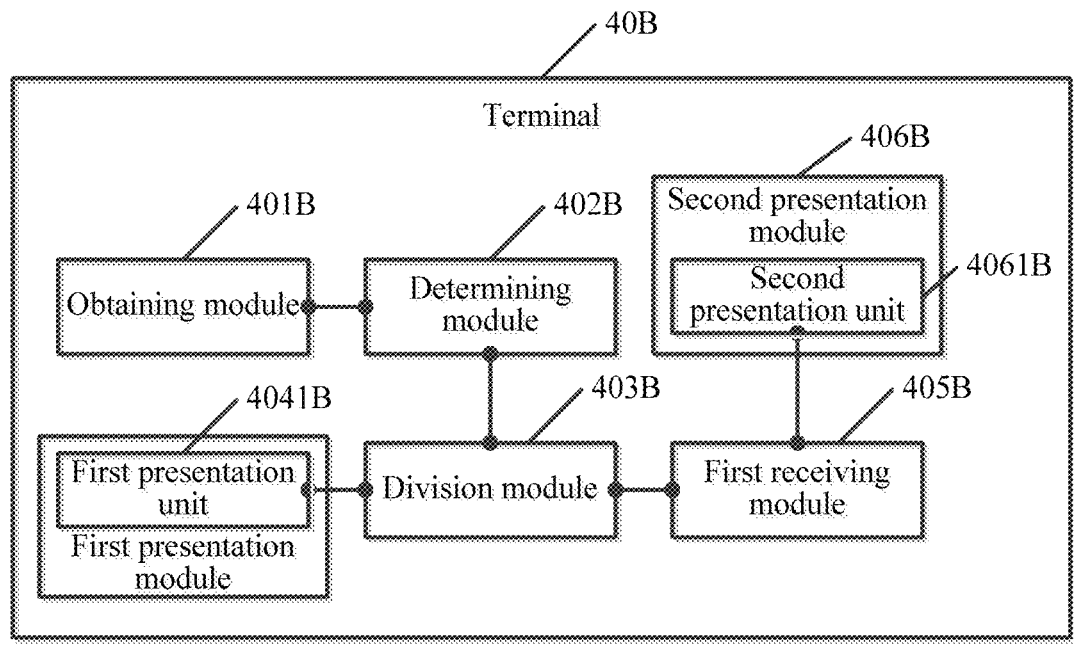
FIG. 30 is a schematic diagram of another embodiment of a terminal according to an embodiment of the present disclosure.

In a possible implementation, based on the foregoing embodiment corresponding to FIG. 28, referring to FIG. 30, in another embodiment of the terminal 40B according to this embodiment of the present disclosure, the first presentation module 404B includes:

a first presentation unit 4041B, configured to present the first presentation information at a first interface display layer of the terminal display interface; and the second presentation module 406B includes:

a second presentation unit 4061B, configured to present the second presentation information at a second interface display layer of the terminal display interface, where the first presentation information displayed at the first interface display layer does not overlap with the second presentation information displayed at the second interface display layer.

Further, in this embodiment of the present disclosure, the terminal display interface may be further divided into a primary interface and a secondary interface, that is, the first interface display layer and the second interface display layer. The first presentation information that is more basic and important is displayed in the first interface display layer, and the more detailed second presentation information is displayed in the second interface display layer. By using the foregoing manner, the terminal display interface may be layered to present presentation information of a corresponding layer, so that an entire layer may be directly superposed or replaced, and it is not required to superpose or replace some presentation information at a same layer, thereby reducing modularization processing, so as to improve application efficiency of the solution.

Figure 31:
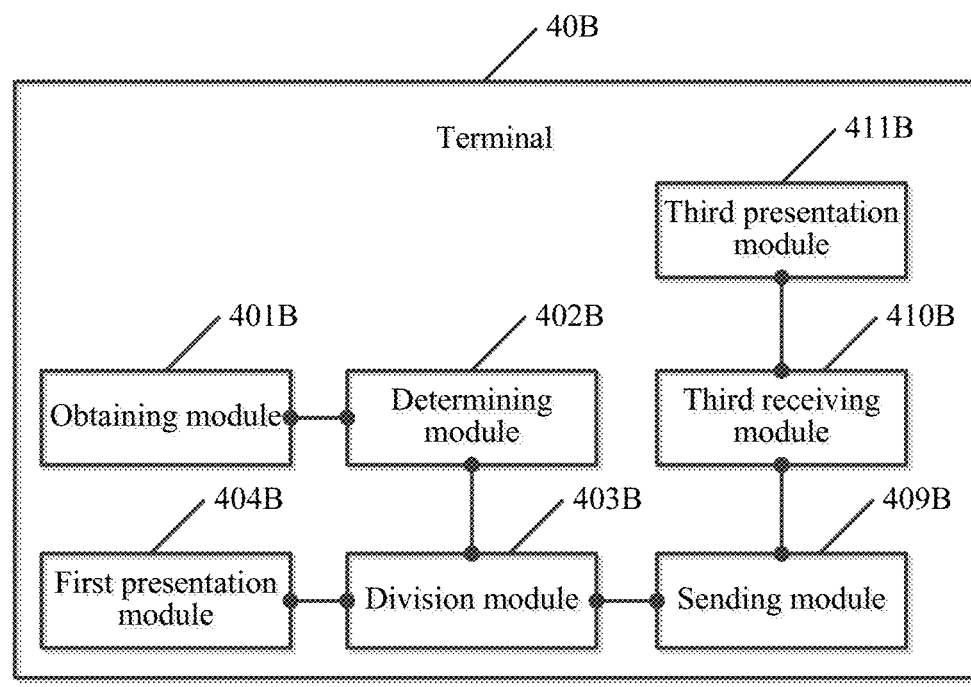
FIG. 31 is a schematic diagram of another embodiment of a terminal according to an embodiment of the present disclosure.

In a possible implementation, based on the foregoing embodiment corresponding to FIG. 26, referring to FIG. 31, in another embodiment of the terminal 40B according to this embodiment of the present disclosure, the terminal 40B further includes:

a sending module 409B, configured to send, after the division module 403B divides the operation statistics results into the first presentation information and the second presentation information according to the preset rule, a second information display instruction to the server, where the second information display instruction is used to instruct the server to determine interaction statistics information according to the operation information of the plurality of fighting objects;

a third receiving module 410B, configured to receive the interaction statistics information sent by the server; and a third presentation module 411B, configured to present, on the terminal display interface, the interaction statistics information received by the third receiving module 410B.

Secondly, in this embodiment of the present disclosure, when the user intends to understand specific representation of each fighting object in a massive multiplayer online game in a period of time, the user may further trigger the second information display instruction to the server by using the terminal, so that the server generates interaction statistics information of each fighting object according to the instruction, and the terminal receives the interaction statistics information delivered by the server and presents the interaction statistics information to the user. By using the foregoing manner, the user may see more detailed fighting situations on the terminal display interface, to satisfy a requirement of the user for obtaining each piece of information in the massive multiplayer online game, thereby improving practicability and flexibility of the solution.

Figure 32:
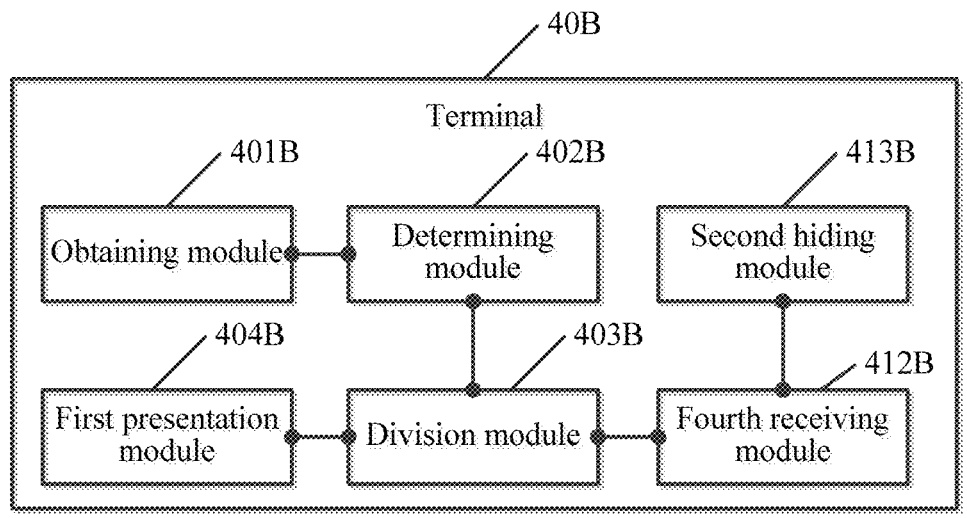
FIG. 32 is a schematic diagram of another embodiment of a terminal according to an embodiment of the present disclosure.

In a possible implementation, based on the foregoing embodiment corresponding to FIG. 26, referring to FIG. 32, in another embodiment of the terminal 40B according to this embodiment of the present disclosure, the terminal 40B further includes:

a fourth receiving module 412B, configured to receive the second information hiding instruction after the division module 403B divides the operation statistics results into the first presentation information and the second presentation information according to the preset rule; and a second hiding module 413B, configured to hide the first presentation information and the second presentation information on the terminal display interface according to the second information hiding instruction received by the fourth receiving module 412B.

Secondly, in this embodiment of the present disclosure, when the user intends to see more combat areas in the interactive application in the fight watching process, the user may further trigger the second information hiding instruction, so that the terminal hides both the first presentation information and the second presentation information on the terminal display interface according to the second information hiding instruction. By using the foregoing manner, watching experience of the massive multiplayer online game may be improved, and moreover requirements of the users for different watching habits can be further satisfied, thereby improving flexibility and diversity of the solution.

In a multiplayer online battle arena (MOBA) game, players usually need to buy equipment in a combat, the players are usually divided into two teams, the two teams compete with each other in a dispersive game map, and each player controls a selected role by using an interface of a real-time strategy (RTS) game style. In this type of game, common organization units such as building groups, resources, training troops and the like usually do not need to be operated in the RTS game, and a player may complete the combat only by controlling a role selected by the player.

In an MOBA game design implementation process, a method used in an existing technology is a game design manner in which states are synchronized. In a communication manner of this game, a key state of the server is used as a synchronization dimension, game logic performs calculation on the server, and then the server synchronizes key data in a game scene to each client according to a period or key time point. The client only needs to receive a state change transferred by the server, and then updates a local action state of the client, a buffer state, and location data. Therefore, the client usually only makes representation in a corresponding state.

In the foregoing state synchronization manner, a data amount increases with a quantity of information that needs to be synchronized, and for the MOBA game, a large quantity of information usually needs to be operated. If all the information needs to be synchronized, a data amount cannot be accepted. Another design method used in the existing technology is a frame synchronization game design manner. A frame synchronization game is different from a conventional state synchronization game in that, a communication manner uses an input operation of a player as a synchronization dimension. States do not need to be synchronized in frame synchronization, and only operations need to be synchronized. After each client accepts an operation, operations may reach a consistent state by using calculation. In such case, even if a data amount is large, a synchronization amount does not increase accordingly.

Currently, in an MOBA game designed in a state synchronization manner such as League of Legends, an online fight watching function is provided, so that other game users than both parties joining a battle can also synchronously watch the game. Online fight watching implemented based on game state synchronization is the same as a normal game, a fight watching client receives a state synchronization message broadcast by the server, and the fight watching client then makes simple calculation and representation. Because the state synchronization game needs to frequently synchronize game states between the server and the client, this causes a huge data amount, and in particular, a mobile phone game user is very sensitive to it. Because state synchronization needs to synchronize a large quantity of data in the fight watching process, a player inevitably needs to consume relatively large traffic in the fight watching process, causing a sharp increase in communication traffic.

To sum up, it can be known that, in an MOBA game designed by using state synchronization, when implementing online fight watching, a client of a mobile phone generates a large quantity of communication traffic. Although in an MOBA game designed by using frame synchronization, a client joining a battle can consume a small amount of traffic to perform a game fighting function, the MOBA game designed by using frame synchronization cannot implement the fight watching function, and cannot satisfy a requirement in which the client of the mobile phone implements fight watching in the frame synchronization game.

Based on this, an embodiment of the present disclosure provides a data processing method based on frame synchronization, a server and a client, to display, by a client in a frame synchronization scene, a simulation object operated by another client.

An embodiment of the data processing method based on frame synchronization of the present disclosure may be specifically applied to a scene in which a user operates a client of the user to watch fighting of a simulation object operated by another client. In this embodiment of the present disclosure, a frame synchronization scene may be specifically a frame synchronization game scene, or may be a frame synchronization operation scene for an application program, for example, a frame synchronization application operation scene for office software, a frame synchronization application operation scene for a role and the like. Using a game scene as an example, an MOBA (multiplayer online battle arena) game such as League of Legends and the like provides an online fight watching function, but provides no playback function. This has a huge relationship with a game implementation. Because a state synchronization game needs to frequently synchronize game states between the server and the client, this causes a huge data amount and a sharp increase in communication traffic, and moreover is also unfavorable to implementation of a local playback function. In this embodiment of the present disclosure, the fight watching function may be implemented based on the frame synchronization game, traffic consumption can be greatly reduced in the watching process, and a playback function is also provided to a player.

Figure 33:
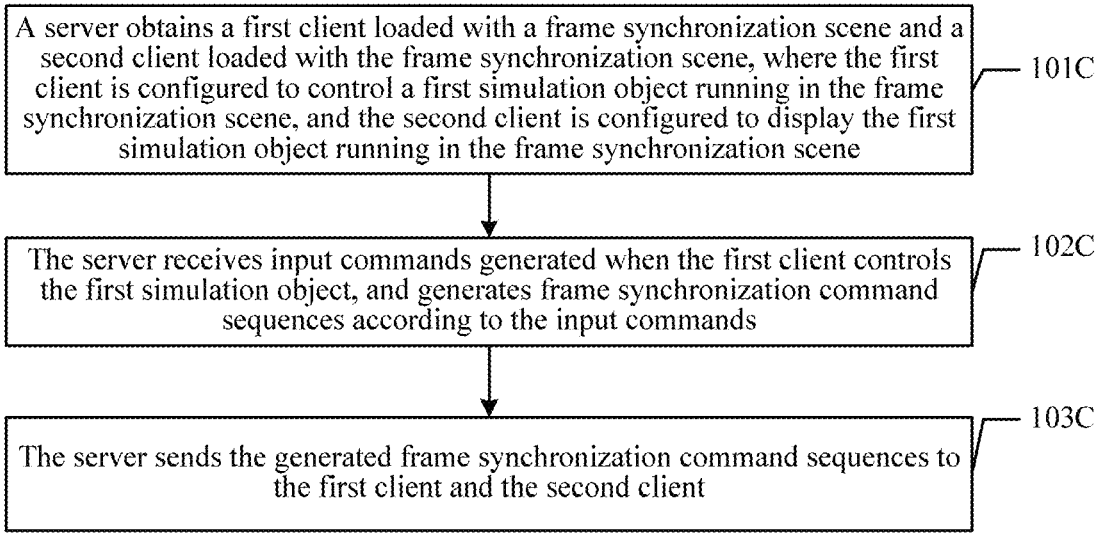
FIG. 33 is a schematic block flowchart of a data processing method based on frame synchronization according to an embodiment of the present disclosure.

The fight watching solution based on state synchronization has many problems. On one hand, there is a traffic problem. In the state synchronization process, a large quantity of data needs to be synchronized. Therefore, a player inevitably needs to consume relatively large traffic in the watching process. On the other hand, there is a local playback problem. Match playback watching is a large requirement of an MOBA player, and match playback storage based on state synchronization not only has a difficulty in technical implementation, but also causes an excessively large playback file, deteriorating use experience of a user. To resolve the foregoing problem, an embodiment of the present disclosure provides a solution of a server, a first client and a second client. Description is first made from a side of the server. Referring to FIG. 33, an embodiment of the present disclosure provides a data processing method based on frame synchronization, and the method may include the following steps:

101C. The server receives an input command from a first client, and generates frame synchronization command sequences according to the input command, the input command being used to control any simulation object displayed in a frame synchronization scene.

It should be noted that, in some scenes, a user may manipulate a plurality of simulation objects on a first client simultaneously. For example, in the Chenghai 3C game, a user usually manipulates more than one virtual object, and therefore an input operation of the first client is used to control any simulation object in a plurality of virtual objects; and in some other scenes, a user may manipulate a simulation object on a first client simultaneously. For example, in the King of Glory game, a user manipulates only one virtual object, and therefore an input operation of the first client is used to control the simulation object.

In this embodiment of the present disclosure, after the server determines that all clients in a same frame synchronization scene are loaded completely, the first client is used as the fighting client, and may generate an input command according to control of a user over a simulation object on the first client, and send the input operation to the server. For example, the fighting client generates an input command according to control of a user over any simulation object in the frame synchronization scene, and sends the input command to the server. After the server receives input commands separately sent by the fighting client, and collects input operations of the first client according to a policy, the server generates frame synchronization command sequences according to the input commands. An example in which a user manipulates a virtual object is used. There are in total three clients that are loaded completely in a frame synchronization game scene, where the client 1 and the client 2 are fighting clients, and the client 3 is a fight watching client. Therefore, the client 1 controls the game role 1 to run, the client 2 controls the game role 2 to run, and the client 3 is configured to display a running process of the game role 1, or the client 3 is configured to display a running process of the game role 2. After the server broadcasts, to the three clients, a start command for enabling respective simulation objects to run, the client 1 controls the game role 1 to run to generate the input command 1, and the client 2 controls the game role 2 to run to generate the input command 2. Therefore, the client 1 reports the input command 1 to the server, and the client 2 reports the input command 2 to the server, so that the server receives the input command 1 and the input command 2, and the server integrates the input command 1 and the input command 2 to obtain a frame synchronization command sequence.

In some embodiments of the present disclosure, step 101C of receiving an input command from a first client and generating frame synchronization command sequences according to the input command includes:

B1. The server receives input commands respectively generated in a plurality of sequence frames when the first client controls a first simulation object.

B2. The server respectively generates frame synchronization command sequences corresponding to different sequence frames according to the input commands respectively generated in the sequence frames.

Where the first client controls the first simulation object, the first client may separately operate the first simulation object in a plurality of sequence frames, and therefore the first client may generate a corresponding input command for each sequence frame (which may be also referred to as a logic frame). An input command of the first client for operating a user is random, but after the input command is sent to the server, the server aggregates, by using a sequence frame as a unit, all input commands received in the current column frame to generate frame synchronization command sequences corresponding to different sequence frames.

102C. The server sends the generated frame synchronization command sequences to the first client and a second client, the second client and the first client being loaded with a same frame synchronization scene.

In this embodiment, after the server generates the frame synchronization command sequences, the server sends the frame synchronization command sequences to the first client and the second client. Because the first client is the fighting client for controlling a simulation object in the frame synchronization scene, the first client may receive the frame synchronization command sequences, and calculate, according to the received frame synchronization command sequences, interactive application data generated by respective simulation objects corresponding to a plurality of clients in the frame synchronization scene, and display the interactive application data of the plurality of simulation objects. Although the second client used as a display client has not sent an input command to the server, the server still needs to send frame synchronization command sequences to the second client, the second client calculates, according to the frame synchronization command sequences, interactive application data generated by respective simulation objects corresponding to a plurality of clients in the frame synchronization scene, and displays the interactive application data of the plurality of simulation objects. Therefore, the operation user of the second client may see the interactive application data of the simulation object in the frame synchronization scene, thereby satisfying a fight watching need of the operation user of the second client in the frame synchronization scene.

In this embodiment, the fighting clients generate input commands, and then send the input commands to the server, the server generates frame synchronization command sequences according to the received input commands, sends the frame synchronization command sequences to the fighting clients, and sends the frame synchronization command sequences to the fight watching client, then each of the clients of battle joining users and the clients of fight watching users may perform data calculation processing and the terminal representation, and all game logic and representation are completed in the clients, thereby providing the fight watching function in the frame synchronization scene.

In this embodiment, the server is configured to implement data processing in the frame synchronization scene, where in this embodiment, at least has two clients enter a same frame synchronization scene. In a same frame synchronization scene, some clients may control simulation objects under operations of users, and the simulation objects may specifically be game roles in the frame synchronization game scene, or may be object contents operated by the clients in another frame synchronization scene; and some other clients have not participated in control over simulation objects in the frame synchronization scene, but are configured to display that another client controls a simulation object, so that a user may watch, by using a client, how another client specifically controls a simulation object.

In an example, in this embodiment, before receiving the input operation from the first client, the server may further determine, in the frame synchronization scene, that different clients are respectively loaded with the frame synchronization scene by using different entries, that is, this embodiment may further include the following steps:

A1. The server obtains a first loading progress of loading the first client with the frame synchronization scene by using a fighting entry.

A2. The server obtains a second loading progress of loading the second client with the frame synchronization scene by using a fight watching entry.

A3. The server broadcasts, to the first client and the second client when the server determines according to the first loading progress that the first client is loaded completely and determines according to the second loading progress that the second client is loaded completely, a start command used to enable a simulation object to be run.

The first client and the second client are two different types of clients, the first client may participate in simulation object control in the frame synchronization scene, and the second client may not participate in simulation object control in the frame synchronization scene, and is configured to display control of another client over a simulation object. The first client and the second client may access the frame synchronization scene respectively by using different entries. For example, the first client enters the frame synchronization scene by using a fighting entry, and the second client enters the frame synchronization scene by using a fight watching entry. All clients entering the frame synchronization scene may report respective loading progresses to the server. For example, the first client is loaded with the first loading progress of the frame synchronization scene, and the second client is loaded with the second loading progress of the frame synchronization scene. Therefore, the server may judge, according to the loading progresses reported by the clients, whether each client is already loaded completely with the frame synchronization scene. For example, the server determines, according to the first loading progress, whether the first client is loaded completely, and determines, according to the second loading progress, whether the second client is loaded completely. After all clients entering the frame synchronization scene are loaded with the frame synchronization scene completely, the server may trigger starting to run a simulation object of each client in the frame synchronization scene. For example, when both the first client and the second client are loaded completely, the server broadcasts, to the first client and the second client, a start command used to enable the first simulation object to run. For example, in the frame synchronization game scene, there are in total three clients that are loaded completely, where the client 1 and the client 2 are the fighting clients, and the client 3 is the fight watching client. Therefore, the client 1 controls the game role 1, the client 2 controls the game role 2, and the client 3 is configured to display control of the client 1 over the game role 1, or configured to display control of the client 2 over the game role 2. Therefore, after the server broadcasts, to the three clients, commands for enabling respective simulation objects to start running, the client 1 starts controlling the game role 1, the client 2 starts controlling the game role 2, and the client 3 starts displaying control of the client 1 over the game role 1 or control of the client 2 over the game role 2.

In some possible implementations, the fight watching entry includes: an online delay fight watching entry, a referee real-time fight watching entry and a local playback fight watching entry. Step A2 of determining that the second client enters the frame synchronization scene by using a fight watching entry may include:

A21. The server determines that the second client enters the frame synchronization scene by using the online delay fight watching entry; or A22. The server determines that the second client enters the frame synchronization scene by using the referee real-time fight watching entry; or A23. The server determines that the second client enters the frame synchronization scene by using the local playback fight watching entry.

Because the fight watching entry specified in the frame synchronization scene may include three entries: an online delay fight watching entry, a referee real-time fight watching entry and a local playback fight watching entry, the second client as the fight watching client may enter different fight watching entries according to choices of fight watching users, where the online delay fight watching entry is a fight watching entry through which watched content is delayed when a watching user is watching control of the first client over a simulation object. For example, content seen by a fight watching user may be delayed by a minute. The referee real-time fight watching entry is a fight watching entry through which the operation user of the second client as a referee watches control of the first client over a simulation object. The local playback fight watching entry is a fight watching entry through which the operation user of the second client may store control of the first client over a simulation object in the second client to perform local buffer, and then perform playback according to an operation of the user. For example, the local playback fight watching entry is used to present a playback file manually stored by the fight watching client.

In some possible implementations, in the foregoing implementation scene of performing step B1 to step B2, when the first client enters the frame synchronization scene by using the fighting entry, and the second client enters the frame synchronization scene by using the referee real-time fight watching entry, step 103 of sending, by the server, the generated frame synchronization command sequences to the first client and a second client includes:

C1. The server sequentially broadcasts the frame synchronization command sequences corresponding to the sequence frames to the first client and the second client in a frame order.

The first client may enter the frame synchronization scene by using the fighting entry, and the first client may receive, in real time, the frame synchronization command sequences sent by the server, and display the frame synchronization command sequences on the first client. The second client enters the frame synchronization scene by using the referee real-time fight watching entry. Therefore, the second client needs to receive, in real time, the frame synchronization command sequences sent by the server, and display the frame synchronization command sequences on the second client, and the server may simultaneously send a frame synchronization command sequence corresponding to each sequence frame to the first client and the second client in a broadcast manner.

In some possible implementations, in the foregoing implementation scene of performing step B1 to step B2, when the first client enters the frame synchronization scene by using the fighting entry, and the second client enters the frame synchronization scene by using the online delay fight watching entry or the local playback fight watching entry, step 102C of sending, by the server, the generated frame synchronization command sequences to the first client and a second client includes:

D1. The server sequentially sends the frame synchronization command sequences corresponding to the sequence frames to the first client in a frame order.

D2. The server integrates the generated frame synchronization command sequences corresponding to the sequence frames according to a delay integration period, to obtain a frame synchronization command sequence flow.

D3. The server sends the frame synchronization command sequence flow to the second client.

The first client enters the frame synchronization scene by using the fighting entry, and the first client needs to receive, in real time, the frame synchronization command sequences sent by the server, and display the frame synchronization command sequences on the first client. The second client enters the frame synchronization scene by using the online delay fight watching entry or the local playback fight watching entry, and the second client may receive, in a delayed manner, the frame synchronization command sequences sent by the server, and display the frame synchronization command sequences on the second client. The server may integrate the frame synchronization command sequences corresponding to the sequence frames according to a delay integration period, to obtain a frame synchronization command sequence flow. For example, the server may integrate, by using three sequence frames as a delay integration period, received frame synchronization command sequences corresponding to the three sequence frames, and the server then sends a frame synchronization command sequence flow to the second client.

It can be known according to the description of the foregoing embodiment that, the server receives an input command from a first client, and generates frame synchronization command sequences according to the input command, the input command being used to control any simulation object displayed in a frame synchronization scene. The server sends the generated frame synchronization command sequences to the first client and a second client, the second client and the first client being loaded with a same frame synchronization scene. The server may send the generated frame synchronization command sequences to the first client and the second client. Therefore, the second client may obtain the frame synchronization command sequences by using the server, and display control of the first client over a simulation object in the frame synchronization scene according to the frame synchronization command sequences, so that a user operating the second client may see how the first client controls the simulation object. In the frame synchronization game scene based on frame synchronization design, the fight watching function may be implemented, to satisfy a requirement of the fight watching client for implementing fight watching in the frame synchronization game.

Figure 34:
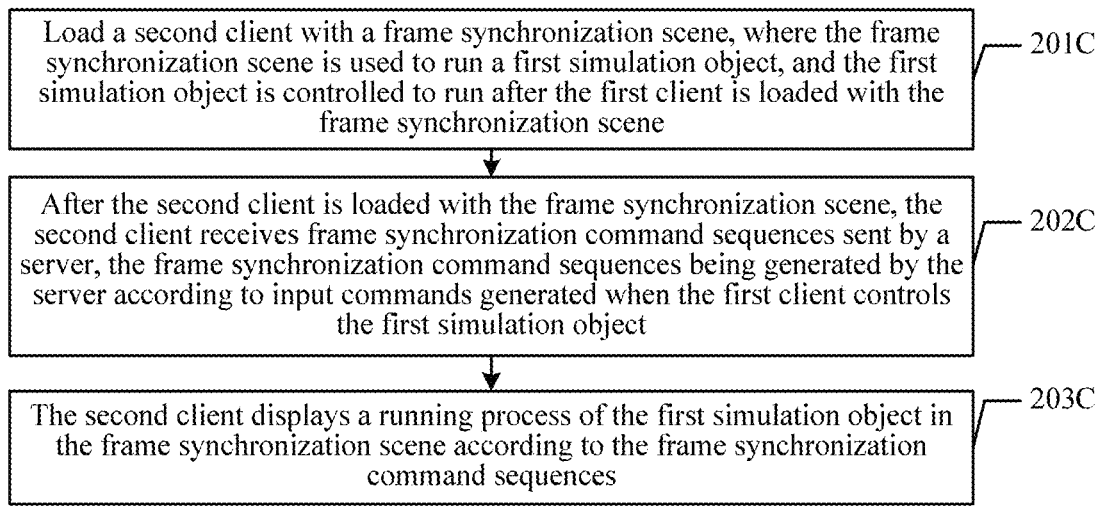
FIG. 34 is a schematic block flowchart of another data processing method based on frame synchronization according to an embodiment of the present disclosure.

The data processing method based on frame synchronization provided in the embodiments of the present disclosure is described in the foregoing embodiment from the server side, and the data processing method based on frame synchronization provided in the embodiments of the present disclosure is described subsequently from the client side. In an example, description is made from the perspective of the second client, the second client needs to display a simulation object controlled by the first client, and the method may be specifically applied to an interaction interface operation of an interactive application. In some examples, the interactive application may be a game application program, or an office application program that needs to be operated by a user, or a value transaction application program or the like. Referring to FIG. 34, a data processing method based on frame synchronization provided in an embodiment of the present disclosure may include the following steps:

201C. Pre-load a second client with a frame synchronization scene in which a simulation object is displayed, the simulation object being controlled by a first client loaded with the frame synchronization scene.

In this embodiment, at least two clients enter a same frame synchronization scene. In a same frame synchronization scene, some clients may control simulation objects under operations of users, and some other clients are configured to display that another client controls a simulation object, so that a user may watch, by using a client, how another client specifically controls a simulation object.

In some embodiments of the present disclosure, step 201C of pre-loading a second client with a frame synchronization scene in which a simulation object is displayed includes:

E1. The second client enters the frame synchronization scene by using a fight watching entry, to load the frame synchronization scene.

E2. The second client reports, in a process of loading the frame synchronization scene, a second loading progress of the frame synchronization scene to the server.

E3. The second client receives, after completing the loading of the frame synchronization scene, a start command that is used to enable the simulation object to be run and that is broadcast by the server.

The first client and the second client are two different types of clients, the first client may participate in simulation object control in the frame synchronization scene, and the second client may not participate in simulation object control in the frame synchronization scene, and is configured to display control of another client over a simulation object. The first client and the second client may access the frame synchronization scene respectively by using different entries. All clients entering the frame synchronization scene may report respective loading progresses to the server. Therefore, the server may judge, according to the loading progresses reported by the clients, whether each client is already loaded completely with the frame synchronization scene. After all clients entering the frame synchronization scene are loaded with the frame synchronization scene completely, the server may trigger starting to run a simulation object of each client in the frame synchronization scene.

In some possible implementations, step E1 of entering, by the second client, the frame synchronization scene by using a fight watching entry includes:

E11. The second client enters the frame synchronization scene by using the online delay fight watching entry; or E12. The second client enters the frame synchronization scene by using the referee real-time fight watching entry; or E23. The second client enters the frame synchronization scene by using the local playback fight watching entry.

In some possible implementations, The fight watching entry specified in the frame synchronization scene may include three entries: an online delay fight watching entry, a referee real-time fight watching entry and a local playback fight watching entry, and the second client as the display client may enter different fight watching entries according to a choice of a user.

202C. After the second client is loaded with the frame synchronization scene, the second client receives frame synchronization command sequences sent by a server, the frame synchronization command sequences being generated by the server according to an input command from the first client, and the input command being used to control the simulation object.

In this embodiment, the server is configured to implement data processing in the frame synchronization scene, and after the server determines that all clients in a same frame synchronization scene are loaded completely, the first client may generate an input command according to control of a user over a simulation object on the first client, and send the input operation to the server. The server receives input commands separately sent by the first client, and generates frame synchronization command sequences according to the received input commands.

In some embodiments of the present disclosure, when the second client enters the frame synchronization scene by using the referee real-time fight watching entry, step 202C of receiving, by the second client, frame synchronization command sequences sent by a server includes:

F1. The second client receives the frame synchronization command sequences that correspond to a plurality of sequence frames and that are sequentially broadcast by the server in a frame order.

When the second client enters the frame synchronization scene by using the online delay fight watching entry or the local playback fight watching entry, step 202C of receiving, by the second client, frame synchronization command sequences sent by a server includes:

F2. The second client receives a frame synchronization command sequence flow obtained by integrating the frame synchronization command sequences corresponding to sequence frames by the server.

The first client may receive, in real time, the frame synchronization command sequences sent by the server, and display the frame synchronization command sequences; if the second client enters the frame synchronization scene by using the referee real-time fight watching entry, the second client may receive, in real time, the frame synchronization command sequences sent by the server, and display the frame synchronization command sequences, where the server may simultaneously send frame synchronization command sequences corresponding to sequence frames to the first client and the second client in a broadcast manner. If the second client enters the frame synchronization scene by using the online delay fight watching entry or the local playback fight watching entry, the second client may receive, in a delayed manner, the frame synchronization command sequences sent by the server, and display the frame synchronization command sequences. The server may integrate the frame synchronization command sequences corresponding to the sequence frames according to a delay integration period, to obtain a frame synchronization command sequence flow, and send the frame synchronization command sequence flow to the second client.

203C. The second client displays the simulation object in the frame synchronization scene according to the frame synchronization command sequences.

In this embodiment, although the second client as the fight watching client has not sent an input command to the server, the server may still send frame synchronization command sequences to the second client, the second client may calculate, according to the frame synchronization command sequences, interactive application data generated by respective simulation objects corresponding to a plurality of clients in the frame synchronization scene, and display the interactive application data of the plurality of simulation objects in the frame synchronization scene. Correspondingly, the operation user of the second client may see interactive application data of some simulation objects in the frame synchronization scene, thereby satisfying a fight watching need of the operation user of the second client in the frame synchronization scene.

In some embodiments of the present disclosure, step 203C of displaying, by the second client, the simulation object in the frame synchronization scene according to the frame synchronization command sequences includes:

G1. The second client displays, when the second client enters the frame synchronization scene by using the referee real-time fight watching entry, the simulation object in real time in the frame synchronization scene according to the frame synchronization command sequences corresponding to the sequence frames.

G2. The second client displays, when the second client enters the frame synchronization scene by using the online delay fight watching entry, the simulation object in a delayed manner in the frame synchronization scene according to the frame synchronization command sequence flow.

G3. The second client stores, when the second client enters the frame synchronization scene by using the local playback fight watching entry, the frame synchronization command sequence flow in a local buffer, and plays back a running process of the simulation object in the frame synchronization scene according to the frame synchronization command sequence flow in the local buffer.

In some possible implementations, when the second client enters the frame synchronization scene by using the online delay fight watching entry, the displaying, by the second client, a running process of the first simulation object in a delayed manner in the frame synchronization scene according to the frame synchronization command sequence flow includes:

G21. The second client obtains a running time of the simulation object in the frame synchronization scene.

G22. The second client recedes backward by a delay interval from the running time of the simulation object, to obtain an earliest time at which the second client can display the simulation object in the frame synchronization scene.

G23. The second client recedes backward by a buffer interval from the earliest time at which the second client can display the simulation object, to obtain a playback time for which the second client displays the simulation object in the frame synchronization scene.

G24. The second client displays the simulation object in the frame synchronization scene according to a frame synchronization command sequence flow corresponding to the playback time.

It should be noted that, in an online delay fight watching mode, because the frame synchronization command sequence flow is transmitted in a flow form, jitter may be generated when the network is relatively poor. Therefore, for this mode, a played flow may be buffered, so as to intend to be capable of withstanding network jitter. That is, the earliest time at which the simulation object can be displayed is preceded by a buffer interval, and the time obtained after the buffering processing is a playback time for which the simulation object is displayed. When the network is relatively poor, a playhead may be pushed forward in the buffer interval, until the playhead is pushed to the earliest time at which the simulation object can be displayed, thereby bringing a more smoothing playback experience to the operation user of the second client.

In some possible implementations, step 203C of displaying, by the second client, the simulation object in the frame synchronization scene according to the frame synchronization command sequences includes:

H1. The second client obtains a playback speed control instruction.

H2. The second client stretches or contracts a time axis according to the playback speed control instruction.

H3. The second client increases an execution speed of the frame synchronization command sequences according to the stretched time axis, to accelerate a running process of the simulation object, or the client reduces an execution speed of the frame synchronization command sequences according to the contracted time axis, to decelerate a running process of the simulation object.

The operation user of the second client may send the playback speed control instruction to the second client, so as to change the playback speed, which may be implemented in a manner of stretching or contracting the time axis. In an example, when the operation user intends to increase the playback speed, the time axis may be uniformly stretched. In this way, push of a time point for frame switching is accelerated, thereby increasing an execution speed of the frame synchronization command; and when the operation user intends to decrease the playback speed, the time axis needs to be uniformly contracted. In this way, push of a time point for frame switching is decelerated, thereby decreasing an execution speed of the frame synchronization command.

It can be known according to the description of the foregoing embodiment that, the second client and the first client are pre-loaded with a same frame synchronization scene, the first client controls a simulation object in the frame synchronization scene and sends a generated input command to the server, and the server may send generated frame synchronization command sequences to the first client and the second client. Therefore, the second client may obtain the frame synchronization command sequences by using the server, and the simulation object is displayed in the frame synchronization scene, so that a user operating the second client may see control of the first client over the simulation object, and the second client displays, in the frame synchronization scene, the simulation object controlled by the first client.

To better understand and implement the technical solution of this embodiment of the present disclosure, a specific example is described below with reference to an MOBA game scene.

Figure 35:
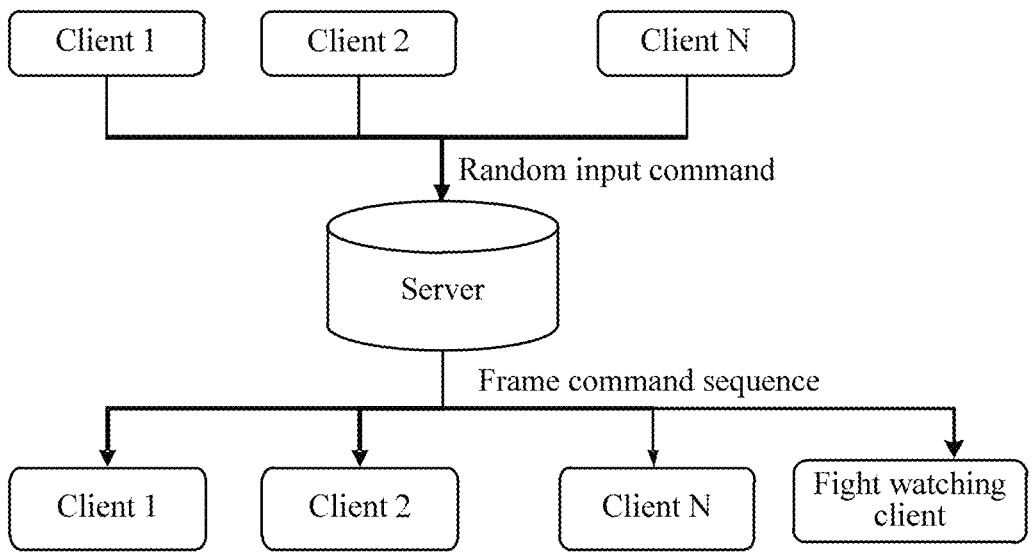
FIG. 35 is a schematic diagram of a process of sending frame synchronization command sequences according to an embodiment of the present disclosure.

As shown in FIG. 35, in the frame synchronization game scene provided in this embodiment, many manners of fight watching are provided, each manner corresponds to an entry, and a player may select a fight watching entry according to a preference of the player. The fight watching manners may include: manito fight watching, friend fight watching, team fight watching, local playback, and referee fight watching. The "manito" is a player that has a "benchmarking" strength and that is screened out according to a rule. Manito fight watching, friend fight watching, and team fight watching all belong to an online delay fight watching type, and online content seen by a player is delayed by a minute. The local playback fight watching entry presents a playback file manually stored in a local client of a player. Because none is real-time watching, the local playback fight watching entry and the online fight watching entry are integrated, all frame information of the round of game is stored in the local playback mode, the frame information is sequence data of a player operation, and the file is usually relatively small (for example, about 1 M). The referee real-time fight watching is used to watch real-time online content, and after a game is started, a player can watch a running process of game roles of both fighting parties, and can watch a battle scene of the both parties in real time. In this embodiment, regardless of a manner in which the second client enters a fight watching scene, a uniform fight watching interaction interface is presented to players. In the game scene, a player performing fight watching may watch information such as points, money, tower rush, and equipment of both fighting parties, and a role manipulated by each fighting player and the like at a neutral viewing angle, and additionally the player may further perform pause and fast-forward on the watching process. Pause and fast-forward may be performed on both the online watching and the local playback, but fast-forward of the online fight watching is limited by a currently buffered video stream, and the online fight watching at most reaches a current buffering location through fast-forward.

Referring to FIG. 36, FIG. 36 is a schematic diagram of a process of entering a frame synchronization game scene according to an embodiment of the present disclosure. In the frame synchronization game scene shown in FIG. 36, a most important data procedure in a fight watching process is consistent with a combat procedure, that is, a same data stream is used in the fight watching process as that of an ordinary combat process, and the data stream is data sequences of player operations, and is used to drive roles in the frame synchronization game scene to run.

In the frame synchronization game scene, clients collect and manipulate input operations of players of the clients, and then format the input operations into input commands, send the input commands to the server. The server generates frame synchronization command sequences according to the received input commands, and then broadcasts the frame synchronization command sequences to all of the clients. Therefore, the clients inevitably receive a same command sequence in a same sequence frame, and perform sequential processing according to same game logic, to calculate a result and present the result. As shown in FIG. 36, random input commands may be various operations (movement, skill release and the like) of a player, and the frame synchronization command sequences carry information about all players received by the server. The game logic includes hero movement, hero skill release and the like. As far as the hero movement is concerned, after a forward movement command is received, each client may go to view whether a current hero can walk forward walk, and how far the hero can walk forward, and then perform movement, all of these are game logic, and the clients are consistent. In the foregoing process, if the frame synchronization game scene is entered in a fight watching manner, the frame synchronization command sequences additionally flow into the fight watching client.

Referring to FIG. 36, a process of entering a game to perform a fighting procedure and a fight watching procedure is described subsequently. In a hall server of a game, a player is to determine a manner of entering the game: a player fighting entry, an online delay fight watching entry, a referee real-time fight watching entry, and a local playback fight watching entry. After the player determines to enter these entries, the game starts to be loaded, and starts to receive frame synchronization command sequences, thereby driving the frame synchronization game scene to be performed. In an example, after the frame synchronization game scene is entered, the following procedures may be performed:

1. Although the game entries are various, the game entries are abstracted and reused in a game framework design process, most modules are reused, and connection between modules is mainly driven by using a message. For example, game logic modules such as a map module, a movement module, and a skill module are reused.

2. In the frame synchronization game scene, after each client receives an initialization information packet of the game, the game starts to be loaded, and in the loading process, each client continuously reports a loading progress of the client. After all clients are loaded completely, the server uniformly instructs the clients to start the game, the game is also started by using a frame synchronization command, and the frame synchronization command exists in various forms of frame synchronization command sequences.

3. After the command for starting the game, frame synchronization command sequences generated by player operations are divided according to sequence frames, and the clients synchronously perform the frame synchronization command sequences by using a sequence frame as an execution unit. A difference lies in that data sources of frame synchronization command sequences obtained by different clients under entries may be different. For example, in a fighting mode and a referee real-time fight watching modes, the clients may receive, in real time, frame synchronization command sequences broadcast by the server; in an online delay fight watching mode, the clients may read a frame synchronization command sequence flow of the server in a stream manner; and in a local playback fight watching mode, the clients may read a frame synchronization command sequence flow of a local playback file.

4. Finally, in user interaction, a user performs fighting by using a combat interaction interface, and a user enters another entry by using a fight watching interface.

In some embodiments of the present disclosure, in an online delay fight watching mode, because the command data is transmitted in a flow form, jitter may be generated when the network is relatively poor. Therefore, for this mode, a played flow may be buffered, so as to intend to be capable of withstanding network jitter. FIG. 37 is a schematic diagram of a smoothing processing process according to an embodiment of the present disclosure. T0 is a true time of a current game, and passes by a delay interval (which may be, for example, 1 minute) to T1, T1 is an earliest time at which the current client can play, but to withstand network jitter, T1 is then receded by a buffer interval (which usually may be 3 seconds) to T2. A usual playback time point is T2, and when the network is relatively poor, a playhead may be pushed to T1 at most. When the network is worse, and the buffer interval is consumed completely, fight watching only can be waited for.

In some possible implementations, a player may trigger pause and restart of a game by using a client, where the pause operation may be processed as follows: first, driving of a frame synchronization command may be stopped. Running of the game is pushed in dependence on driving the frame synchronization command according to a period. Therefore, after the pause, a frame driver may be stopped, a context is stored, and a subsequent command sequence is protected from being damaged. Secondly, representation and logic of the frame synchronization game scene are completely separate. Therefore, to achieve a true pause effect, all representation driving including animation driving, particle driving (that is, particle effect) and logic update at an engine layer may be further stopped, where the representation may be an animation, an action, a special effect and the like that a player can see, and the logic is true game data, for example, a location and a blood volume of the player.

In some possible implementations, when a user changes a playback speed by using a fight watching interface, and the fight watching interface has a corresponding control button, a client may likewise be processed as follows: first, a frame driver may change the speed, and the speed is changed in a manner of stretching or contracting a time axis. The frame driver samples a frame driving time point on a fixed time axis, and when the time reaches a time point for frame switching, the driver performs push by a frame. Therefore, when the speed is increased, the time axis may be uniformly stretched. In this way, push of a time point for frame switching is accelerated, thereby increasing an execution speed of the frame synchronization command; and when the speed is decreased, the time axis may be uniformly contracted. In this way, push of a time point for frame switching is decelerated, thereby decreasing an execution speed of the frame synchronization command. Secondly, consistent with the pause control, the speed on the representation layer may be uniformly scaled, and only may be correspondingly scaled by using a time scaling factor provided by a game engine. The representation layer may be variable speed playback of an animation, variable speed playback of a particle effect and the like.

This embodiment implements a function of performing fight watching and playback in the frame synchronization game scene, and can perform pause and fast-forward operations on the watching process. Compared with the existing solution, the solution provided in this embodiment is characterized by lower traffic consumption, more smoothing experience, and flexible playback control; and moreover can further provide a local playback function to a user, to enrich game experience of the user.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also know that all the embodiments described in this specification are some implementable embodiments, and the related actions and modules are not necessarily required in the present disclosure.

To better implement the foregoing solutions in the embodiments of the present disclosure, the following further provides related apparatuses configured to implement the foregoing solutions.

Referring to FIG. 38-a, a server 600C provided in an embodiment of the present disclosure may include: a processing module 601C and a sending module 602C, where the processing module 601C is configured to receive an input command from a first client, the input command being used to control any simulation object displayed in a frame synchronization scene; and generate frame synchronization command sequences according to the input command; and the sending module 602C is configured to send the frame synchronization command sequences to the first client and a second client, the second client and the first client being loaded with a same frame synchronization scene.

In some possible implementations, referring to FIG. 38-b, the server 600C further includes:

a loading progress obtaining module 603C, configured to obtain a first loading progress of loading the first client with the frame synchronization scene by using a fighting entry, and obtain a second loading progress of loading the second client with the frame synchronization scene by using a fight watching entry; and an enabling module 604C, configured to broadcast, to the first client and the second client when it is determined according to the first loading progress that the first client is loaded completely and it is determined according to the second loading progress that the second client is loaded completely, a start command used to enable a simulation object to be run.

In some possible implementations, the fight watching entry includes: an online delay fight watching entry, a referee real-time fight watching entry and a local playback fight watching entry.

In some possible implementations, the processing module 601C is specifically configured to receive input commands respectively generated in a plurality of sequence frames when the first client controls a simulation object; and respectively generate frame synchronization command sequences corresponding to different sequence frames according to the input commands respectively generated in the sequence frames.

In some embodiments of the present disclosure, when the first client enters the frame synchronization scene by using a fighting entry, and the second client enters the frame synchronization scene by using the referee real-time fight watching entry, the sending module 602C is specifically configured to sequentially broadcast the frame synchronization command sequences corresponding to the sequence frames to the first client and the second client in a frame order.

In some possible implementations, when the first client enters the frame synchronization scene by using a fighting entry, and the second client enters the frame synchronization scene by using the online delay fight watching entry or the local playback fight watching entry, the sending module 602C is specifically configured to sequentially send the frame synchronization command sequences corresponding to the sequence frames to the first client in a frame order; integrate the frame synchronization command sequences corresponding to the sequence frames according to a delay integration period, to obtain a frame synchronization command sequence flow; and send the frame synchronization command sequence flow to the second client.

It can be known according to the description of the foregoing embodiment that, the second client may obtain frame synchronization command sequences by using server, and display a simulation object in the frame synchronization scene according to the frame synchronization command sequences. A user operating the second client may see control of the first client over the first simulation object, and the second client displays, in the frame synchronization scene, the simulation object controlled by the first client.

Referring to FIG. 39-a, an embodiment of the present disclosure provides a client. The client is specifically the second client 700C in the foregoing scene. The second client 700C includes: a scene loading module 701C, a receiving module 702C and a display module 703C, where the scene loading module 701C is configured to pre-load a second client with a frame synchronization scene in which a simulation object is displayed, the simulation object being controlled by a first client loaded with the frame synchronization scene;

the receiving module 702C is configured to receive frame synchronization command sequences sent by a server, the frame synchronization command sequences being generated by the server according to an input command from the first client, and the input command being used to control the simulation object; and the display module 703C is configured to display the simulation object in the frame synchronization scene according to the frame synchronization command sequences.

In some possible implementations, referring to FIG. 39-b, the scene loading module 701C further includes:

an entry selection unit 7011C, configured to enter the frame synchronization scene by using a fight watching entry, to load the frame synchronization scene;

a progress reporting unit 7012C, configured to report, in a process of loading the frame synchronization scene, a second loading progress of the frame synchronization scene to the server; and a start command receiving unit 7013C, configured to receive, after completing the loading of the frame synchronization scene, a start command that is used to enable the simulation object to be run and that is broadcast by the server.

In some possible implementations, the fight watching entry includes: an online delay fight watching entry, a referee real-time fight watching entry and/or a local playback fight watching entry.

In some possible implementations, when the second client enters the frame synchronization scene by using the referee real-time fight watching entry, the receiving module 702C is specifically configured to receive the frame synchronization command sequences that correspond to sequence frames and that are sequentially broadcast by the server in a frame order; or when the second client enters the frame synchronization scene by using the online delay fight watching entry or the local playback fight watching entry, the receiving module 702C is specifically configured to receive a frame synchronization command sequence flow obtained by integrating the frame synchronization command sequences corresponding to sequence frames by the server.

In some possible implementations, referring to FIG. 39-*c*, the display module 703C includes:

a real-time display unit 7031C, configured to display, when the second client enters the frame synchronization scene by using the referee real-time fight watching entry, the simulation object in real time in the frame synchronization scene according to the frame synchronization command sequences corresponding to the sequence frames;

a delay display unit 7032C, configured to display, when the second client enters the frame synchronization scene by using the online delay fight watching entry, the simulation object in a delayed manner in the frame synchronization scene according to the frame synchronization command sequence flow; and a local playback unit 7033C, configured to store, when the second client enters the frame synchronization scene by using the local playback fight watching entry, the frame synchronization command sequence flow in a local buffer, and play back a running process of the simulation object in the frame synchronization scene according to the frame synchronization command sequence flow in the local buffer.

In some possible implementations, referring to FIG. 39-*d*, when the second client enters the frame synchronization scene by using the online delay fight watching entry, the delay display module 7032C includes:

a running time obtaining unit 70321C, configured to obtain, when the second client enters the frame synchronization scene by using the online delay fight watching entry, a running time of the simulation object in the frame synchronization scene;

a delay processing unit 70322C, configured to recede backward by a delay interval from the running time of the simulation object, to obtain an earliest time at which the second client can display the simulation object in the frame synchronization scene;

a smoothing processing unit 70323C, configured to recede backward by a buffer interval from the earliest time at which the second client can display the simulation object, to obtain a playback time for which the second client displays the simulation object in the frame synchronization scene; and a smoothing display unit 70324C, configured to display a running process of the simulation object in the frame synchronization scene according to a frame synchronization command sequence flow corresponding to the playback time.

In some possible implementations, referring to FIG. 39-*e*, the display module 703C includes:

an instruction obtaining unit 7034C, configured to obtain a playback speed control instruction;

a time axis processing unit 7035C, configured to stretch or contract a time axis according to the playback speed control instruction; and a speed control unit 7036C, configured to increase an execution speed of the frame synchronization command sequences according to the stretched time axis, to accelerate a running process of the simulation object; or reduce an execution speed of the frame synchronization command sequences according to the contracted time axis, to decelerate a running process of the simulation object.

It can be known according to the description of the foregoing embodiment that, the second client may obtain frame synchronization command sequences by using server, and display a simulation object in the frame synchronization scene according to the frame synchronization command sequences. A user operating the second client may see control of the first client over the first simulation object, and the second client displays, in the frame synchronization scene, the simulation object controlled by the first client.

FIG. 40 is a schematic structural diagram of a server according to an embodiment of the present disclosure. The server 1100 may vary greatly due to different configurations or representation, and may include one or more central processing units (CPU) 1122 (for example, one or more processors) and a memory 1132, and one or more storage media 1130 (for example, one or more mass storage devices) that store applications 1142 or data 1144. The memory 1132 and the storage medium 1130 may be transient or persistent storages. The program stored in the storage medium 1130 may include one or more modules (not shown in the figure), and each module may include a series of instructions and operations for the server. Still further, the CPU 1122 may be configured to communicate with the storage medium 1130, and perform, on the server 1100, a series of instructions and operations in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, or FreeBSD™.

In the foregoing embodiment, steps performed by the server may be based on the structure of the server shown in FIG. 40.

Figure 41:
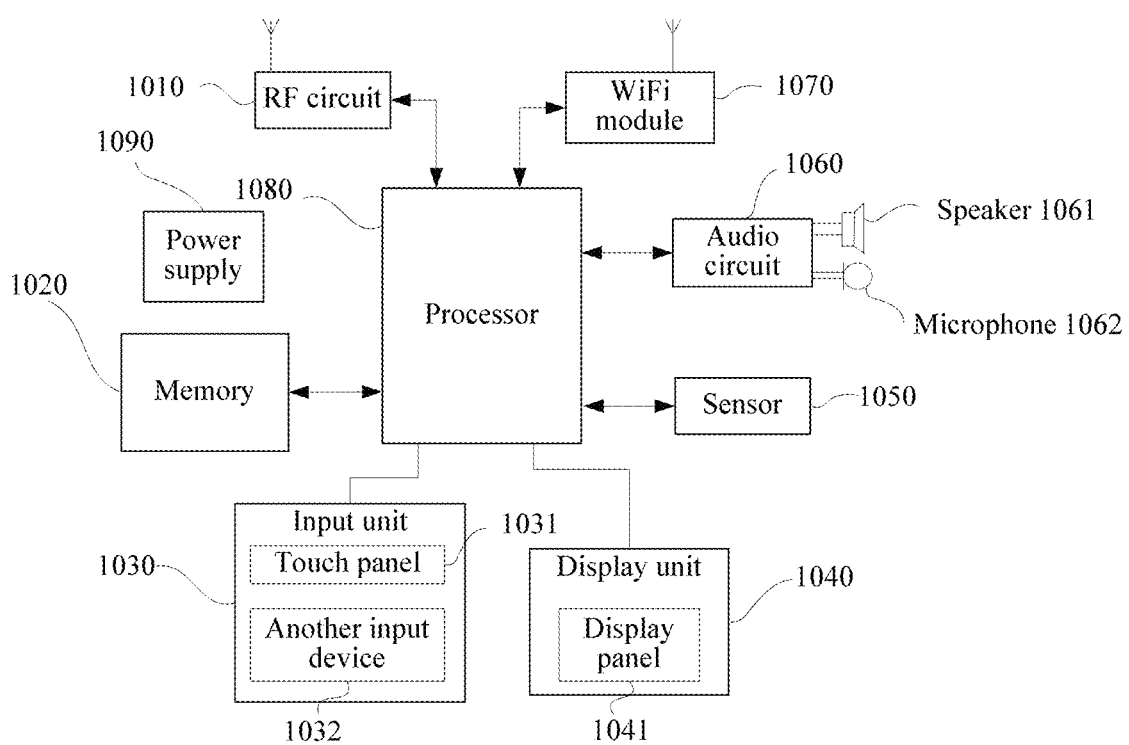
FIG. 41 is a schematic structural diagram of composition of a terminal according to an embodiment of the present disclosure.

The embodiment of the present disclosure further provides another terminal, as shown in FIG. 41, and for convenience of description, only parts related to the embodiment of the present disclosure relevant are shown. For specific technical details that are not disclosed, refer to the method part of the embodiments of the present disclosure. The terminal may be any terminal device including a mobile phone, a tablet computer, a Personal Digital Assistant (PDA), a Point of Sales (POS), and an on-board computer, and the terminal being a mobile phone is used as an example.

FIG. 41 is a block diagram of a structure of a part of a mobile phone related to a terminal according to an embodiment of the present disclosure. Referring to FIG. 41, the mobile phone includes components such as a radio frequency (RF) circuit 1010, a memory 1020, an input unit 1030, a display unit 1040, a sensor 1050, an audio circuit 1060, a wireless fidelity (WiFi) module 1070, a processor 1080, and a power supply 1090. A person skilled in the technology may understand that the structure of the mobile phone shown in FIG. 41 does not constitute a limitation to the mobile phone, and the mobile phone may include more or fewer components than those shown in the figure, or some components may be combined, or a different component deployment may be used.

The following specifically describes the components of the mobile phone with reference to FIG. 41.

The RF circuit 1010 may be configured to receive and send a signal during an information receiving and sending process or a call process. Specifically, the RF circuit receives downlink information from a base station, then delivers the downlink information to the processor 1080 for processing, and sends related uplink data to the base station. Generally, the RF circuit 1010 includes, but is not limited to, an antenna, at least one amplifier, a transceiver, a coupler, a low noise amplifier (LNA), and a duplexer. In addition, the RF circuit 1010 may also communicate with a network and another device by means of wireless communication. The wireless communication may use any communication standard or protocol, which includes, but is not limited to, Global System for Mobile communication (GSM), General Packet Radio Service (GPRS), Code Division Multiple Access (CDMA), WidebandCode Division Multiple Access (WCDMA), Long Term Evolution (LTE), e-mail, Short Messaging Service (SMS), and the like.

The memory 1020 may be configured to store a software program and a module, and the processor 1080 runs the software program and the module that are stored in the memory 1020, so as to perform various function applications of the mobile phone and data processing. The memory 1020 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 1020 may include a high speed random access memory, and may also include a non-volatile memory such as at least one magnetic disk storage device, a flash memory, or another volatile solid-state storage device.

The input unit 1030 may be configured to receive input digit or character information, and generate a key signal input related to the user setting and function control of the mobile phone. In an example, the input unit 1030 may include a touch panel 1031 and another input device 1032. The touch panel 1031, which may also be referred to as a touchscreen, may collect a touch operation of a user on or near the touch panel (such as an operation of a user on or near the touch panel 1031 by using any suitable object or accessory such as a finger or a stylus), and drive a corresponding connection apparatus according to a preset program. In an example, the touch panel 1031 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1080. Moreover, the touch controller can receive and execute a command sent by the processor 1080. In addition, the touch panel 1031 may be of a resistive, capacitive, infrared, or surface acoustic wave type. In addition to the touch panel 1031, the input unit 1030 may further include the another input device 1032. In an example, the another input device 1032 may include, but is not limited to, one or more of a physical keyboard, a functional key (such as a volume control key or a switch key), a track ball, a mouse, and a joystick.

The display unit 1040 may be configured to display information input by the user or information provided for the user, and various menus of the mobile phone. The display unit 1040 may include a display panel 1041. In some implementations, the display panel 1041 may be configured by using a liquid crystal display (LCD), an organic light-emitting diode (OLED), or the like. Further, the touch panel 1031 may cover the display panel 1041. After detecting a touch operation on or near the touch panel 1031, the touch panel 1031 transfers the touch operation to the processor 1080, so as to determine a type of a touch event. Then, the processor 1080 provides corresponding visual output on the display panel 1041 according to the type of the touch event. Although, in FIG. 41, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050 such as an optical sensor, a motion sensor, and other sensors. In an example, the optical sensor may include an ambient light sensor and a proximity sensor, where the ambient light sensor may adjust luminance of the display panel 1041 according to the luminance of the ambient light, and the proximity sensor may switch off the display panel 1041 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 1060, a speaker 1061, and a microphone 1062 may provide audio interfaces between the user and the mobile phone. The audio circuit 1060 may convert received audio data into an electric signal and transmit the electric signal to the speaker 1061. The speaker 1061 converts the electric signal into a sound signal for output. On the other hand, the microphone 1062 converts a collected sound signal into an electric signal. The audio circuit 1060 receives the electric signal and converts the electric signal into audio data, and outputs the audio data to the processor 1080 for processing. Then, the processor 880 sends the audio data to, for example, another mobile phone by using the RF circuit 1010, or outputs the audio data to the memory 1020 for further processing.

WiFi is a short distance wireless transmission technology. The mobile phone may help, by using the WiFi module 1070, the user to receive and send e-mails, browse a web page, access streaming media, and so on, which provides wireless broadband Internet access for the user. Although FIG. 41 shows the WiFi module 1070, it may be understood that the WiFi module is not a necessary component of the mobile phone, and when required, the WiFi module may be omitted as long as the scope of the essence of the present disclosure is not changed.

The processor 1080 is the control center of the mobile phone, and is connected to various parts of the mobile phone by using various interfaces and lines. By running or executing the software program and/or module stored in the memory 1020, and invoking data stored in the memory 1020, the processor 880 performs various functions and data processing of the mobile phone, thereby performing overall monitoring on the mobile phone. In some implementations, the processor 1080 may include one or more processing units. In some implementations, the processor 1080 may integrate an application processor and a modem. The application processor mainly processes an operating system, a user interface, an application program, and the like. The modem mainly processes wireless communication. It may be understood that, the foregoing modem processor may be not integrated into the processor 1080.

The mobile phone further includes the power supply 1090 (such as a battery) for supplying power to the components. In an example, the power supply may be logically connected to the processor 1080 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of the present disclosure, the processor 1080 included in the terminal further controls performing of the foregoing method process performed by the second client.

Moreover, an embodiment of the present disclosure further provides a device, the device including a processor and a memory;

the memory being configured to store program code and transmit the program code to the processor; and the processor being configured to perform the foregoing method for determining a recommended video and/or information display method and/or data processing method based on frame synchronization according to an instruction in the program code.

An embodiment of the present disclosure further provides a storage medium, the storage medium being used to store program code, and the program code being used to perform the foregoing method for determining a recommended video and/or information display method and/or data processing method based on frame synchronization.

An embodiment of the present disclosure further provides a computer program product including an instruction, when the instruction being run on a computer, the computer being caused to perform the foregoing method for determining a recommended video and/or information display method and/or data processing method based on frame synchronization.

Moreover, it should be noted that the described apparatus embodiments are merely exemplary. The units described as separate parts may or may not be physically separate, and the parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present disclosure, the connection relationship between modules denotes that a communication connection is provided between the modules, and specifically the communication connection can be implemented as one or more communication buses or signal lines. A person of ordinary skill in the art may understand and implement the present disclosure without creative efforts.

Through the foregoing description of the embodiments, it is clear to persons skilled in the art that the present disclosure may be implemented by software plus necessary universal hardware, and definitely may also be implemented by using dedicated hardware including an application-specific integrated circuit, a dedicated CPU, a dedicated memory, a dedicated component and the like. Usually, any function completed by a computer program may be easily implemented by using corresponding hardware, and, the specific hardware structure configured to implement the same function can be diversified, such as an analog circuit, a digital circuit or a dedicated circuit. However, for the present disclosure, in more cases, a software program implementation is a preferred implementation. Based on this, the technical solutions of the present disclosure or the part that makes contributions to the existing technology can be substantially embodied in the form of a software product. The computer software product is stored in a readable storage medium, for example, a floppy disk, a USB flash drive, a removable hard disk, a read-only memory (ROM), a random access memory (RAM), a magnetic disk, or an optical disc of the computer, and includes several instructions used to instruct a computer device (for example, a personal computer, a server, or a network device) to perform the methods according to the embodiments of the present disclosure.

To sum up, the above embodiments are merely provided for describing the technical solutions of the present disclosure, but not intended to limit the present disclosure. It should be understood by persons of ordinary skill in the art that although the present disclosure has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present disclosure.

What is claimed is:

1. A method for determining a recommended video performed at a computer server having one or more processors and memory storing programs to be executed by the one or more processors, the method comprising:

determining candidate virtual scenes, virtual roles existing in the candidate virtual scenes, and the virtual roles being manipulated by participating users;

selecting a target virtual scene from the candidate virtual scenes;

determining representation data of virtual roles of the target virtual scene;

selecting a target virtual role from the virtual roles of the target virtual scene according to the representation data of the virtual roles of the target virtual scene;

generating a recommended video at a viewing angle of the target virtual role in the target virtual scene;

recommending the recommended video and a first user corresponding to the target virtual role to a video recommendation interface, including:
    judging whether a video recommendation pool currently has idle recommendation locations, wherein the video recommendation pool maintains recommendation locations corresponding to a video recommendation limit number of the video recommendation interface, and a quantity of the current idle recommendation locations of the video recommendation pool corresponds to a recommendation quantity of current idle videos of the video recommendation interface; and
    adding, if the video recommendation pool currently has idle recommendation locations, the recommended video to the video recommendation pool, to recommend the recommended video to the video recommendation interface; and
in response to the recommendation of the recommended video to the video recommendation interface, sending notification information to clients corresponding to the participating users in the target virtual scene, wherein the notification information is used to indicate that the first user corresponding to the target virtual role is recommended.

2. The method for determining a recommended video according to claim 1, wherein the operation of selecting a target virtual role from the virtual roles of the target virtual scene according to the representation data of the virtual roles of the target virtual scene further comprises:
    determining a first type of representation data and a second type of representation data of the virtual roles of the target virtual scene, wherein a data type of the first type of representation data is opposite to that of the second type of representation data; and
    separately determining ratios of the first type of representation data to the second type of representation data of the virtual roles, and determining a virtual role whose ratio satisfies a predetermined ratio condition as the target virtual role.

3. The method for determining a recommended video according to claim 1, wherein the operation of selecting a target virtual scene from the candidate virtual scenes comprises:
    selecting, from the candidate virtual scenes, a candidate virtual scene in which user characteristics of the participating users all conform to a specified user characteristic, as the target virtual scene; or
    selecting, from the candidate virtual scenes, a candidate virtual scene whose running state conforms to a specified running state, as the target virtual scene.

4. The method for determining a recommended video according to claim 1, further comprising:
    adding a role identifier and a user identifier to the video recommendation pool when the recommended video is added to the video recommendation pool; and
    presenting the role identifier and the user identifier on the video recommendation interface.

5. The method for determining a recommended video according to claim 1, further comprising:
    periodically updating a quantity of currently watching users of the recommended video; and
    sending the updated quantity of currently watching users to the clients corresponding to the participating users in the target virtual scene.

6. The method for determining a recommended video according to claim 1, wherein the operation of determining candidate virtual scenes further comprises:
    determining candidate arena battles of a particular type that are currently being performed, and determining game arena scenes corresponding to the candidate arena battles as the candidate virtual scenes;
    the selecting a target virtual scene from the candidate virtual scenes comprises:
    determining, according to user levels of participating users of the candidate arena battles, a target arena battle in which the levels of the participating users all reach a specified level, wherein the target arena battle corresponds to a target game arena scene; and
    the selecting a target virtual role from the virtual roles of the target virtual scene according to the representation data of the virtual roles of the target virtual scene comprises:
    retrieving, from representation data of each game role of the target arena battle, a slaying quantity, an assist quantity, and a death quantity of each game role of the target arena battle;
    dividing a sum of the slaying quantity and the assist quantity of each game role by the death quantity, to determine a ratio corresponding to each game role; and
    determining a game role whose ratio is largest as the target virtual role.

7. The method for determining a recommended video according to claim 1, further comprising:
    determining a participating user manipulating the target virtual role; and
    generating the recommended video at the viewing angle of the participating user.

8. A computer server, comprising:
    one or more processors;
    memory coupled to the one or more processors; and
    a plurality of programs stored in the memory that, when executed by the one or more processors, cause the computer server to perform a plurality of operations including:
        determining candidate virtual scenes, virtual roles existing in the candidate virtual scenes, and the virtual roles being manipulated by participating users;
        selecting a target virtual scene from the candidate virtual scenes;
        determining representation data of virtual roles of the target virtual scene;
        selecting a target virtual role from the virtual roles of the target virtual scene according to the representation data of the virtual roles of the target virtual scene;
        generating a recommended video at a viewing angle of the target virtual role in the target virtual scene;
        recommending the recommended video and a first user corresponding to the target virtual role to a video recommendation interface, including:
            judging whether a video recommendation pool currently has idle recommendation locations, wherein the video recommendation pool maintains recommendation locations corresponding to a video recommendation limit number of the video recommendation interface, and a quantity of the current idle recommendation locations of the video recommendation pool corresponds to a recommendation quantity of current idle videos of the video recommendation interface; and adding, if the video recommendation pool currently has idle recommendation locations, the recommended video to the video recommendation pool, to recommend the recommended video to the video recommendation interface; and in response to the recommendation of the recommended video to the video recommendation interface, sending notification information to clients corresponding to the participating users in the target virtual scene, wherein the notification information is used to indicate that the first user corresponding to the target virtual role is recommended.

9. The computer server according to claim 8, wherein the operation of selecting a target virtual role from the virtual roles of the target virtual scene according to the representation data of the virtual roles of the target virtual scene further comprises:

determining a first type of representation data and a second type of representation data of the virtual roles of the target virtual scene, wherein a data type of the first type of representation data is opposite to that of the second type of representation data; and separately determining ratios of the first type of representation data to the second type of representation data of the virtual roles, and determining a virtual role whose ratio satisfies a predetermined ratio condition as the target virtual role.

10. The computer server according to claim 8, wherein the operation of selecting a target virtual scene from the candidate virtual scenes comprises:

selecting, from the candidate virtual scenes, a candidate virtual scene in which user characteristics of the participating users all conform to a specified user characteristic, as the target virtual scene; or selecting, from the candidate virtual scenes, a candidate virtual scene whose running state conforms to a specified running state, as the target virtual scene.

11. The computer server according to claim 8, wherein the operation of determining candidate virtual scenes further comprises:

determining candidate arena battles of a particular type that are currently being performed, and determining game arena scenes corresponding to the candidate arena battles as the candidate virtual scenes;

the selecting a target virtual scene from the candidate virtual scenes comprises:

determining, according to user levels of participating users of the candidate arena battles, a target arena battle in which the levels of the participating users all reach a specified level, wherein the target arena battle corresponds to a target game arena scene; and the selecting a target virtual role from the virtual roles of the target virtual scene according to the representation data of the virtual roles of the target virtual scene comprises:

retrieving, from representation data of each game role of the target arena battle, a slaying quantity, an assist quantity, and a death quantity of each game role of the target arena battle;

dividing a sum of the slaying quantity and the assist quantity of each game role by the death quantity, to determine a ratio corresponding to each game role; and determining a game role whose ratio is largest as the target virtual role.

12. The computer server according to claim 8, wherein the plurality of operations further comprise:

determining a participating user manipulating the target virtual role; and generating the recommended video at the viewing angle of the participating user.

13. A non-transitory computer readable storage medium storing a plurality of instructions in connection with a computer server having one or more processors, wherein the plurality of instructions, when executed by the one or more processors, cause the computer server to perform a plurality of operations including:

determining candidate virtual scenes, virtual roles existing in the candidate virtual scenes, and the virtual roles being manipulated by participating users;

selecting a target virtual scene from the candidate virtual scenes;

determining representation data of virtual roles of the target virtual scene;

selecting a target virtual role from the virtual roles of the target virtual scene according to the representation data of the virtual roles of the target virtual scene;

generating a recommended video at a viewing angle of the target virtual role in the target virtual scene;

recommending the recommended video and a first user corresponding to the target virtual role to a video recommendation interface, including:

judging whether a video recommendation pool currently has idle recommendation locations, wherein the video recommendation pool maintains recommendation locations corresponding to a video recommendation limit number of the video recommendation interface, and a quantity of the current idle recommendation locations of the video recommendation pool corresponds to a recommendation quantity of current idle videos of the video recommendation interface; and adding, if the video recommendation pool currently has idle recommendation locations, the recommended video to the video recommendation pool, to recommend the recommended video to the video recommendation interface; and in response to the recommendation of the recommended video to the video recommendation interface, sending notification information to clients corresponding to the participating users in the target virtual scene, wherein the notification information is used to indicate that the first user corresponding to the target virtual role is recommended.

14. The non-transitory computer readable storage medium according to claim 13, wherein the operation of selecting a target virtual role from the virtual roles of the target virtual scene according to the representation data of the virtual roles of the target virtual scene further comprises:

determining a first type of representation data and a second type of representation data of the virtual roles of the target virtual scene, wherein a data type of the first type of representation data is opposite to that of the second type of representation data; and separately determining ratios of the first type of representation data to the second type of representation data of the virtual roles, and determining a virtual role whose ratio satisfies a predetermined ratio condition as the target virtual role.

15. The non-transitory computer readable storage medium according to claim 13, wherein the operation of selecting a target virtual scene from the candidate virtual scenes comprises:

selecting, from the candidate virtual scenes, a candidate virtual scene in which user characteristics of the participating users all conform to a specified user characteristic, as the target virtual scene; or selecting, from the candidate virtual scenes, a candidate virtual scene whose running state conforms to a specified running state, as the target virtual scene.

16. The non-transitory computer readable storage medium according to claim 13, wherein the notification information indicates a relationship between the first user corresponding to the target virtual role and one of the participating users in the target virtual scene that receives the notification information.

17. The computer server according to claim 8, wherein the notification information indicates a relationship between the first user corresponding to the target virtual role and one of the participating users in the target virtual scene that receives the notification information.

18. The method for determining a recommended video according to claim 1, wherein the notification information indicates a relationship between the first user corresponding to the target virtual role and one of the participating users in the target virtual scene that receives the notification information.

* * * * *